(12) United States Patent
Van Thorre et al.

(10) Patent No.: US 10,024,533 B2
(45) Date of Patent: *Jul. 17, 2018

(54) SYSTEM AND PROCESS FOR COMBUSTING CLEANED COAL AND BENEFICIATED ORGANIC-CARBON-CONTAINING FEEDSTOCK

(71) Applicant: CTP Biotechnology, LLC, Honolulu, HI (US)

(72) Inventors: Douglas M Van Thorre, Minneapolis, MN (US); Carleton Drew Tait, North Salt Lake, UT (US); Michael L Catto, Moore, SC (US); Philip James Scalzo, South Jordan, UT (US)

(73) Assignee: CTP Biotechnology LLC, Honolulu, HI (US)

( * ) Notice: Subject to any disclaimer, the term of this patent is extended or adjusted under 35 U.S.C. 154(b) by 656 days.

This patent is subject to a terminal disclaimer.

(21) Appl. No.: 14/625,074

(22) Filed: Feb. 18, 2015

(65) Prior Publication Data

US 2015/0362185 A1     Dec. 17, 2015

Related U.S. Application Data

(63) Continuation-in-part of application No. 14/305,143, filed on Jun. 16, 2014, now Pat. No. 9,593,447.

(51) Int. Cl.
*C10L 5/00* (2006.01)
*F23G 5/08* (2006.01)
(Continued)

(52) U.S. Cl.
CPC ............... *F23G 5/08* (2013.01); *C10L 5/08* (2013.01); *C10L 5/143* (2013.01); *C10L 5/363* (2013.01);
(Continued)

(58) Field of Classification Search
CPC ... F23G 5/08; F23G 5/033; F23G 5/14; F23G 5/0273; F23G 7/10; F23G 2201/40;
(Continued)

(56) References Cited

U.S. PATENT DOCUMENTS 3,950,143 A     4/1976 Pyle
4,136,207 A     1/1979 Bender
(Continued)

FOREIGN PATENT DOCUMENTS

| EP | 2615156 A1 | 7/2013 |
| WO | 2012151545 A2 | 11/2012 |
| WO | 2013092884 A1 | 6/2013 |

OTHER PUBLICATIONS

VGB Powertech, Advantages and Limitations of Biomass Co-combustion in Fossil Fired Power Plants, Mar. 2008.*
(Continued)

*Primary Examiner* — Cephia D Toomer
(74) *Attorney, Agent, or Firm* — Berggren Law Offices, LLC; William R. Berggren; Stephen F. Wolf

(57) ABSTRACT

A coal combustion process is described using cleaned coal and processed biomass to reduce adverse by-products in a coal combusting apparatus including the reduction of carbon dioxide by at least 50 volume %. The coal feedstock comprises an aggregate blend of cleaned coal and processed biomass. The biomass feedstock comprises processed biomass pellets. The total energy density is predetermined and can be similar to the coal component or higher than the coal component. The intracellular salt in the processed biomass is at least 60 wt % less for the processed organic-carbon-containing feedstock used to make the processed biomass pellets than that of the starting un-processed processed organic-carbon-containing feedstock. The cleaned coal has a
(Continued)

sulfur content that is 50 wt % less than that of un-cleaned coal before it passed through the coal-cleaning sub-system.

10 Claims, 38 Drawing Sheets

(51) Int. Cl.
    *C10L 5/36*     (2006.01)
    *C10L 5/08*     (2006.01)
    *C10L 5/44*     (2006.01)
    *F23J 15/02*     (2006.01)
    *F23G 5/033*     (2006.01)
    *F23G 5/14*     (2006.01)
    *F23G 5/027*     (2006.01)
    *F23G 7/10*     (2006.01)
    *C10L 5/14*     (2006.01)
    *C10L 9/08*     (2006.01)

(52) U.S. Cl.
    CPC ............ *C10L 5/366* (2013.01); *C10L 5/447* (2013.01); *C10L 9/08* (2013.01); *F23G 5/0273* (2013.01); *F23G 5/033* (2013.01); *F23G 5/14* (2013.01); *F23G 7/10* (2013.01); *F23J 15/02* (2013.01); *C10L 2200/0469* (2013.01); *C10L 2290/02* (2013.01); *C10L 2290/06* (2013.01); *C10L 2290/08* (2013.01); *C10L 2290/24* (2013.01); *C10L 2290/28* (2013.01); *C10L 2290/30* (2013.01); *C10L 2290/36* (2013.01); *C10L 2290/545* (2013.01); *F23G 2201/40* (2013.01); *F23G 2204/203* (2013.01); *Y02E 50/10* (2013.01); *Y02E 50/30* (2013.01)

(58) Field of Classification Search
    CPC ..... F23G 2204/203; F23J 15/02; C10L 5/363; C10L 5/08; C10L 5/447; C10L 2200/0469; C10L 2290/02; C10L 2290/36; C10L 2290/30; C10L 2290/24; C10L 2290/08; C10L 2290/545; C10L 2290/06; C10L 5/143; C10L 5/366; C10L 9/08; C10L 2290/28; Y02E 50/30; Y02E 50/10
    See application file for complete search history.

(56) References Cited

U.S. PATENT DOCUMENTS

| | | | |
|---|---|---|---|
| 4,235,707 A | 11/1980 | Burke, Jr. | |
| 4,356,196 A | 10/1982 | Hultquist | |
| 4,398,917 A | 8/1983 | Reilly | |
| 4,579,562 A | 4/1986 | Tarman et al. | |
| 4,600,590 A | 7/1986 | Dale | |
| 4,644,060 A | 2/1987 | Chou | |
| 4,778,594 A | 10/1988 | Doctor | |
| 4,828,573 A | 5/1989 | Jelks | |
| 5,037,663 A | 8/1991 | Dale | |
| 5,171,592 A | 12/1992 | Holtzapple et al. | |
| 5,176,260 A | 1/1993 | Oder | |
| 5,916,826 A | 6/1999 | White | |
| 5,939,544 A | 8/1999 | Karstens et al. | |
| 5,980,595 A | 11/1999 | Andrews | |
| 6,106,888 A | 8/2000 | Dale et al. | |
| 6,176,176 B1 | 1/2001 | Dale et al. | |
| 6,506,223 B2 | 1/2003 | White | |
| 7,252,691 B2 | 8/2007 | Philipson | |
| 8,291,693 B2 | 10/2012 | Odendall | |
| 8,349,034 B2 | 1/2013 | Calabrese et al. | |
| 8,361,282 B2 | 1/2013 | Van Thorre et al. | |
| 8,585,786 B2 | 11/2013 | Drozd et al. | |
| 8,646,613 B2 | 2/2014 | Reiger et al. | |
| 8,753,410 B2 | 6/2014 | Taulbee | |
| 2007/0031918 A1 | 2/2007 | Dunson, Jr. et al. | |
| 2007/0037259 A1 | 2/2007 | Hennessey et al. | |
| 2007/0251143 A1 | 11/2007 | Michalek et al. | |
| 2007/0261295 A1 | 11/2007 | Tolmie | |
| 2009/0053771 A1 | 2/2009 | Dale et al. | |
| 2010/0162619 A1 | 7/2010 | Peus | |
| 2010/0281767 A1 | 11/2010 | Zeeck | |
| 2011/0107948 A1 | 5/2011 | Kurata et al. | |
| 2011/0146544 A1 | 6/2011 | Yaniv et al. | |
| 2011/0195473 A1 | 8/2011 | Wilhelm | |
| 2011/0197501 A1 | 8/2011 | Taulbee | |
| 2011/0296748 A1 | 12/2011 | Harris | |
| 2012/0017498 A1 | 1/2012 | Rugg | |
| 2013/0199087 A1 | 8/2013 | Zeelie et al. | |
| 2015/0052805 A1 | 2/2015 | Catto et al. | |

OTHER PUBLICATIONS

Gary Brodeur et al.;Chemical and Physicochemical Pretreatment of Lignocellulosic Biomass: A Review; SAGE-Hindawi Access to Research, Enzyme Research, vol. 2011, Article IC 787532; 17 pages.

Hugh McLaughlin et al.; All Biovhars are Not Equal, and Hot to Tell Them Apart; Versions 2 (Oct. 2009) which supercedes the digital reprint issued at the North American Biochar Conference, Boulder, CO; Aug. 2009; 36 pages.

Tumuluru et al., "A review on Biomass Classification and Composition, Co-firing Issues and Pretreatment Methods.", ASABE Annual International Meeting, Paper No. 1110458: 1-13, 2011, entire document.

\* cited by examiner

| Biomass Dewatering Alternatives 50% to 12% Moisture | | | | | | | |
|---|---|---|---|---|---|---|---|
| | Units | Mechanical | Physiothermal | Thermal | Physiochemical | | |
| | | | | | CH3OH+H2O | H2CO3+H2O | H2O Only |
| Capable of reducing moisture content to <20% | | No | Yes | Yes | Yes | Yes | Yes |
| Soluable Salts Extraction | | 30% - 50% | 0% - 25 | ~0% | 75% - 90% | 75% - 90% | 75% - 90% |
| Product Suitable for Bacterial/Enzyme Digestion | | Yes | Yes | Yes | Yes | Yes | No |
| Product Suitable for Co-firing w/ Coal @ > 30% | | No | No | No | Yes | Yes | Yes |
| Scalable to 20 TPH | | Yes | Yes | Yes | Yes | Yes | Yes |
| Capital Cost Multiplier | | 3 | 6 | 0.85 | 1 | 1 | 1 |
| O&M Multiplier | | 1.2 | 1.2 | 1.2 | 1 | 1 | 1 |
| Availability Multiplier | | 0.8 | 0.85 | 0.9 | 1 | 1 | 1 |
| | | | | | | | |
| *Thermal Energy Req* | | | | | | | |
| Working Fluid | | n/a | H2O | H2O | Ammonia | MeOH | H2O |
| Weight of Working Fluid/lb biomass | lb | 0.38 | 0.38 | 0.38 | 1.50 | 1.50 | 1.50 |
| Specific Heat | BTU/lb-°F | n/a | 1.00 | 1.00 | 0.52 | 0.61 | 1.00 |
| Heat of Vaporization | BTU/lb | n/a | 970.60 | 970.60 | 550.00 | 473.00 | 970.60 |
| T1 (initial temperature after SS) | °F | n/a | 59 | 59 | 59 | 59 | 59 |
| T2 (final temperature) | °F | 59 | 212 | 212 | 125 | 347 | 347 |
| % liquid converted to Steam | % | n/a | 100% | 100% | 20% | 20% | 19% |
| Energy Recovered % from Delta T | % | n/a | 10% | 20% | 90% | 90% | 90% |
| Energy Recovered % from Steam | % | n/a | 30% | 30% | 70% | 70% | 70% |
| Delta T Biomass (T2 - T1) | °F | n/a | 153 | 153 | 66 | 288 | 288 |
| Energy Req. for Delta T | BTU/lb | n/a | 58.14 | 58.14 | 51.48 | 261.36 | 432.00 |
| Energy Req. for Vaporization | BTU/lb | n/a | 368.83 | 368.83 | 165.00 | 141.90 | 276.62 |
| Total Energy Required (Gross) | BTU/lb | n/a | 426.97 | 426.97 | 216.48 | 403.26 | 708.62 |
| Energy Recovered from Delta T | BTU/lb | n/a | 5.81 | 11.63 | 46.33 | 235.22 | 388.80 |
| Energy Recovered from Steam | BTU/lb | n/a | 110.65 | 110.65 | 115.50 | 99.33 | 193.63 |
| Total Energy Recovered | BTU/lb | n/a | 116.46 | 122.28 | 161.83 | 334.55 | 582.43 |
| Total Energy Required (Net) | BTU/lb | 0.00 | 310.51 | 304.69 | 54.65 | 68.71 | 126.19 |
| Total Thermal Energy Req. /Ton | MMBTU/WT | 0 | 0.62 | 0.61 | 0.1093 | 0.1374 | 0.25 |
| | | | | | | | |
| *Mecahnical Energy* | | | | | | | |
| Chipping | BTU/lb | 90.00 | 90.00 | 48.00 | 48.00 | 48.00 | 48.00 |
| Process | BTU/lb | 100.00 | 50.00 | 10.00 | 22.00 | 22.00 | 22.00 |
| Packaging | BTU/lb | 15.00 | 0.00 | 25.00 | 15.00 | 15.00 | 15.00 |
| Total Mechanical Energy Required | BTU/lb | 205.00 | 140.00 | 83.00 | 85.00 | 85.00 | 85.00 |
| Total Mech. Energy Req. /Ton | MMBTU/WT | 0.41 | 0.28 | 0.17 | 0.17 | 0.17 | 0.17 |
| Total Energy Required/Pound | BTU/lb | 205.00 | 450.51 | 387.69 | 139.65 | 153.71 | 211.19 |
| Total Energy Required/Ton (1) | MMBTU/WT | 0.41 | 0.90 | 0.78 | 0.28 | 0.31 | 0.42 |
| Illustrative Cost of Req. Energy (Diesel @$4.00/Gal) | $/WT | $11.71 | $25.74 | $22.15 | $7.98 | $8.78 | $12.07 |
| (1) Mechanical method cannot achieve 12% moisture content. | | | | | | | |

Fig. 7

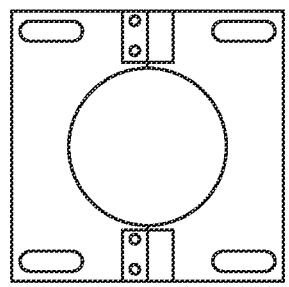
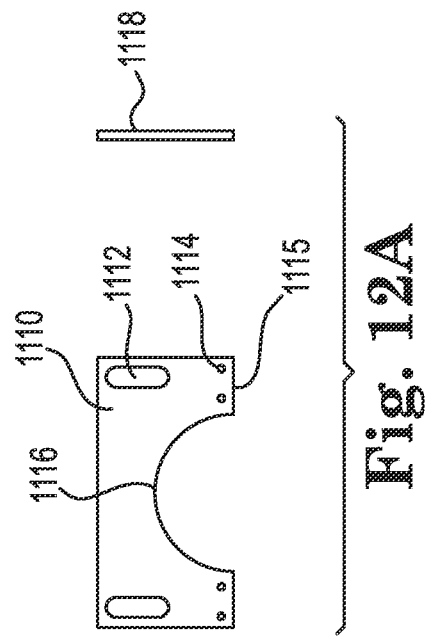
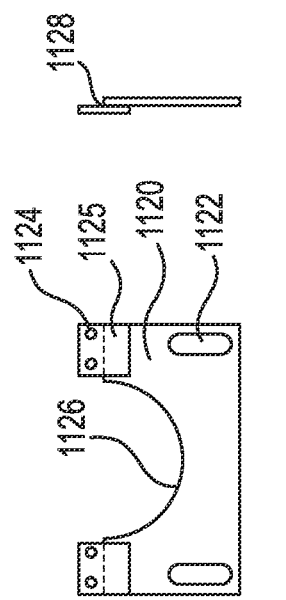

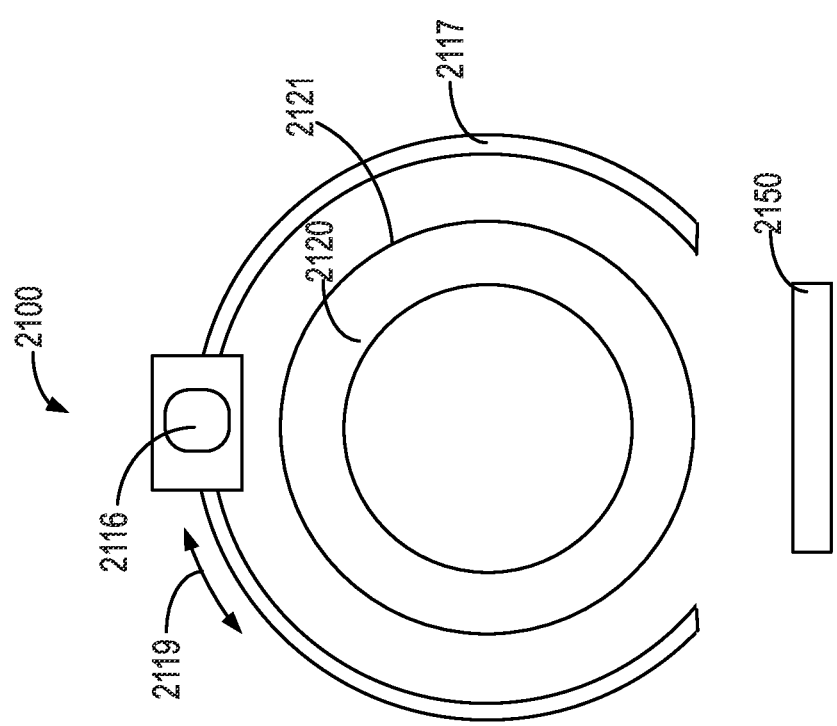

|  | Herbaceous Plants | Soft Woods | Hard Woods |
|---|---|---|---|
| Wet Fiber Disruption |  |  |  |
| • Solvent medium | Water | Water; Water/Methanol | Water |
| • Residence time, min. | 15 to 25 | 20 to 35 | 30 to 45 |
| • Temperature profile, °C | 130 to 160 | 165 to 205 | 180 to 215 |
| • Pressure profile, max psig | 260 to 280 | 280-385 water; 640-650 $H_2O$/MeOH | 375 to 425 |
| Vapor Explosion |  |  |  |
| • Initial Pressure Drop, psi. | 230 to 250 | 250-350 water; 600-620 $H_2O$/MeOH | 345 to 400 |
| • Explosive duration, milliseconds | 50 | 50 | 50 |
| Compaction |  |  |  |
| • Pressure plate patterned, Y/N. | Y | Both Y and N | Both Y and N |
| Starting water content, % | 70 to 80 | 45 to 75 | 40 to 50 |
| Processed water content, % | 4 to 15 | 4 to 15 | 4 to 15 |
| % Fixed carbon (d/b) (before->after) | 25 to 50 ---> 40 to 65 | 20 to 35 ---> 40 to 55 | 40 to 50 ---> 45 to 55 |
| % Volatiles (d/b) (before->after) | 40 to 70 ---> 30 to 40 | 60 to 80 ---> 30 to 50 | 40 to 50 ---> 35 to 50 |
| % Ash (d/b) (before->after) | 5 to 15 ---> 5 to 10 | 3 to 6 ---> 1 to 3 | 1 to 5 ---> < 3 |
| Heat Content, LHV (before->after), BTU/lb | 1,500 to 2,500 ---> 7,000 to 10,500 | 1,900 to 4,600 ---> 9,000 to 11,000 | 3,000 to 5,000 ---> 9,000 to 11,000 |

Fig. 26

SYSTEM AND PROCESS FOR COMBUSTING CLEANED COAL AND BENEFICIATED ORGANIC-CARBON-CONTAINING FEEDSTOCK

FIELD OF THE INVENTION

The present invention relates generally to coal burning devices and more specifically to systems for heating boiler systems using fuel comprising biomass and coal.

BACKGROUND OF THE INVENTION

The vast majority of fuels are distilled from crude oil or obtained from natural gas pumped from limited underground reserves, or mined from coal. As the earth's crude oil supplies become more difficult and expensive to collect and there are growing concerns about the environmental effects of coal other than clean anthracite coal, the world-wide demand for energy is simultaneously growing. Over the next ten years, depletion of the remaining world's easily accessible crude oil reserves, natural gas reserves, and low-sulfur bituminous coal reserves will lead to a significant increase in cost for fuel obtained from crude oil, natural gas, and coal.

The search to find processes that can efficiently convert biomass to fuels and by-products suitable for transportation and/or heating is an important factor in meeting the ever-increasing demand for energy. In addition, processes that have solid byproducts that have improved utility are also increasingly in demand.

Biomass is a renewable organic-carbon-containing feedstock that contains plant cells and has shown promise as an economical source of fuel. However, this feedstock typically contains too much water and contaminants such as water-soluble salts to make it an economical alternative to common sources of fuel such as coal, petroleum, or natural gas.

Historically, through traditional mechanical/chemical processes, plants would give up a little less than 25 weight percent of their moisture. And, even if the plants were sun or kiln-dried, the natural and man-made chemicals and water-soluble salts that remain in the plant cells combine to create corrosion and disruptive glazes in furnaces. Also, the remaining moisture lowers the heat-producing million British thermal units per ton (MMBTU per ton) energy density of the feedstock thus limiting a furnace's efficiency. A BTU is the amount of heat required to raise the temperature of one pound of water one degree Fahrenheit, and 1 MM BTU/ton is equivalent to 1.163 Gigajoules per metric tonne (GJ/MT). Centuries of data obtained through experimentation with a multitude of biomass materials all support the conclusion that increasingly larger increments of energy are required to achieve increasingly smaller increments of bulk density improvement. Thus, municipal waste facilities that process organic-carbon-containing feedstock, a broader class of feedstock that includes materials that contain plant cells, generally operate in an energy deficient manner that costs municipalities money. Similarly, the energy needed to process agricultural waste, also included under the general term of organic-carbon-containing feedstock, for the waste to be an effective substitute for coal or petroleum are not commercial without some sort of governmental subsidies and generally contain unsatisfactory levels of either or both water or water-soluble salts. The cost to suitably transport and/or prepare such feedstock in a large enough volume to be commercially successful is expensive and currently uneconomical. Also, the suitable plant-cell-containing feedstock that is available in sufficient volume to be commercially useful generally has water-soluble salt contents that result in adverse fouling and contamination scenarios with conventional processes. Suitable land for growing a sufficient amount of energy crops to make economic sense typically are found in locations that result in high water-soluble salt content in the plant cells, i.e., often over 4000 mg/kg on a dry basis.

Attempts have been made to prepare organic-carbon-containing feedstock as a solid renewable fuel, coal substitute, or binders for the making of coal aggregates from coal fines, but these have not been economically viable as they generally contain water-soluble salts that can contribute to corrosion, fouling, and slagging in combustion equipment, and have high water content that reduces the energy density to well below that of coal in large part because of the retained moisture. However, there remains a need for biomass or biochar with coal as it is a clean renewable source of solid fuel if it could be made cost-effectively with a more substantial reduction in its content of water and water-soluble salt for use as coal substitutes or as high energy binders with coal fines.

Solid byproducts with improved beneficial properties are an important factor in meeting the ever-increasing demand for energy. The present invention fulfills these needs and provides various advantages over the prior art.

SUMMARY OF THE INVENTION

Some embodiments of the present are directed to a coal combustion system for combusting clean coal in a coal combusting apparatus with less adverse by-products comprising a first input chamber, a second chamber, and a processed biochar system. The first chamber of the coal combusting apparatus is configured to pulverize clean coal feedstock comprising a processed biomass/cleaned coal blended compact aggregate that comprises at least 10 wt % of a coal having a sulfur content of at least 50 wt % less than that of the content of sulfur in the coal before it passed through a coal cleaning sub-system system and at least 10 wt % of a processed biomass from a processed biomass system, and to feed the pulverized cleaned coal feedstock into the coal combusting apparatus in a first concentration of feedstock. The second chamber of the coal combusting apparatus is configured to pulverize a processed biomass pellet feedstock from the processed biomass system and to feed the pulverized processed biomass pellet feedstock into the coal combusting apparatus in a second concentration of feedstock with the weight ratio of the first concentration to the second concentration between 1 to 9 and 9 to 1. At least one exhaust chamber has a gaseous waste stream and comprising at least one gas separation sub-system configured to separate at least 50 volume % of carbon dioxide from the gaseous waste stream. A consumption sub-system configured to receive the separated carbon dioxide gas and consume it in the making of useful materials. The processed biomass system is configured to make processed biomass from unprocessed organic-carbon-containing feedstock that includes free water, intercellular water, intracellular water, intracellular water-soluble salts, and at least some plant cells comprising cell walls that include lignin, hemicellulose, and microfibrils within fibrils. The processed biomass system is configured to make processed biomass from unprocessed organic-carbon-containing feedstock that includes free water, intercellular water, intracellular water, intracellular water-soluble salts, and at least some plant cells comprising cell walls that include lignin, hemicellulose, and microfibrils within fibrils. The processed biomass system comprises a beneficiation sub-system, a coal cleaning sub-system, a blending sub-system, and a pelletizing sub-system. The beneficiation sub-system is configured to convert the unprocessed organic-carbon-containing feedstock into a processed organic-carbon-containing feedstock with characteristics that include having an energy density of at least 17 MMBTU/ton (20 GJ/MT), a water content of less than 20 wt %, and a water-soluble intracellular salt content that is decreased more than 60 wt % on a dry basis from that of the unprocessed organic-carbon-containing feedstock. The coal cleaning sub-system is configured to convert un-cleaned coal into cleaned coal having a sulfur content at least 50 wt % less than that of the content of sulfur in the un-cleaned coal before it passed through the coal cleaning sub-system. The blending sub-system is configured to convert the cleaned coal and some of the processed biomass into processed biomass/cleaned coal blended compact aggregate with a weight ratio of cleaned coal to processed biomass ranging from 1 to 9 to 9 to 1. The pelletizing sub-system is configured to convert the processed organic-carbon-containing feedstock into processed biomass pellets.

Some embodiments of the present also are directed to a coal combustion process for combusting coal and processed biomass in a coal combusting apparatus with less adverse by-products comprises seven steps. The first step is passing un-cleaned coal through a coal cleaning sub-system to form cleaned coal having a sulfur content that is at least 50 wt % less than that of the content of sulfur in an un-cleaned coal. The second step is making a processed biomass feedstock pellet in a processed biomass system via a processed biomass system process. The processed system process in turn comprises three sub-steps. The first sub-step is inputting into the processed biomass a system comprising a first and a second subsystem an unprocessed organic-carbon-containing feedstock that includes free water, intercellular water, intracellular water, intracellular water-soluble salts, and at least some plant cells comprising cell walls that include lignin, hemicellulose, and microfibrils within fibrils. The second sub-step is passing unprocessed organic-carbon-containing feedstock through the first subsystem, a beneficiation sub-system via a beneficiation sub-system process, to result in processed organic-carbon-containing feedstock with characteristics that include having an energy density of at least 17 MMBTU/ton (20 GJ/MT), a water content of less than 20 wt %, and a water-soluble intracellular salt content that is decreased more than 60 wt % on a dry basis from that of the unprocessed organic-carbon-containing feedstock. The third sub-step is passing the processed organic-carbon-containing feedstock through the second subsystem, a pelletizing sub-system via a pelletizing sub-system process, to result in pelletized processed biomass pellet feedstock. The third step is passing the cleaned coal with part of the processed biomass through a blending sub-system via a blending sub-system process to form a processed biomass/cleaned coal blended compact aggregate that comprises the processed biomass/cleaned coal blended compact aggregate and the processed biomass in a wt ratio of between 1 to 9 and 9 to 1. The fourth step is providing the processed biomass/cleaned coal blended compact aggregate to a first chamber of the coal combusting apparatus, the first chamber configured to pulverize coal and feed the coal into the coal combusting apparatus in a first concentration weight of feedstock. The fifth step is providing part of the processed biomass pellet feedstock to a second chamber of the coal combusting apparatus, the second chamber configured to pulverize the processed biomass and feed the processed biomass into the coal combusting apparatus in a second concentration weight of feedstock with the ratio of the first concentration weight to the second concentration weight is between 1 to 9 and 9 to 1. The sixth step is passing a gaseous waste stream of the coal combustion apparatus through at least one exhaust chamber comprising at least one gas separation sub-system configured to separate at least 50 volume % of carbon dioxide from the gaseous waste stream and create separated carbon dioxide. The seventh step is passing the separated carbon dioxide through a gas consumption sub-system configured to receive the separated carbon dioxide gas and consume it in the making of useful materials.

Facilities that use a coal combustion coal combustion apparatus now have multiple ways to achieve a more environmentally friendly outcome that current available. The invention is a system and process for permitting the combustions of coal with less adverse by-products including the separation of at least 50 volume % of carbon dioxide from the gaseous waste stream of the coal combustion apparatus and the incorporation of that carbon dioxide into useful products. By use of a novel processed biomass that may have an energy density in some embodiments that equals or exceeds that of any type of coal and an intracellular salt content that is significantly less than other biomass products of similar energy, a pulverized coal stream in a coal combusting apparatus may now be diluted with a stream of pulverized processed biomass at any ratio from 1 to 9 to 9 to 1. This may be done without the adverse effects of salt from conventional high energy biomass. In addition, the coal in the coal stream may be pulverized and cleaned of a significant amount of adverse impurities, then agglomerated with processed biomass into storable and transportable aggregates. This invention also provides a productive use of coal fines from coal mines that currently are difficult to transport because of the potential for explosions even if they were cleaned while in a fine particle sized state.

The above summary is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 7 is a table illustrating the estimated energy consumption needed to remove at least 75 wt % water-soluble salt from organic-carbon-containing feedstock and reduce water content from 50 wt % to 12 wt % with embodiments of the beneficiation sub-system of the invention compared with known processes.

FIG. 12A is a diagram of the front view and side view of an embodiment of the high temperature adjustable cover plate showing a top half.

FIG. 12B is a diagram of the front view and side view of the embodiment of the high temperature adjustable cover plate of FIG. 12A showing a bottom half.

FIG. 12C is a diagram of the front view of the embodiment of the high temperature adjustable cover plate of FIG. 12A showing the top half of FIG. 12A and the bottom half of FIG. 12B joined.

FIG. 21 illustrates a system having a rotating magnetron in addition to a secondary heat source.

FIG. 26 is a table showing relative process condition ranges and water and water-soluble salt content for three types of organic-carbon-containing feedstock used in the beneficiation sub-system.

Figure 1:
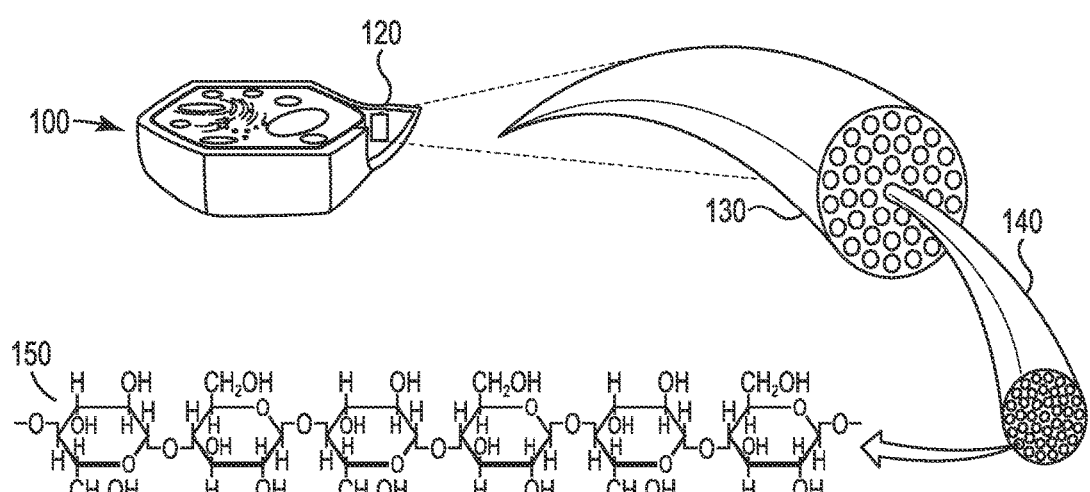
FIG. 1 is a diagram of a typical plant cell with an exploded view of a region of its cell wall showing the arrangement of fibrils, microfibrils, and cellulose in the cell wall.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

Embodiments of the present invention are directed to a coal combustion system for combusting coal in a coal combusting apparatus with less adverse by-product including the separation of at least 50 volume % of carbon dioxide from the gaseous waste stream of the coal combustion apparatus and the incorporation of that carbon dioxide into useful products. The system comprises a first chamber, a second chamber, a gas separation sub-system, a consumption sub-system, a coal cleaning sub-system, and a processed biomass system. The first chamber of the coal combusting apparatus is configured to pulverize cleaned coal and feed it into the coal combusting apparatus in a first concentration of feedstock. The cleaned coal comprises a processed biomass/cleaned coal blended compact aggregate that comprises at least 10 wt % of a coal having a sulfur content of at least 50 wt % less than that of the content of sulfur in the coal before it passed through a coal cleaning sub-system system and at least 10 wt % of a processed biomass from a processed biomass system. The second chamber of the coal combusting apparatus is configured to pulverize processed biomass pellets from a processed biomass system and feed it into the coal combusting apparatus in a second concentration of feedstock with the ratio of the first concentration to the second concentration between 1 to 9 and 9 to 1. Once the coal and biomass are combusted to produce products such as steam for generating electricity, the gaseous waste stream from the combustion are passed through a gaseous waste separation sub-system to remove at least 50 volume % of carbon dioxide. The separated carbon dioxide is then passed through a consumption a sub-section to consume the carbon dioxide in the making of products. The processed biomass system is configured to make processed biomass from unprocessed organic-carbon-containing feedstock that includes free water, intercellular water, intracellular water, intracellular water-soluble salts, and at least some plant cells comprising cell walls that include lignin, hemicellulose, and microfibrils within fibrils. The processed biomass system comprises a beneficiation sub-system and a pelletizing sub-system. The beneficiation sub-system is configured to convert the unprocessed organic-carbon-containing feedstock into a processed organic-carbon-containing feedstock with characteristics that include having an energy density of at least 17 MMBTU/ton (20 GJ/MT), a water content of less than 20 wt %, and a water-soluble intracellular salt content that is decreased more than 60 wt % on a dry basis from that of the unprocessed organic-carbon-containing feedstock. The blending sub-system is configured to convert the cleaned coal and some of the processed biomass into processed biomass/cleaned coal blended compact aggregate with a weight ratio of cleaned coal to processed biomass ranging from 1 to 9 to 9 to 1. The pelletizing sub-system is configured to convert the processed organic-carbon-containing feedstock into processed biomass pellets.

Now coal combustion can occur with significantly less adverse by-products. The cleaner processed biomass of the invention significantly reduces intracellular salt that is common in conventional biomass. The higher energy density of the cleaner processed biomass permits significant substation of the coal for processed biomass without any loss in energy to allow for a corresponding reduction is adverse impurities brought in with the coal. In addition the major adverse by-produce remaining from the coal combustion, carbon dioxide, may now be reduced by at least 50 volume % in productive use operation. This permits coal combustion to be more environmentally friendly.

In some embodiments, the processed biomass is processed biochar having an energy density of at least 21 MMBTU/ton (24 GJ/MT) and a water content that is less than 10 wt % such that the processed biochar is even more able to have a dilution effect of the coal stream of reducing the overall adverse impurities brought from the coal stream by bring little in the way of impurities to the combustion. The processed biomass of the invention has the advantages of being cleaner than coal and coming from a renewable source, i.e., agricultural and plant materials, without the burdens of current biomass processes that are inefficient and remove less if any of the salt found in unprocessed renewable biomass. There are several aspects of the invention that will be discussed: coal, processed biomass, processed biochar, co-firing streams of coal and processed biomass, unprocessed renewable organic-carbon-containing feedstock, beneficiation sub-system, heating sub-system, coal-cleaning sub-system, pelletizing/blending sub-system, gaseous separation subsystem and consumption sub-system, beneficiation sub-system process, heating sub-system process, coal cleaning sub-system process, pelletizing/blending sub-system process, and gaseous separation subsystem and consumption sub-system process.

Coal

The term "coal" is used to describe a variety of fossilized plant materials, but no two coals are exactly alike. Heating value, ash melting temperature, sulfur and other impurities, mechanical strength, and many other chemical and physical properties must be considered when matching specific coals to a particular application. Coal is classified into four general categories, or "ranks" They range from lignite through sub-bituminous and bituminous to anthracite, reflecting the progressive response of individual deposits of coal to increasing heat and pressure. The carbon content of coal supplies most of its heating value, but other factors also influence the amount of energy it contains per unit of weight. The amount of energy in coal is expressed in British thermal units per ton or 2000 pounds. A BTU is the amount of heat required to raise the temperature of one pound of water one degree Fahrenheit. About 90 percent of the coal in this country falls in the bituminous and sub-bituminous categories, which rank below anthracite and, for the most part, contain less energy per unit of weight. Bituminous coal predominates in the Eastern and Mid-continent coal fields, while sub-bituminous coal is generally found in the Western states and Alaska. Lignite ranks the lowest and is the youngest of the coals. Most lignite is mined in Texas, but large deposits also are found in Montana, North Dakota, and some Gulf Coast states.

The energy density of coal varies with its type with some overlap. Anthracite is coal with the highest carbon content, between 86 and 98 percent, and an energy density or heat value of over 30 MMBTU/ton (35 GJ/MT). Most frequently associated with home heating, anthracite is a very small segment of the U.S. coal market. There are 7.3 billion tons of anthracite reserves in the United States, found mostly in 11 northeastern counties in Pennsylvania. The most plentiful form of coal in the United States, bituminous coal is used primarily to generate electricity and make coke for the steel industry. The fastest growing market for coal, though still a small one, is supplying heat for industrial processes. Bituminous coal has a carbon content ranging from 45 to 86 percent carbon and an energy density or heat value of 21 MMBTU/ton to 31 MMBTU/ton (24 GJ/MT to 36 GJ/MT). Ranking below bituminous is sub-bituminous coal with 35-45 percent carbon content and an energy density or heat value between 16.6 MMBTU/ton to 26 MMBU/ton (19 GJ/MT to 30 GJ/MT). Reserves are located mainly in a half-dozen Western states and Alaska. Although its heat value is lower, this coal generally has a lower sulfur content than other types, which makes it attractive for use because it is cleaner burning. Lignite is a geologically young coal which has the lowest carbon content, 25-35 percent, and an energy density or heat value ranging between 8 MMBTU/ton to 16.6 MMBTU/ton (9 GJ/MT to 19 GJ/MT). Sometimes called brown coal, it is mainly used for electric power generation. As used in this document, coal of any type that has an energy density of at least 21 MMBTU/ton (24 GJ/MT) will be called high energy coal and coal of any type having an energy density of less than 21 MMBTU/ton (24 GJ/MT) will be called low energy coal.

Coal has inorganic impurities associated with its formation underground over millions of years. The inorganic impurities are not combustible, appear in the ash after combustion of coal in such situations as, for example boilers, and contribute to air pollution as the fly ash particulate material is ejected into the atmosphere following combustion. The inorganic impurities result mainly from clay minerals and trace inorganic impurities washed into the rotting biomass prior to its eventual burial. An important group of precipitating impurities are carbonate minerals. During the early stages of coal formation, carbonate minerals such as iron carbonate are precipitated either as concretions (hard oval nodules up to tens of centimeters in size) or as infillings of fissures in the coal. Impurities such as sulfur and trace elements (including mercury, germanium, arsenic, and uranium) are chemically reduced and incorporated during coal formation. Most sulfur is present as the mineral pyrite ($FeS_2$), sulfate minerals ($CaSO_4$ and $FeSO_4$), or organic complexes, and this may account for up to a few percent of the coal volume. Burning coal oxidizes these compounds, releasing oxides of sulfur (SO, $SO_2$, $SO_3$, $S_7O_2$, $S_6O_2$, $S_2O_2$, etc.), notorious contributors to acid rain. The trace elements (including mercury, germanium, arsenic, and uranium) were significantly present in the coal are also released by burning it, contributing to atmospheric pollution.

The impurities in coal can be reduced by cleaning the coal as discussed in coal cleaning sub-system section. However this requires forming an aggregate comprising cleaned coal and processed biomass to be able to store and transport the cleaned coal.

Processed Biomass

Biomass made from renewable organic-carbon-containing feedstock by the beneficiation process is referred to as processed biomass in this document. The processed biomass of the invention comprises a solid carbon fuel comprising less than 20 wt % water, and water-soluble intracellular salt that is less than 60 wt % on a dry basis that of unprocessed organic-carbon-containing feedstock. The processed biomass is made from unprocessed organic-carbon-containing feedstock that is converted into a processed organic-carbon-containing feedstock in a beneficiation sub-system. As used in this document, processed biomass pellets are a solid product of beneficiated organic-carbon-containing feedstock that is subsequently pelletized. Organic-carbon-containing feedstock used to make the processed biomass of the invention can contain mixtures of more than one renewable feedstock.

The processed biomass component of high energy aggregates of the invention is cleaner than coal. The impurities discussed above are not present in any significant amount. In particular, processed biomass contains substantially no sulfur. Some embodiments have a sulfur content of less than 1000 mg/kg (0.1 wt %) or less than 1000 parts per million (ppm), some of less than 100 mg/kg (100 ppm, some of less than 10 mg/kg (10 ppm). In contrast coal has significantly more sulfur. The sulfur content in coal ranges of from 4000 mg/kg (0.4 wt %) to 40,000 mg/kg (4 wt %) and varies with type of coal. The typical sulfur content anthracite coal is from 6000 mg/kg (0.6 wt %) to 7700 mg/kg (0.77 wt %). The typical sulfur content in bituminous coal is from 7000 mg/kg (0.7 wt %) to 40.000 mg/kg (4 wt %). The typical sulfur content in lignite coal is about 4000 mg/kg (0.4 wt %). Anthracite coal is too expensive for extensive use in burning. Lignite is poor quality coal, with a low energy density or BTU/wt.

In addition, processed biomass has substantially no nitrate, arsenic, mercury or uranium. Some embodiments have a nitrate content of less than 500 mg/kg, (500 ppm), some of less than 150 mg/kg (150 ppm), versus a nitrate content in coal of typically over 20,000 mg·kg (2 wt %). Some embodiments have a arsenic content of less than 2 mg/kg (2 ppm), some of less than 1 mg/kg (1 ppm), some less than 0.1 mg/kg or 100 parts per billion (ppb), and some less than 0.01 mg/kg (10 ppb) versus a arsenic content in coal of from over 1 mg/kg to over 70 mg/kg (1 ppm to 70 ppm). Some embodiments have a mercury content that is negligible, i. e., less than 1 microgram/kg (1 ppb), versus mercury content in coal of from 0.02 mg/kg, (20 ppb) to 0.3 mg/kg (300 ppb). Similarly, some embodiments have a uranium content that is also negligible, i. e., less than 1 microgram/kg (1 ppb), versus a uranium content in coal of from 20 mg/kg (20 ppm) to 315 mg/kg (315 ppm) with an average of about 65 mg/kg (ppm) and the uranium content in the ash from the coal with an average of about 210 mg/kg (210 ppm).

Processed Biochar

One form of processed biomass is processed biochar. Char made from renewable organic-carbon-containing feedstock by the beneficiation process is referred to as processed biochar in this document. The processed biochar of the invention comprises a solid carbon fuel comprising less than 10 wt % water, and water-soluble salt that is less than 60 wt % on a dry basis for the processed organic-carbon-containing feedstock from that of unprocessed organic-carbon-containing feedstock. The water-soluble intracellular salt content decrease is based on comparing the processed organic-carbon-containing feedstock before it is passed through the heating sub-system to the unprocessed organic-carbon-containing feedstock because the heating process can lower the wt of the solid biomass on a dry basis as some is converted to biooils and biogases and removed as discussed below under the heating subsystem section. The processed biochar is made from unprocessed organic-carbon-containing feedstock that is converted into a processed organic-carbon-containing feedstock in a beneficiation sub-system, and that is then passed through an oxygen-deprived thermal sub-system. As used in this document, processed biochar is the solid product of the devolatization of beneficiated organic-carbon-containing feedstock. Organic-carbon-containing feedstock used to make the processed biochar of the invention can contain mixtures of more than one renewable feedstock.

Other forms of char are also known. Some of these chars include, for example, char made by the pyrolysis of biomass, also known as charcoal. Charcoal has an energy density of about 26 MMBTU/ton (30 GJ/MT) and contains all of the water-soluble salt residues found in the starting biomass used to make the charcoal. Charcoal has various uses including, for example, a combustible fuel for generating heat for cooking and heating, as well as a soil amendment to supply minerals for fertilizing soils used for growing agricultural and horticultural products. Char has also been made by passing biomass through an open microwave oven similar to a bacon cooker that is exposed to the external atmosphere containing oxygen and contains pores with a variance similar to that made by a thermal process that has a liquid phase.

In contrast, the processed biomass component of high energy aggregates of the invention is cleaner than coal. The impurities discussed above are not present in any significant amount. In particular, processed biomass contains substantially no sulfur. Some embodiments have a sulfur content of less than 1000 mg/kg (0.1 wt %)) or less than 1000 parts per million (ppm), some of less than 100 mg/kg (100 ppm, some of less than 10 mg/kg (10 ppm). In contrast coal has significantly more sulfur. The sulfur content in coal ranges of from 4000 mg/kg (0.4 wt %) to 40,000 mg/kg, (4 wt %) and varies with type of coal. The typical sulfur content in anthracite coal is from 6000 mg/kg (0.6 wt %) to 7700 mg/kg (0.77 wt %). The typical sulfur content in bituminous coal is from 7000 mg/kg (02 wt %) to 40,000 mg/kg (4 wt %). The typical sulfur content in lignite coal is about 4000 mg/kg (0.4 wt %). Anthracite coal is too expensive for extensive use in burning. Lignite is poor quality coal, with a low energy density or BTU/wt.

In addition, processed biomass has substantially no nitrate, arsenic, mercury or uranium. Some embodiments haw a nitrate content of less than 500 mg/kg (500 ppm), some of less than 150 mg/kg (150 ppm), versus a nitrate content in coal of typically over 20,000 mg·kg (2 wt %). Some embodiments have a arsenic content of less than 2 mg/kg (2 ppm), some of less than 1 mg/kg (1 ppm), some less than 0.1 mg/kg or 100 parts per billion (ppb), and some less than 0.01 mg/kg (10 ppb) versus a arsenic content in coal of from over 1 mg/kg to over 70 mg/kg (1 ppm to 70 ppm). Some embodiments have a mercury content that is negligible, i. e., less than 1 microgram/kg, (1 ppb), versus mercury content in coal of from 0.02 mg/kg (20 ppb) to 0.3 mg/kg (300 ppb). Similarly, some embodiments have a uranium content that is also negligible, i. e., less than 1 microgram/kg, (1 ppb), versus a uranium content in coal of from 20 mg/kg (20 ppm) to 315 mg/kg (315 ppm) with an average of about 65 mg/kg (ppm) and the uranium content in the ash from the coal with an average of about 210 mg/kg (210 ppm).

Other forms of char are also known. Some of these chars include, for example, char made by the pyrolysis of biomass, also known as charcoal. Charcoal has an energy density of about 26 MMBTU/ton (30 GJ/MT) and contains all of the water-soluble salt residues found in the starting biomass used to make the charcoal. Charcoal has various uses including, for example, a combustible fuel for generating heat for cooking and heating, as well as a soil amendment to supply minerals for fertilizing soils used for growing agricultural and horticultural products. Char has also been made by passing biomass through an open microwave oven similar to a bacon cooker that is exposed to the external atmosphere containing oxygen and contains pores with a variance similar to that made by a thermal process that has a liquid phase.

In biochar made by thermal heat or infrared radiation, the heat is absorbed on the surface of any organic-carbon-containing feedstock and then is re-radiated to the next level at a lower temperature. This process is repeated over and over again until the thermal radiation penetrates to the inner most part of the feedstock. All the material in the feedstock absorbs the thermal radiation at its surfaces and different materials that make up the feedstock absorb the IR at different rates. A delta temperature of several orders of magnitude can exist between the surface and the inner most layers or regions of the feedstock. As a result, the solid organic-carbon-containing feedstock locally passes through a liquid phase before it is volatilized. This variation in temperature may appear in a longitudinal direction as well as radial direction depending on the characteristics of the feedstock, the rate of heating, and the localization of the heat source. This variable heat transfer from the surface to the interior of the feedstock can cause cold and hot spots, thermal shocks, uneven surface and internal expansion cracks, fragmentation, eject surface material and create aerosols. All of this can result in microenvironments that cause side reactions with the creation of many different end products. These side reactions are not only created in the feedstock but also in the volatiles that evaporate from the feedstock and occupy the vapor space in the internal reactor environment before being collected.

A common thermal process, pyrolysis, produces biochar, liquids, and gases from biomass by heating the biomass in a low/no oxygen environment. The absence of oxygen prevents combustion. Typical yields are 60% bio-oil, 20% biochar, and 20% volatile organic gases. High temperature pyrolysis in the presence of stoichiometric oxygen is known as gasification, and produces primarily syngas. By comparison, slow pyrolysis can produce substantially more char, on the order of about 50%.

Another thermal process is a sublimation process that produces biochar and gases from biomass in a low/no oxygen environment. The absence of oxygen also prevents combustion. Typical yields are 70% fuel gas and 30% biochar. Sublimation can occur in a vertical manner that lends itself to heavier/denser biomass feedstock such as, for example, wood and a horizontal manner that lends itself to lighter/less dense biomass feedstock such as, for example, wheat straw.

An alternative to thermal processes, the process to make char by microwave radiation uses heat that is absorbed throughout the organic-carbon-containing feedstock. The process uses microwave radiation from the oxygen-starved microwave process system. With microwave radiation, the solid part of the feedstock is nearly transparent to the microwave radiation and most of the microwave radiation just passes through. In contrast to the small absorption cross section of the solid feedstock, gaseous and liquid water strongly absorb the microwave radiation increasing the rotational and torsional vibrational energy of the water molecules. Therefore, the gaseous and liquid water that is present is heated by the microwaves, and these water molecules subsequently indirectly heat the solid feedstock. Thus any feedstock subjected to the microwave radiation field is exposed to the radiation evenly, inside to outside, no matter what the physical dimensions and content of the feedstock. With microwaves, the radiation is preferentially absorbed by water molecules that heat up. This heat is then transferred to the surrounding environment resulting in the feedstock being evenly and thoroughly heated.

In all of the above processes, water-soluble salt that is in all renewable organic-carbon-containing feedstock is not removed This has the adverse effect of increasing ash content in combusted char and increasing wear and maintenance costs from corrosion and slagging, a deposition of a viscous residue of impurities during combustion. In contrast, the process to make the processed biochar of the invention used a beneficiation sub-system to process the unprocessed organic-carbon-containing feedstock to remove most of the water and water-soluble salts, and an oxygen-deficient thermal sub-system to convert the processed organic-carbon-containing feedstock into a processed biochar.

In contrast, the processed biochar of an embodiment of the invention contains much less water-soluble salt than that of currently known biochar. The oxygen-deficient thermal sub-system of the invention are similar to those discussed above but use a processed organic-carbon-containing feedstock rather than an unprocessed organic-carbon-containing feedstock used by the above oxygen-deficient thermal processes mentioned above.

Co-firing Streams of Coal and Biomass

The invention is a system and process for permitting the combustions of coal with less adverse by-products. Current plants, typically power plants, that have at least one coal combusting apparatus, are concerned about the undesirably high levels of salt in biomass feedstock that cause undesirable equipment wear if too much biomass feedstock is used to supplement coal. Often a satisfactory amount of biomass is less than 10-20 wt % of the total amount of solid fuel. By use of a novel processed biomass of the invention that may have an energy density in some embodiments that equals or exceeds that of any type of coal, a water content that is less than 20 wt %, and an intracellular salt content that is significantly less than other biomass products of similar energy, a pulverized coal stream in a coal combusting apparatus may now be diluted with a stream of pulverized processed biomass at any ratio from 1 to 9 to 9 to 1 on a wt % basis. In some embodiments the ratio of the coal stream to the processed biomass stream on a wt basis is at least 1:9, in some at least 2:8, in some at least 3:7, in some at least 4:6, in some at least 5:5, in some at least 6:4, in some at least 7:3, in some at least 8:2, and in some at least 9:1. This may be done without the adverse effects of salt from conventional high energy biomass. In addition, in the invention, the coal in the coal stream comprises un-cleaned coal that has been passed through a coal cleaning sub-system and blended with processed biomass to form blended aggregates that have a weight ratio of cleaned coal to processed biomass of from 1 to 9 to 9 to 1. The energy density of the aggregate may be predetermined by selection of the un-cleaned coal that is used and the conditions chosen to make the processed biomass. Many embodiments of the aggregate have an energy density that is similar to that of the coal component or higher than that component if desired. In some embodiments the ratio of the coal to the processed biomass in the blended aggregate on a wt basis is at least 1:9, in some at least 2:8, in some at least 3:7, in some at least 4:6, in some at least 5:5, in some at least 6:4, in some at least 7:3, in some at least 8:2, and in some at least 9:1. This invention also provides a productive use of coal fines from coal mines that currently are difficult to transport because of the potential for explosions.

As stated above, the invention uses blended aggregates of cleaned coal and processed biomass in the first chamber of the coal combusting apparatus with significantly cleaner fuel for use in such processes as boilers without a commonly associated reduction in energy density.

Use of processed biomass with processed biomass/ cleaned coal blended compact aggregate have several improved characteristics when compared to a conventional stream of biomass with or without a biomass/coal blended compact aggregate made with unprocessed organic-carbon-containing feedstock. First, the processed biomass/cleaned coal blended compact aggregate contains significantly less salt than that produced from current processes that use similar unprocessed organic-carbon-containing feedstock. The salt in the processed organic-carbon-containing feedstock and thus in the resulting processed biomass is reduced by at least 60 wt % on a dry basis for the processed organic-carbon-containing feedstock from that of the salt content of the unprocessed organic-carbon-containing feedstock. The reduction in salt content is based on a comparison between processed organic-carbon-containing feedstock on a dry basis and unprocessed organic-carbon-containing feedstock on a dry basis. After the subsequent heating step to convert processed organic-carbon-containing feedstock into processed biochar, the salt content is not further changed but the total solids on a dry basis are reduced by some percentage because some of the solids of the processed organic-carbon-containing feedstock are being converted into liquid or gas phases. Another effect of the salt reduction between the processed and unprocessed organic-carbon-containing feedstock is that the fixed carbon of the resulting processed biochar of some embodiments is higher and the ash content is lower because there is less salt that forms ash during subsequent combustion of the biochar in a boiler. In addition, the adverse effect of salt in the boiler is reduced, wear is slower, and maintenance cleaning of the equipment is less often and less arduous.

Second, the processed biomass with coal or with processed biomass/cleaned coal blended compact aggregate have a high energy density, approaching that of the high energy coal component of at least 21 MMBTU/ton (24 GJ/MT). They also have similar or higher energy densities than that of low energy coal. The energy density of the processed biomass is at least 17 MMBTU/ton (20 GJ/MT) with some embodiments being at least 21 MMBTU/ton (24 GJ/MT). Some embodiments have an energy density of at least 23 MMBTU/ton (27 GJ/MT), some at least 26 MMBTU/ton (30 GJ/MT), some at least 28 MMBTU/ton (33 GJ/MT), some at least 30 MMBTU/ton (35 GJ/MT), and some at least 31 MMBTU/ton (36 GJ/MT). In contrast, the energy density of unprocessed biochar made with oxygen deficient heating of unprocessed organic-carbon-containing feedstock is often between 10 MMBTU/ton (12 GJ/MT) and 12 MMBTU/ton (14 GJ/MT).

Third, the processed biomass with coal or with processed biomass/cleaned coal blended compact aggregate can contain significantly less pollutants associated with coal by itself depending on the content of the processed biomass used in the aggregate. This processed aggregate contains little if any pollutants normally associated with coal. These pollutants associated with coal include, for example, mercury (neurotoxin), arsenic (carcinogen), and SxOy when the coal is combusted. Processed biomass contains less than 0.1 wt % of any one of the above impurities, some embodiments contain less than 0.01 wt %, some less than 0.001 wt %, some less than 0.0001 wt %. In addition, the cleaned coal has a concentration of sulfur that is at least 50 wt % less than that of the un-cleaned coal that entered the coal cleaning subsystem of the invention. In some embodiment, there also is a significant reduction in minerals and paramagnetic impurities found in un-cleaned coal.

Fourth, in embodiments with processed biomass/cleaned coal blended compact aggregate in the coal stream, higher levels of processed biomass can be blended with coal fines to permit a variety of scenarios depending on what is desired. Because of the lower salt content and higher energy density of the processed biomass, coal biomass blends that contain at least 10 wt % biomass are now possible with energy densities approximating or exceeding that of the coal component and with substantially reduced levels of intracellular salt from the biomass component. In some embodiments, the biomass content is at least 20 wt %, in some at least 30 wt %, in some at least 40 wt %, in some at least 50 wt %, in some at least 60 wt %, in some at least 70 wt %, and in some at least 80 wt %. Similarly, because of the low salt content and high energy density of the processed biomass, it is now possible to safely transport coal fines in blends that contain at least 10 wt % coal. In some embodiments, the coal content is at least 20 wt %, in some at least 30 wt %, in some at least 40 wt %, in some at least 50 wt %, in some at least 60 wt %, in some at least 70 wt %, and in some at least 80 wt %. This permits coal fines to be safely used in commerce as a fuel source for such processes as heating boilers. It also permits a significant portion of the blend to be renewable solid fuel without a sacrifice of cleanliness of materials or energy density associated with current blends of unprocessed biomass and coal.

In some embodiments of the inventions, organic-carbon-containing feedstock used to make the processed biomass/cleaned coal blended compact aggregate of the invention can contain mixtures of more than one renewable feedstock when the processed organic-carbon-containing feedstock is made to have substantially uniform energy densities regardless of the type of organic-carbon-containing feedstock used.

Unprocessed Organic-Carbon-Containing Feedstock

Cellulose bundles, interwoven by hemicellulose and lignin polymer strands, are the stuff that makes plants strong and proficient in retaining moisture. Cellulose has evolved over several billion years to resist being broken down by heat, chemicals, or microbes. In a plant cell wall, the bundles of cellulose molecules in the microfibrils provide the wall with tensile strength. The tensile strength of cellulose microfibrils is as high as 110 kg/mm$^2$, or approximately 2.5 times that of the strongest steel in laboratory conditions. When cellulose is wetted, as in the cell walls, its tensile strength declines rapidly, significantly reducing its ability to provide mechanical support. But in biological systems, the cellulose skeleton is embedded in a matrix of pectin, hemicellulose, and lignin that act as waterproofing and strengthening material. That makes it difficult to produce fuels from renewable cellulose-containing biomass fast enough, cheap enough, or on a large enough scale to make economical sense. As used herein, organic-carbon-containing material means renewable plant-containing material that can be renewed in less than 50 years and includes plant material such as, for example herbaceous materials such as grasses, energy crops, and agricultural plant waste; woody materials such as tree parts, other woody waste, and discarded items made from wood such as broken furniture and railroad ties; and animal material containing undigested plant cells such as animal manure. Organic-carbon-containing material that is used as a feedstock in a process is called an organic-carbon-containing feedstock Unprocessed organic-carbon-containing material, also referred to as renewable biomass, encompasses a wide array of organic materials as stated above. It is estimated that the U.S. alone generates billions of tons of organic-carbon-containing material annually. As used in this document, beneficiated organic-carbon-containing feedstock is processed organic-carbon-containing feedstock where the moisture content has been reduced, a significant amount of dissolved salts have been removed, and the energy density of the material has been increased. This processed feedstock can be used as input for processes that make several energy-producing products, including, for example, liquid hydrocarbon fuels, solid fuel to supplant coal, and synthetic natural gas.

As everyone in the business of making organic-carbon-containing feedstock is reminded, the energy balance is the metric that matters most. The amount of energy used to beneficiate organic-carbon-containing feedstock and, thus, the cost of that energy must be substantially offset by the overall improvement realized by the beneficiation process in the first place. For example, committing 1000 BTU to improve the heat content of the processed organic-carbon-containing feedstock by 1000 BTU, all other things being equal, does not make economic sense unless the concurrent removal of a significant amount of the water-soluble salt renders previously unusable organic-carbon-containing feedstock usable as a fuel substitute for some processes such as boilers.

As used herein, organic-carbon-containing feedstock comprises free water, intercellular water, intracellular water, intracellular water-salts, and at least some plant cells comprising cell walls that include lignin, hemicellulose, and cellulosic microfibrils within fibrils. In some embodiments, the water-soluble salt content of the unprocessed organic-carbon-containing feedstock is at least 4000 mg/kg on a dry basis. In other embodiments the salt content may be more than 1000 mg/kg, 2000 mg/kg, or 3000 mg/kg. The content is largely dependent on the soil where the organic-carbon-containing material is grown. Regions that are land rich and more able to allow land use for growing energy crops in commercial quantities often have alkaline soils that result in organic-carbon-containing feedstock with water-soluble salt content of over 4000 mg/kg.

Water-soluble salts are undesirable in processes that use organic-carbon-containing feedstock to create fuels. The salt tends to shorten the operating life of equipment through corrosion, fouling, or slagging when combusted. Some boilers have standards that limit the concentration of salt in fuels to less than 1500 mg/kg. This is to find a balance between availability of fuel for the boilers and expense of frequency of cleaning the equipment and replacing parts. If economical, less salt would be preferred. In fact, salt reduction through beneficiation is an enabling technology for the use of salt-laden biomass (e.g. hogged fuels, mesquite, and pinyon-junipers) in boilers. Salt also frequently poisons catalysts and inhibits bacteria or enzyme use in processes used for creating beneficial fuels. While some salt concentration is tolerated, desirably the salt levels should be as low as economically feasible.

The water-soluble salt and various forms of water are located in various regions in plant cells. As used herein, plant cells are composed of cell walls that include microfibril bundles within fibrils and include intracellular water and intracellular water-soluble salt. FIG. 1 is a diagram of a typical plant cell with an exploded view of a region of its cell wall showing the arrangement of fibrils, microfibrils, and cellulose in the cell wall. A plant cell (100) is shown with a section of cell wall (120) magnified to show a fibril (130). Each fibril is composed of microfibrils (140) that include strands of cellulose (150). The strands of cellulose pose some degree of ordering and hence crystallinity.

Figure 2:
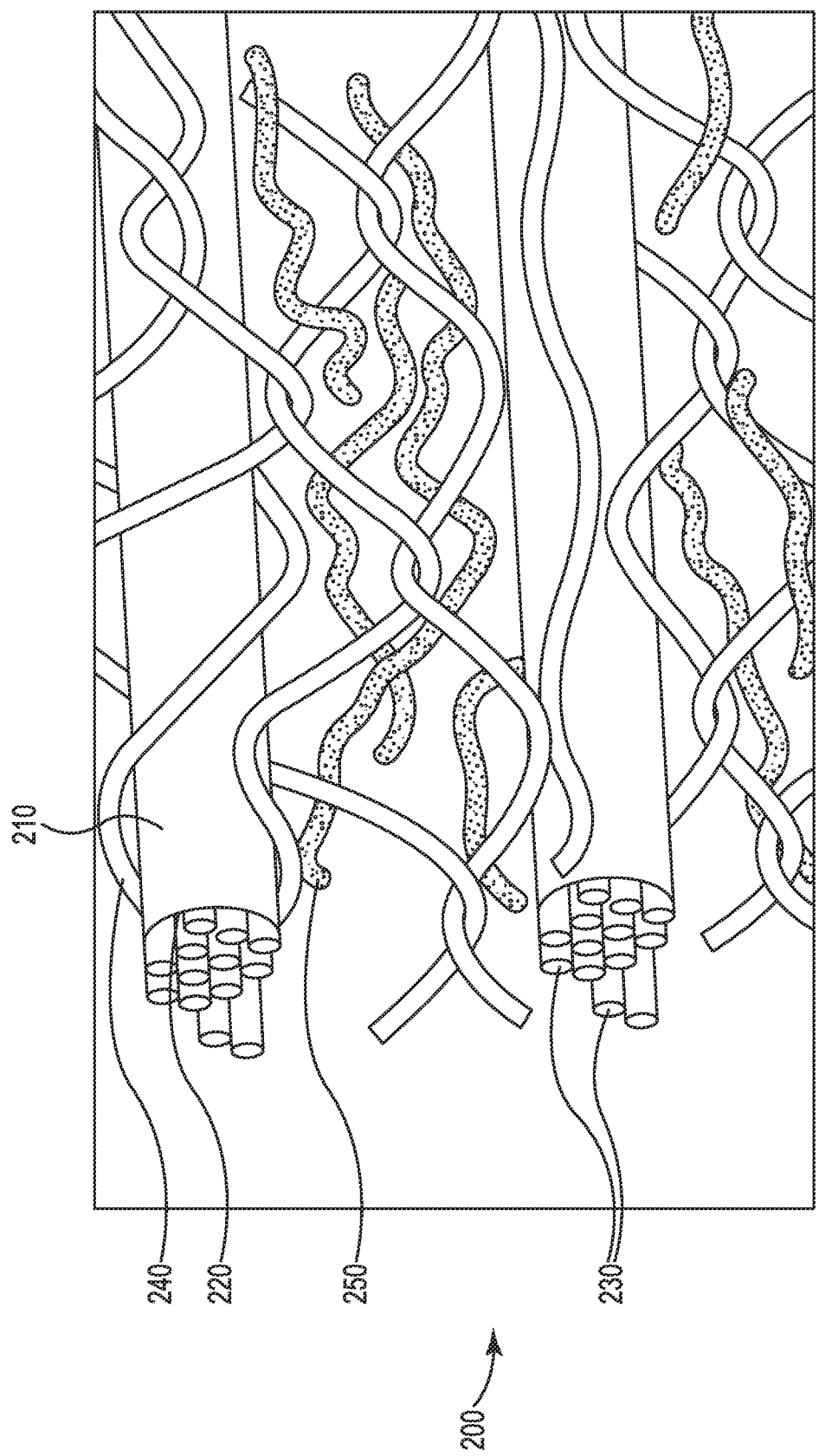
FIG. 2 is a diagram of a perspective side view of a part of two fibrils in a secondary plant cell wall showing fibrils containing microfibrils and connected by strands of hemicellulose and lignin

Plant cells have a primary cell wall and a secondary cell wall. The secondary cell wall varies in thickness with type of plant and provides most of the strength of plant material. FIG. 2 is a diagram of a perspective side view of a part of two fibrils bundled together in a secondary plant cell wall showing the fibrils containing microfibrils and connected by strands of hemicellulose, and lignin. The section of plant cell wall (200) is composed of many fibrils (210). Each fibril 210 includes a sheath (220) surrounding an aggregate of cellulosic microfibrils (230). Fibrils 210 are bound together by interwoven strands of hemicellulose (240) and lignin (250). In order to remove the intracellular water and intracellular water-soluble salt, sections of cell wall 200 must be punctured by at least one of unbundling the fibrils from the network of strands of hemicellulose 240 and lignin 250, decrystallizing part of the strands, or depolymerizing part of the strands.

The plant cells are separated from each other by intercellular water. An aggregate of plant cells are grouped together in plant fibers, each with a wall of cellulose that is wet on its outside with free water also known as surface moisture. The amount of water distributed within a specific organic-carbon-containing feedstock varies with the material. As an example, water is distributed in fresh bagasse from herbaceous plants as follows: about 50 wt % intracellular water, about 30 wt % intercellular water, and about 20 wt % free water. Bagasse is the fibrous matter that remains after sugarcane or sorghum stalks are crushed to extract their juice.

Figure 3:
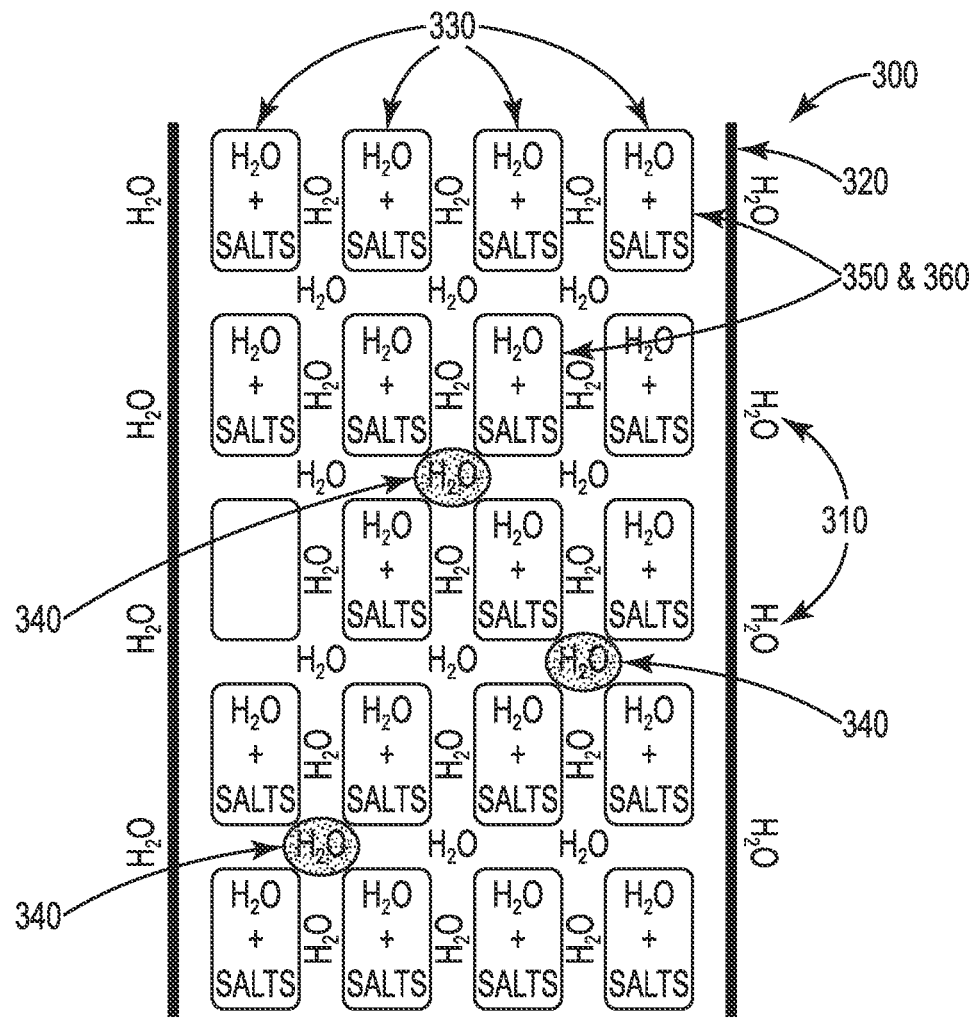
FIG. 3 is a diagram of a cross-sectional view of a section of bagasse fiber showing where water and water-soluble salts reside inside and outside plant cells.

FIG. 3 is diagram of a cross-sectional view of a fiber section of bagasse showing where water and water-soluble salts reside inside and outside plant cells. A fiber with an aggregate of plant cells (300) is shown with surface moisture (310) on the outer cellulosic wall (320). Within fiber 300 lays individual plant cells (330) separated by intercellular water (340). Within each individual plant cell 330 lays intracellular water (350) and intracellular water-soluble salt (360).

Conventional methods to beneficiate organic-carbon-containing feedstock include thermal processes, mechanical processes, and physiochemical processes. Thermal methods include heat treatments that involve pyrolysis and torrefaction. The thermal methods do not effectively remove entrained salts and only serve to concentrate them. Thus thermal processes are not acceptable for the creation of many energy creating products such as organic-carbon-containing feedstock used as a fuel substitute to the likes of coal and petroleum. Additionally, all conventional thermal methods are energy intensive, leading to an unfavorable overall energy balance, and thus economically limiting in the commercial use of organic-carbon-containing feedstock as a renewable source of energy.

The mechanical method, also called pressure extrusion or densification, can be divided into two discrete processes where water and water-soluble salts are forcibly extruded from the organic-carbon-containing material. These two processes are intercellular and intracellular extrusion. The extrusion of intercellular water and intercellular water-soluble salt occurs at a moderate pressure, depending upon the freshness of the organic-carbon-containing material, particle size, initial moisture content, and the variety of organic-carbon-containing material. Appropriately sized particles of freshly cut herbaceous organic-carbon-containing feedstock with moisture content between 50 wt % and 60 wt % will begin extruding intercellular moisture at pressures as low as 1,000 psi and will continue until excessive pressure forces the moisture into the plant cells (essentially becoming intracellular moisture).

As the densification proceeds, higher pressures, and hence higher energy costs, are required to try to extrude intracellular water and intracellular water-soluble salt. However, stiff cell walls provide the biomass material with mechanical strength and are able to withstand high pressures without loss of structural integrity. In addition, the formation of impermeable felts more prevalent in weaker cell walled herbaceous material has been observed during compaction of different herbaceous biomass materials above a threshold pressure. This method is energy intensive. In addition, it can only remove up to 50 percent of the water-soluble salts on a dry basis (the intracellular salt remains) and is unable to reduce the remaining total water content to below 30 wt percent.

The felts are formed when long fibers form a weave and are bound together by very small particles of pith. Pith is a tissue found in plants and is composed of soft, spongy parenchyma cells, which store and transport water-soluble nutrients throughout the plant. Pith particles can hold 50 times their own weight in water. As the compression forces exerted during the compaction force water into the forming felts, the entrained pith particles collect moisture up to their capacity. As a result, the moisture content of any felt can approach 90%. When felts form during compaction, regardless of the forces applied, the overall moisture content of the compacted biomass will be substantially higher than it would have been otherwise had the felt not formed. The felt blocks the exit ports of the compaction device as well as segments perpendicular to the applied force, and the water is blocked from expulsion from the compaction device. The felt also blocks water passing through the plant fibers and plant cells resulting in some water passing back through cell wall pores into some plant cells. In addition, it can only remove up to 50 percent of the water-soluble salts on a dry basis and is unable to reduce more than the water content to below 30 wt percent.

The physiochemical method involves a chemical pretreatment of organic-carbon-containing feedstock and a pressure decompression prior to compaction to substantially improve the quality of densified biomass while also reducing the amount of energy required during compaction to achieve the desired bulk density. Chemically, biomass comprises mostly cellulose, hemicellulose, and lignin located in the secondary cell wall of relevant plant materials. The strands of cellulose and hemicellulose are cross-linked by lignin, forming a lignin-carbohydrate complex (LCC). The LCC produces the hydrophobic barrier to the elimination of intracellular water. In addition to the paper pulping process that solubilizes too much of the organic-carbon-containing material, conventional pre-treatments include acid hydrolysis, steam explosion, AFEX, alkaline wet oxidation, and ozone treatment. All of these processes, if not carefully engineered, can be can be expensive on a cost per product weight basis and are not designed to remove more than 25% water-soluble salt on a dry weight basis.

In addition, the energy density generally obtainable from an organic-carbon-containing material is dependent on its type, i.e., herbaceous, soft woody, and hard woody. Also mixing types in subsequent uses such as fuel for power plants is generally undesirable because the energy density of current processed organic-carbon-containing feedstock varies greatly with type of plant material.

As stated above, plant material can be further subdivided in to three sub classes, herbaceous, soft woody and hard woody, each with particular water retention mechanisms. All plant cells have a primary cell wall and a secondary cell wall. As stated earlier, the strength of the material comes mostly from the secondary cell wall, not the primary one. The secondary cell wall for even soft woody materials is thicker than for herbaceous material.

Herbaceous plants are relatively weak-walled plants, include corn, and have a maximum height of less than about 10 to 15 feet (about 3 to 5 meters (M)). While all plants contain pith particles, herbaceous plants retain most of their moisture through a high concentration of pith particles within the plant cells that hold water like balloons because these plants have relatively weak cell walls. Pressure merely deforms the balloons and does not cause the plant to give up its water. Herbaceous plants have about 50% of their water as intracellular water and have an energy density of unprocessed material at about 5.2 million BTUs per ton (MMBTU/ton) or 6 Gigajoules per metric ton (GJ/MT).

Soft woody materials are more sturdy plants than herbaceous plants. Soft woody materials include pines and typically have a maximum height of between 50 and 60 feet (about 15 and 18 M). Their plant cells have stiffer walls and thus need less pith particles to retain moisture. Soft woody materials have about 50% of their water as intracellular water and have an energy density of about 13-14 MMBTU/ton (15-16 GJ/MT).

Hard woody materials are the most sturdy of plants, include oak, and typically have a maximum height of between 60 and 90 feet (18 and 27 M). They have cellulosic plant cells with the thickest secondary cell wall and thus need the least amount of pith particles to retain moisture. Hard woody materials have about 50% of their water as intracellular water and have an energy density of about 15 MMBTU/ton (17 GJ/MT).

There is a need in the energy industry for a system and method to allow the energy industry to use organic-carbon-containing material as a commercial alternative or adjunct fuel source. Much of the land available to grow renewable organic-carbon-containing material on a commercial scale also results in organic-carbon-containing material that has a higher than desired content of water-soluble salt that typically is at levels of at least 4000 mg/kg. Forest products in the Pacific Northwest are often transported via intracoastal waterways, exposing the biomass to salt from the ocean. Thus such a system and method must be able to remove sufficient levels of water-soluble salt to provide a suitable fuel substitute. As an example, boilers generally need salt contents of less than 1500 mg/kg to avoid costly maintenance related to high salt in the fuel. In addition, the energy and resulting cost to remove sufficient water to achieve an acceptable energy density must be low enough to make the organic-carbon-containing material feedstock a suitable alternative in processes to make coal or hydrocarbon fuel substitutes.

There is also a need for a process that can handle the various types of plants and arrive at processed organic-carbon-containing feedstock with similar energy densities.

The invention disclosed does allow the energy industry to use processed organic-carbon-containing material as a commercial alternative fuel source. Some embodiments of the invention remove almost all of the chemical contamination, man-made or natural, and lower the total water content to levels in the range of 5 wt % to 15 wt %. This allows the industries, such as the electric utility industry to blend the organic-carbon-containing feedstock on a ratio of up to 50 wt % processed organic-carbon-containing feedstock to 50 wt % coal with a substantial reduction in the amount of water-soluble salt and enjoy the same MMBTU/ton (GJ/MT) efficiency as coal at coal competitive prices. Literature has described organic-carbon-containing feedstock to coal ratios of up to 30%. A recent patent application publication, EP2580307 A2, has described a ratio of up to 50% by mechanical compaction under heat, but there was no explicit reduction in water-soluble salt content in the organic-carbon-containing feedstock. The invention disclosed herein explicitly comprises substantial water-soluble salt reduction through a reaction chamber with conditions tailored to each specific unprocessed organic-carbon-containing feedstock used. As discussed below, additional purposed rinse subsections and subsequent pressing algorithms in the compaction section of the Reaction Chamber may be beneficial to process organic-carbon-containing feedstock that has a particularly high content of water-soluble salt so that it may be used in a blend with coal that otherwise would be unavailable for burning in a coal boiler. This also includes, for example, hog fuel, mesquite, and Eastern red cedar.

In addition, the invention disclosed does permit different types of organic-carbon-containing feedstock to be processed, each at tailored conditions, to result in processed outputs having preselected energy densities. In some embodiments of the invention, more than one type of feedstock with different energy densities that range from 5.2 to 14 MMBTU/ton (6 to 16 GJ/MT) may be fed into the reaction chamber in series or through different reaction chambers in parallel. Because each type of organic-carbon-containing feedstock is processed under preselected tailored conditions, the resulting processed organic-carbon-containing feedstock for some embodiments of the system of the invention can have a substantially similar energy density. In some embodiments, the energy density is about 17 MMBTU/ton (20 GJ/MT). In others it is about 18, 19, or 20 MMBTU/ton (21, 22, or 23 GJ/MT). This offers a tremendous advantage for down-stream processes to be able to work with processed organic-carbon-containing feedstock having similar energy density regardless of the type used as well as substantially reduced water-soluble content.

The process of the invention uses a beneficiation sub-system to create the processed organic-carbon-containing feedstock that is a clean economical material to be used for creating a satisfactory processed biomass/cleaned coal blended compact aggregate from renewable biomass, an optional heating sub-system, and a blending subsystem for converting the processed organic-carbon-containing feedstock and coal into the processed biomass/cleaned coal blended compact aggregate of the invention. The first subsystem will now be discussed.

Beneficiation Sub-System

The beneficiation sub-system is used to make processed organic-carbon-containing feedstock comprises at least three elements, a transmission device, at least one reaction chamber, and a collection device. As used in this document, the beneficiation sub-system refers to the system that is used to convert unprocessed organic-carbon-containing feedstock into processed organic-carbon-containing feedstock.

The first element, the transmission device, is configured to convey into a reaction chamber unprocessed organic-carbon-containing feedstock comprising free water, intercellular water, intracellular water, intracellular water-soluble salt, and at least some plant cells comprising cell walls that include lignin, hemicellulose, and cellulosic microfibrils within fibrils. The transmission device may be any that is suitable to convey solid unprocessed organic-carbon-containing feedstock into the reaction chamber to obtain a consistent residence time of the feedstock in the reaction chamber. The transmission devices include such devices at augers that are well known in the chemical industry.

Particle size of the unprocessed organic-carbon-containing feedstock should be sufficiently small to permit a satisfactorily energy balance as the unprocessed organic-carbon-containing feedstock is passed through the system to create processed organic-carbon-containing feedstock. In some embodiments, the unprocessed organic-carbon-containing feedstock arrives at some nominal size. Herbaceous material such as, for example, energy crops and agricultural waste, should have a particle size where the longest dimension is less than 1 inch (2.5 cm). Preferably, most wood and wood waste that is freshly cut should have a longest length of less than 0.5 inches (1.3 cm). Preferably, old wood waste, especially resinous types of wood such as, for example pine, has a particle size with a longest dimension of less than 0.25 inches (about 0.6 cm) to obtain the optimum economic outcome, where throughput and energy/chemical consumption are weighed together.

Some embodiments of the system may also include a mastication chamber before the reaction chamber. This mastication chamber is configured to reduce particle size of the organic-carbon-containing feedstock to less than 1 inch (2.5 cm) as the longest dimension. This allows the organic-carbon-containing feedstock to arrive with particle sized having a longest dimension larger than 1 inch (2.5 cm). In some embodiments, the longest dimension is less than 0.75 inches (1.9 cm), and in some less than 0.5 inches (1.3 cm).

Some embodiments of the system may also include a pretreatment chamber to remove contaminants that hinder creation of the passageways for intracellular water and water-soluble salts to pass from the cellulosic-fibril bundles. The chamber is configured to use for each organic-carbon-containing feedstock a particular set of conditions including time duration, temperature profile, and chemical content of pretreatment solution to at least initiate the dissolution of contaminates. The contaminants include resins, rosins, glue, and creosote. The solid slurry, including any incipient felts, may be collected for use as binders in the processed organic-carbon-containing feedstock that is the primary end product. Separated oils may be collected as a stand-alone product such as, for example, cedar oil.

The second element, the reaction chamber, includes at least one entrance passageway, at least one exit passageway, and at least three sections, a wet fibril disruption section, a vapor explosion section, and a compaction section. The first section, the wet fibril disruption section, is configured to break loose at least some of the lignin and hemicellulose between the cellulosic microfibrils in the fibril bundle to make at least some regions of cell wall more penetrable. This is accomplished by at least one of several means. The organic-carbon-containing feedstock is mixed with appropriate chemicals to permeate the plant fibrils and disrupt the lignin, hemicellulose, and LCC barriers. Additionally, the chemical treatment may also unbundle a portion of the cellulose fibrils and/or microfibrils, de-crystallizing and/or de-polymerizing it. Preferably, the chemicals are tailored for the specific organic-carbon-containing feedstock. In some embodiments, the chemical treatment comprises an aqueous solution containing a miscible volatile gas. The miscible gas may include one or more of ammonia, bicarbonate/carbonate, or oxygen. Some embodiments may include aqueous solutions of methanol, ammonium carbonate, or carbonic acid. The use of methanol, for example, may be desirable for organic-carbon-containing feedstock having a higher woody content to dissolve resins contained in the woody organic-carbon-containing feedstock to allow beneficiation chemicals better contact with the fibrils. After a predetermined residence time of mixing, the organic-carbon-containing feedstock may be steam driven, or conveyer by another means such as a piston, into the next section of the reaction chamber. In some embodiments, process conditions should be chosen to not dissolve more than 25 wt % of the lignin or hemicellulose as these are important contributors to the energy density of the processed organic-carbon-containing feedstock. Some embodiments of the system, depending on the specific organic-carbon-containing feedstock used, may have temperatures of at least 135° C., at least 165° C., or at least 180° C.; pressures of at least 260 psig, at least 280 psig, at least 375 psig, or at least 640 psig; and residence times of at least 15 minutes (min), 20 min, or 30 min.

In some embodiments, micro-particles and lignin-rich fragments suspended in the effluent is withdrawn from the reactive chamber for subsequent use. The micro particles and lignin is cleansed of water-soluble salts and other impurities as needed. The resulting slurry, often white, acts as a high energy biomass binder that is then mixed with the processed organic-carbon-containing feedstock before the pelletizing step. This reduces the need for heat during pelletizing.

The second section, the vapor explosion section, is in communication with the wet fibril disruption section. It at least is configured to volatilize plant fibril permeable fluid through rapid decompression to penetrate the more susceptible regions of the cell wall so as to create a porous organic-carbon-containing feedstock with cellulosic passageways for intracellular water and water-soluble salts to pass from the cellulosic-fibril bundles. The organic-carbon-containing feedstock is isolated, heated, pressurized with a volatile fluid comprising steam. The applied volatile chemicals and steam penetrate into the plant fibrils within the vapor explosion section due to the high temperature and pressure. After a predetermined residence time dictated by the specific organic-carbon-containing feedstock used, pressure is released rapidly from the reaction chamber by opening a fast-opening valve into an expansion chamber that may be designed to retain the gases, separate them, and reuse at least some of them in the process for increased energy/chemical efficiency. Some embodiments may have no expansion chamber where retention of gasses is not desired. Some embodiments of the system, depending on the specific organic-carbon-containing feedstock used, may have a specific pressure drop in psig of at least 230, at least 250, at least 345, or at least 600; and explosive durations of less than 500 milliseconds (ms), less than 300 ms, less than 200 ms, less than 100 ms, or less than 50 ms.

Some embodiments may include gas inlets into the wet fibril disruption section of the reaction chamber to deliver compressed air or other compressed gas such as, for example, oxygen. After delivery to the desired pressure, the inlet port would be closed and the heating for the reaction would proceed. Note that this could allow for at least one of three things: First, an increase in total pressure would make subsequent explosion more powerful. Second, an increase in oxygen content would increase the oxidation potential of the processed organic-carbon-containing feedstock where desirable. Third, a provision would be provided for mixing of organic-carbon-containing feedstock, water, and potentially other chemicals such as, for example, organic solvents, through bubbling action of gas through a perforated pipe at bottom of reaction chamber.

The net effect on the organic-carbon-containing feedstock of passing through the wet fibril disruption section and the vapor explosion section is the disruption of fibril cell walls both physically through pressure bursts and chemically through selective and minimal fibril cellulosic delinking, cellulose depolymerization and/or cellulose decrystallization. Chemical effects, such as hydrolysis of the cellulose, lignin, and hemicellulose also can occur. The resulting organic-carbon-containing feedstock particles exhibit an increase in the size and number of micropores in their fibrils and cell walls, and thus an increased surface area. The now porous organic-carbon-containing feedstock is expelled from the vapor explosion section into the next section.

The third section, the compaction section is in communication with the vapor explosion section. The compression section at least is configured to compress the porous organic-carbon-containing feedstock between pressure plates configured to minimize formation of felt that would close the reaction chamber exit passageway made to permit escape of intracellular and intercellular water, and intracellular and intercellular soluble salts. In this section, the principle process conditions for each organic-carbon-containing feedstock is the presence or absence of a raised pattern on the pressure plate, the starting water content, the processed water content, and final water content. The compaction section of the system of the invention requires a raised patterned surface on the pressure plates for feedstock comprising herbaceous plant material feedstock. However, the section may or may not require the raised pattern surface for processing soft woody or hard woody plant material feedstock depending on the specific material used and its freshness from harvest. Some embodiments of the system, depending on the specific organic-carbon-containing feedstock used, may have a starting water contents ranging from 70 to 80 wt %, from 45 to 55 wt % or from 40 to 50 wt %; and processed water content of from 4 to 15 wt % depending on actual targets desired.

The third element, the collection device, is in communication with the reaction chamber. The collection chamber at least is configured to separate non-fuel components from fuel components and to create a processed organic-carbon-containing feedstock. This feedstock has a water content of less than 20 wt % and a water-soluble salt content that is decreased by at least 60% on a dry basis. Some embodiments have the water content less than 20 wt % after allowing for surface moisture to air dry. Some embodiments have a processed organic-carbon-containing feedstock that has a water content of less than 15 wt %. Other embodiments have processed organic-carbon-containing feedstock that has a water content of less than 12 wt %, less than 10 wt %, less than 8 wt %, or less than 5 wt %. Some embodiments have a water-soluble salt content that is decreased by at least 65% on a dry basis. Other embodiments have a water-soluble salt content that is decreased by at least 70% on a dry basis, 75% on a dry basis, at least 80% on a dry basis, at least 85% on a dry basis, at least 90% on a dry basis, or at least 95% on a dry basis.

Some embodiments of the system may further include at least one rinsing subsection. This subsection is configured to flush at least some of the water-soluble salt from the porous organic-carbon-containing feedstock before it is passed to the compaction section. In some embodiments where the salt content is particularly high, such as brine-soaked hog fuel (wood chips, shavings, or residue from sawmills or grinding machine used to create it and also known as "hammer hogs"), the system is configured to have more than one rinsing subsection followed by another compaction section. The separated water, complete with dissolved water soluble salts, may be collected and treated for release into the surrounding environment or even reused in the field that is used to grow the renewable organic-carbon-containing feedstock. The salts in this water are likely to include constituents purposefully added to the crops such as fertilizer and pesticides.

Figure 4:
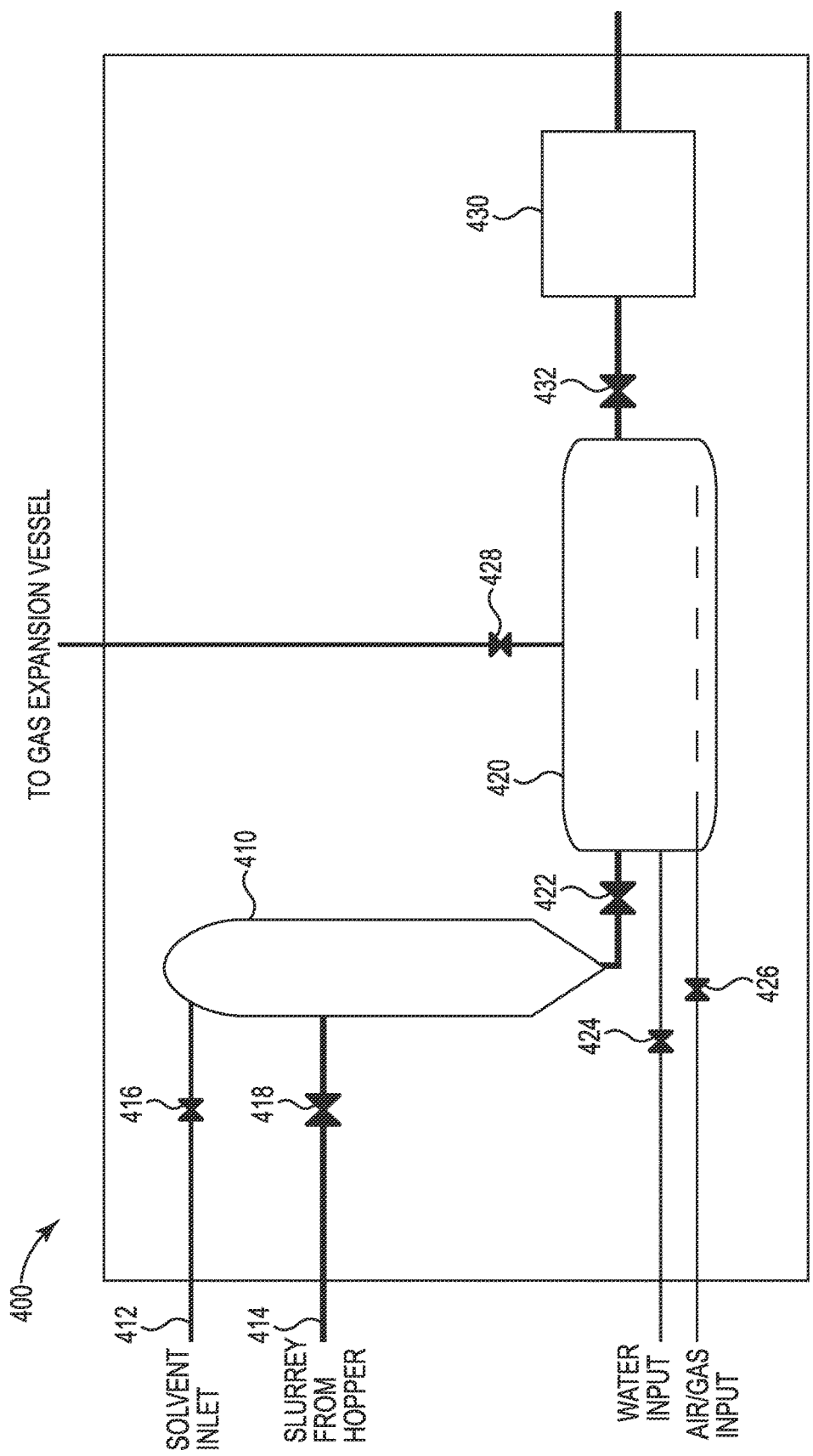
FIG. 4 is a diagram of a side view of an embodiment of a reaction chamber in a beneficiation sub-system.

The beneficiation sub-system of the invention can better be understood through depiction of several figures. FIG. 4 is a diagram of a side view of an embodiment of a reaction chamber in communication with an expansion chamber to retain gasses emitted from the decompressed carbon-containing feedstock. A reaction chamber (400) is shown with a wet fibril disruption section (410). Solvent (412) and unprocessed organic-carbon-containing feedstock (414) that has been chipped to less than 0.5 inches (1.3 cm) are fed in to wet fibril disruption section 410 through valves (416) and (418), respectively to become prepared for the next section. The pretreated organic-carbon-containing feedstock is then passed to a vapor explosion section (420) through a valve (422). Valves are used between chambers and to input materials to allow for attainment of specified targeted conditions in each chamber. Volatile expansion fluid, such as water, or water based volatile mixtures, are fed in to vapor expansion chamber 420 through a valve (424). The gas released from the porous organic-carbon-containing feedstock created during decompression is fed through a fast release valve (428) into an expansion chamber (not shown) to retain the gas for possible reuse. The compaction section (430) received the porous organic-carbon-containing feedstock through a valve (432) where the water and water-soluble salt are substantially removed from porous organic-carbon-containing feedstock and it is now processed organic-carbon-containing feedstock.

Figure 5A:
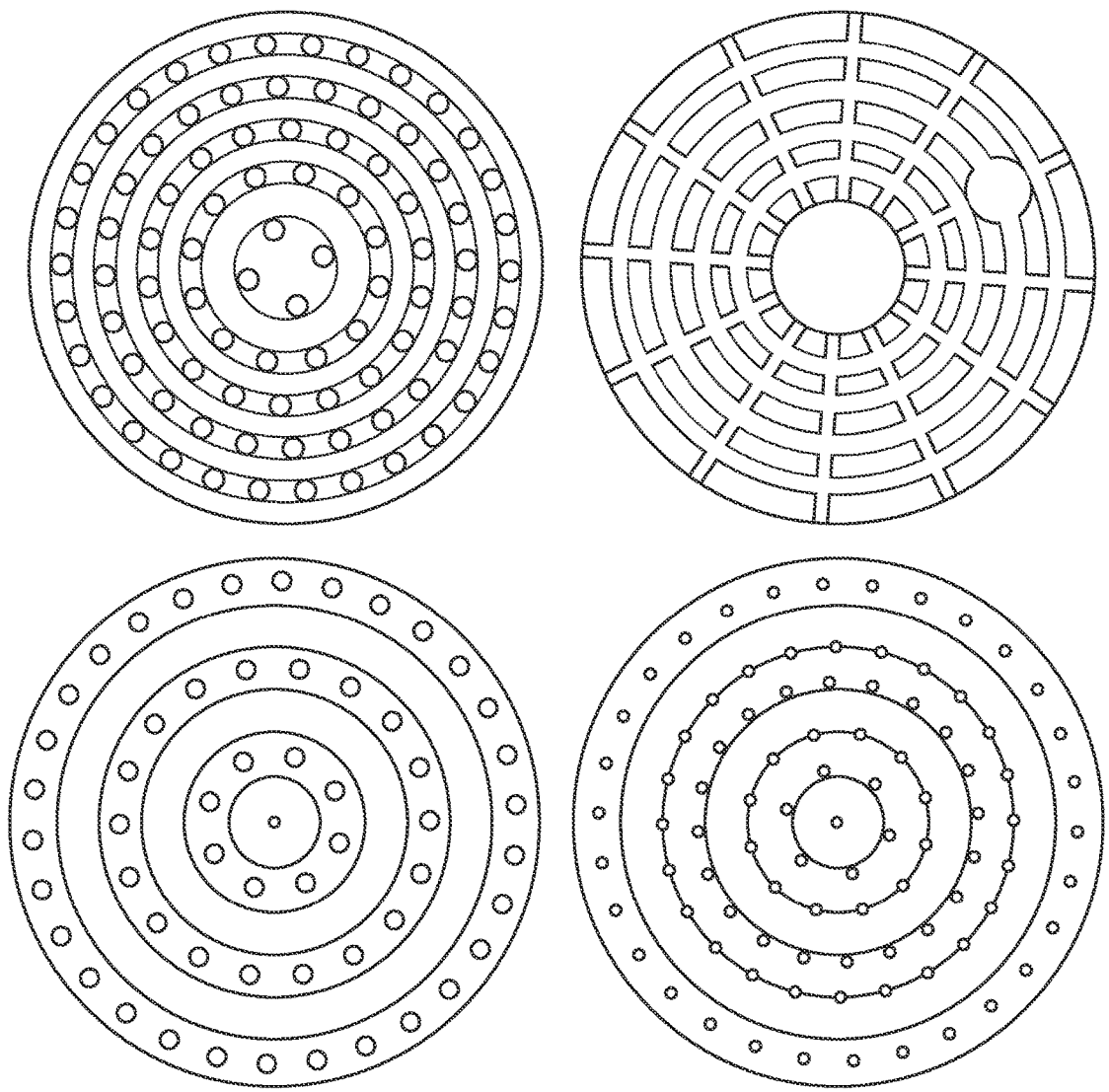
FIG. 5A is a diagram of the front views of various embodiments of pressure plates in a beneficiation sub-system.
Figure 5B:
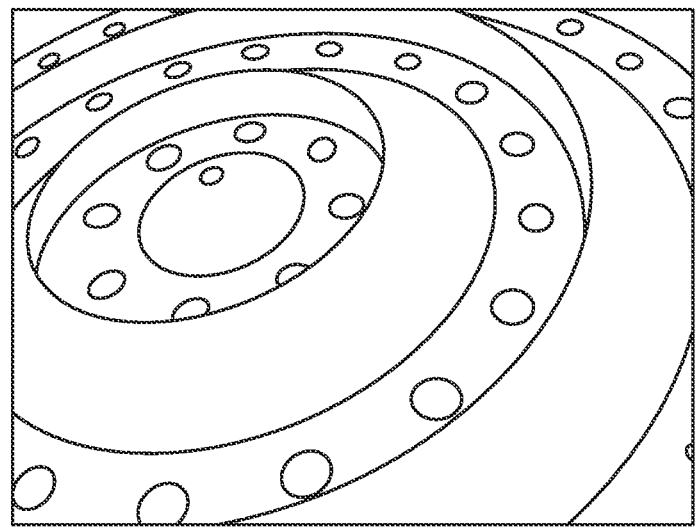
FIG. 5B is a perspective view of a close-up of one embodiment of a pressure plate shown in FIG. 5A.
Figure 5C:
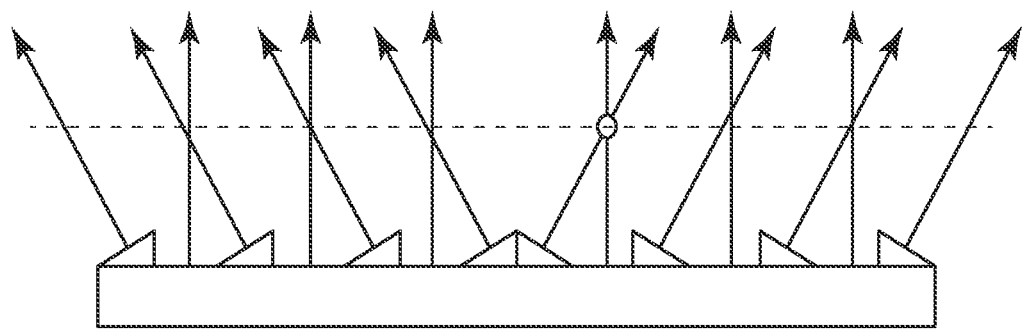
FIG. 5C is a diagram showing the cross-sectional view down the center of a pressure plate with fluid vectors and a particle of pith exposed to the fluid vectors.

As stated above, the pressure plates in the compaction section are configured to minimize felt formation. Felt is an agglomeration of interwoven fibers that interweave to form an impermeable barrier that stops water and water-soluble salts entrained in that water from passing through the exit ports of the compaction section. Additionally, any pith particles that survived the beneficiation process in the first two sections of reaction chamber can be entrained in the felt to absorb water, thereby preventing expulsion of the water during pressing. Therefore, felt formation traps a significant fraction of the water and salts from being extruded from the interior of biomass being compressed. FIGS. 5A, 5B, and 5C show embodiments of pressure plates and how they work to minimize felt formation so that water and water-soluble salts are able to flow freely from the compaction section. FIG. 5A is a diagram of the front views of various embodiments of pressure plates. Shown is the surface of the pressure plate that is pressed against the downstream flow of porous organic-carbon-containing feedstock. FIG. 5B is a perspective view of a close-up of one embodiment of a pressure plate shown in FIG. 5A. FIG. 5C is a diagram showing the cross-sectional view down the center of a pressure plate with force vectors and felt exposed to the force vectors. The upstream beneficiation process in the first two sections of the reaction chamber has severely weakened the fibers in the biomass, thereby also contributing to the minimization of felt formation.

Some embodiments achieve the processed organic-carbon-containing feedstock water content and water-soluble salt reduction over unprocessed organic-carbon-containing feedstock with a cost that is less than 60% that of the cost per weight of processed organic-carbon-containing feedstock from known mechanical, known physiochemical, or known thermal processes. In these embodiments, the reaction chamber is configured to operate at conditions tailored for each unprocessed organic-carbon-containing feedstock and the system is further engineered to re-capture and reuse heat to minimize the energy consumed to lead to a particular set of processed organic-carbon-containing feedstock properties. The reaction chamber sections are further configured as follows. The wet fibril disruption section is further configured to use fibril disruption conditions tailored for each organic-carbon-containing feedstock and that comprise at least a solvent medium, time duration, temperature profile, and pressure profile for each organic-carbon-containing feedstock. The second section, the vapor explosion section, is configured to use explosion conditions tailored for each organic-carbon-containing feedstock and that comprise at least pressure drop, temperature profile, and explosion duration to form volatile plant fibril permeable fluid explosions within the plant cells. The third section, the compaction section, is configured to use compaction conditions tailored for each organic-carbon-containing feedstock and pressure, pressure plate configuration, residence time, and pressure versus time profile.

Figure 6A:
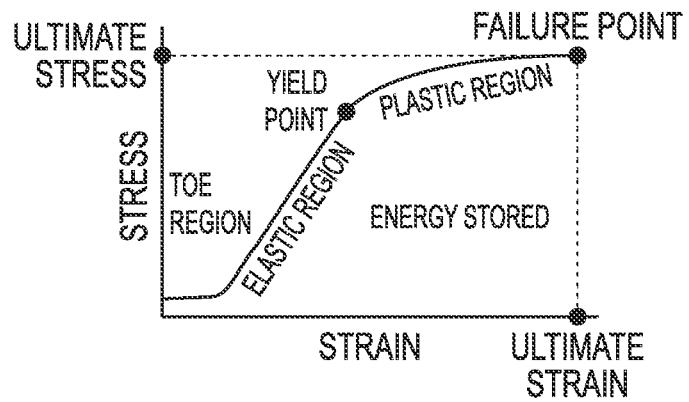
FIG. 6A is a graphical illustration of the typical stress-strain curve for lignocellulosic fibril.

The importance of tailoring process conditions to each organic-carbon-containing feedstock is illustrated by the following discussion on the viscoelastic/viscoplastic properties of plant fibrils. Besides the differences among plants in their cell wall configuration, depending on whether they are herbaceous, soft woody or hard woody, plants demonstrate to a varying degree of some interesting physical properties. Organic-carbon-containing material demonstrates both elastic and plastic properties, with a degree that depends on both the specific variety of plant and its condition such as, for example, whether it is fresh or old. The physics that governs the elastic/plastic relationship of viscoelastic/viscoplastic materials is quite complex. Unlike purely elastic substances, a viscoelastic substance has an elastic component and a viscous component. Similarly, a viscoplastic material has a plastic component and a viscous component. The speed of pressing a viscoelastic substance gives the substance a strain rate dependence on the time until the material's elastic limit is reached. Once the elastic limit is exceeded, the fibrils in the material begin to suffer plastic, i.e., permanent, deformation. FIG. 6A is a graphical illustration of the typical stress-strain curve for lignocellulosic fibril. Since viscosity, a critical aspect of both viscoelasticity and viscoelasticity, is the resistance to thermally activated deformation, a viscous material will lose energy throughout a compaction cycle. Plastic deformation also results in lost energy as observed by the fibril's failure to restore itself to its original shape. Importantly, viscoelasticity/viscoplasticity results in a molecular rearrangement. When a stress is applied to a viscoelastic material, such as a particular organic-carbon-containing feedstock, some of its constituent fibrils and entrained water molecules change position and, while doing so, lose energy in the form of heat because of friction. It is important to stress that the energy that the material loses to its environment is energy that is received from the compactor and thus energy that is expended by the process. When additional stress is applied beyond the material's elastic limit, the fibrils themselves change shape and not just position. A "visco"-substance will, by definition, lose energy to its environment in the form of heat.

Figure 6B:
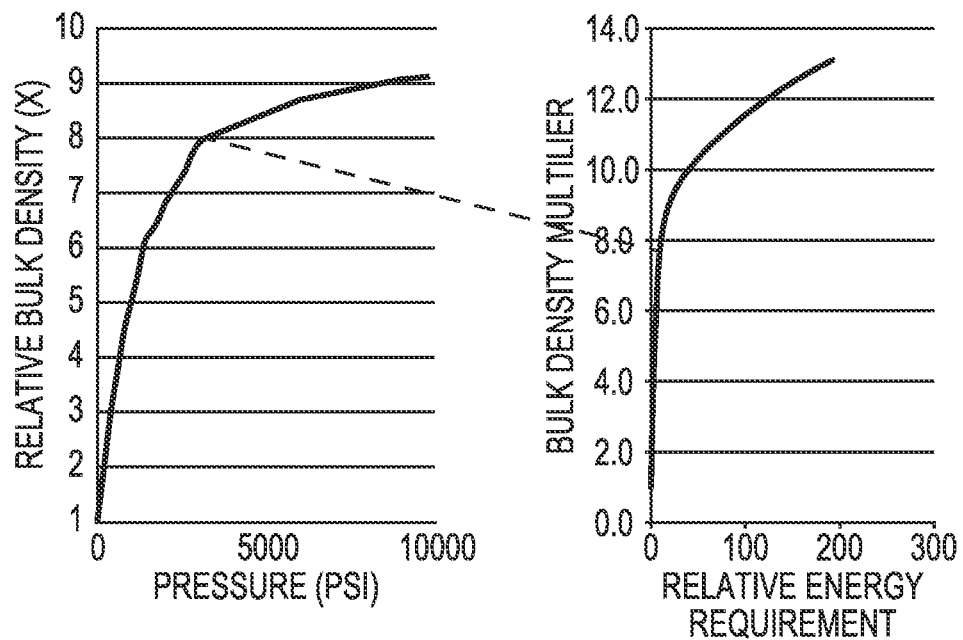
FIG. 6B is a graphical illustration of pressure and energy required to decrease the water content and increase the bulk density of typical organic-carbon-containing feedstock.

An example of how the compaction cycle is optimized for one organic-carbon-containing feedstock to minimize energy consumption to achieve targeted product values follows. Through experimentation, a balance is made between energy consumed and energy density achieved. FIG. 6B is a graphical illustration of pressure and energy required to decrease the water content and increase the bulk density of typical organic-carbon-containing feedstock. Bulk density is related to water content with higher bulk density equaling lower water content. The organic-carbon-containing feedstock compaction process will strike an optimum balance between cycle time affecting productivity, net moisture extrusion together with associated water-soluble salts and minerals, permanent bulk density improvement net of the rebound effect due to viscoelastic/viscoplastic properties of the feedstock, and energy consumption.

Figure 6C:
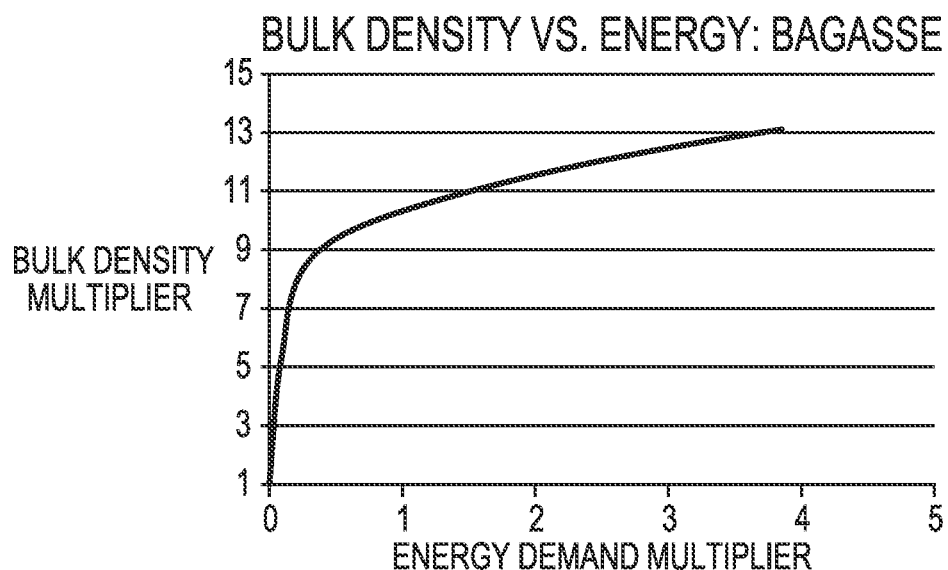
FIG. 6C is a graphical illustration of the energy demand multiplier needed to achieve a bulk density multiplier.
Figure 6D:
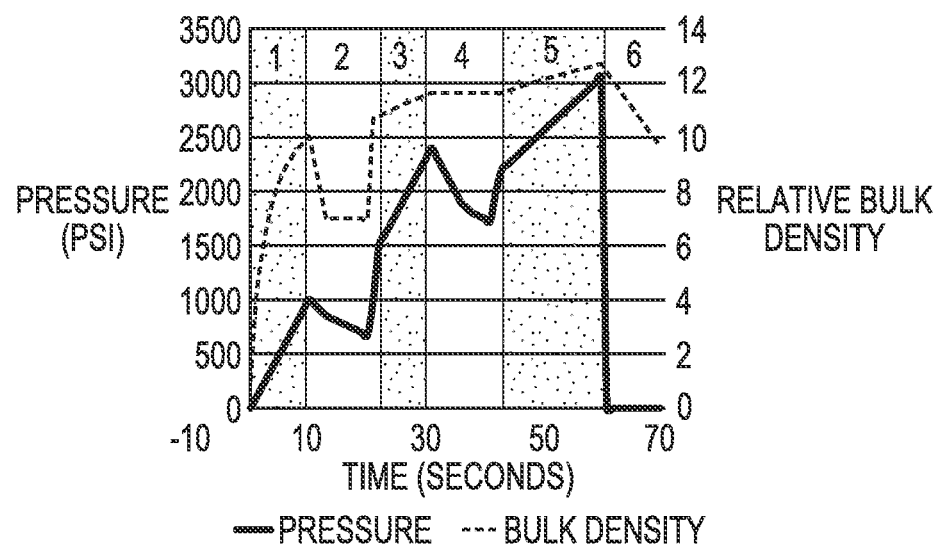
FIG. 6D is a graphical illustration of an example of a pressure cycle for decreasing water content in an organic-carbon-containing feedstock with an embodiment of the invention tailored to a specific the organic-carbon-containing feedstock.

FIG. 6C is an experimentally derived graphical illustration of the energy demand multiplier needed to achieve a bulk density multiplier. The compaction cycle can be further optimized for each variety and condition of organic-carbon-containing feedstock to achieve the desired results at lesser pressures, i.e., energy consumption, by incorporating brief pauses into the cycle. FIG. 6D is a graphical illustration of an example of a pressure cycle for decreasing water content in an organic-carbon-containing feedstock with an embodiment of the invention tailored to a specific organic-carbon-containing feedstock.

In a similar manner, energy consumption can be optimized during the wet fibril disruption and the vapor explosion parts of the system. Chemical pretreatment prior to compaction will further improve the quality of the product and also reduce the net energy consumption. For comparison purposes, the pressure applied to achieve a bulk density multiplier of "10" in FIG. 6C was on the order of 10,000 psi, requiring uneconomically high cost of capital equipment and unsatisfactorily high energy costs to decompress the organic-carbon-containing feedstock.

FIG. 7 is a table illustrating the estimated energy consumption needed to remove at least 75 wt % water-soluble salts from organic-carbon-containing feedstock and reduce water content from 50 wt % to 12 wt % with embodiments of the invention compared with known processes. Waste wood with a starting water content of 50 wt % was used in the estimate to illustrate a side-by-side comparison of three embodiments of the invention with known mechanical, physiochemical, and thermal processes. The embodiments of the system selected use a fibril swelling fluid comprising water, water with methanol, water with carbon dioxide bubbled into it produces carbonic acid $H_2CO_3$. As seen in the table, and discussed above, known mechanical processes are unable to reduce the water content to 12 wt %, known physiochemical processes are unable to reduce water-soluble salt content by over 25 wt %, and known thermal processes are unable to remove any water-soluble salt. The total energy requirement per ton for the three embodiments of the invention, that using methanol and water, carbon dioxide and water, and just water is 0.28 MMBTU/ton (0.31 3, 0.31 MMBTU/ton (0.36 GJ/MT), and 0.42 MMBTU/ton (0.49 GJ/MT), respectively. This is compared to 0.41 MMBTU/ton (0.48 GJ/MT), 0.90 MMBTU/ton (1.05 GJ/MT), and 0.78 MMBTU/ton (0.91 GJ/MT) for known mechanical, known physiochemical, and known thermal processes, respectively. Thus, the estimated energy requirements to remove water down to a content of less than 20 wt % and water-soluble salt by 75 wt % on a dry basis for embodiments of the system invention to less than 60% that of known physiochemical and known thermal processes that are able to remove that much water and water-soluble salt. In addition, the system invention is able to remove far more water-soluble salt than is possible with known physiochemical and known thermal processes that are able to remove that much water.

Figure 8:
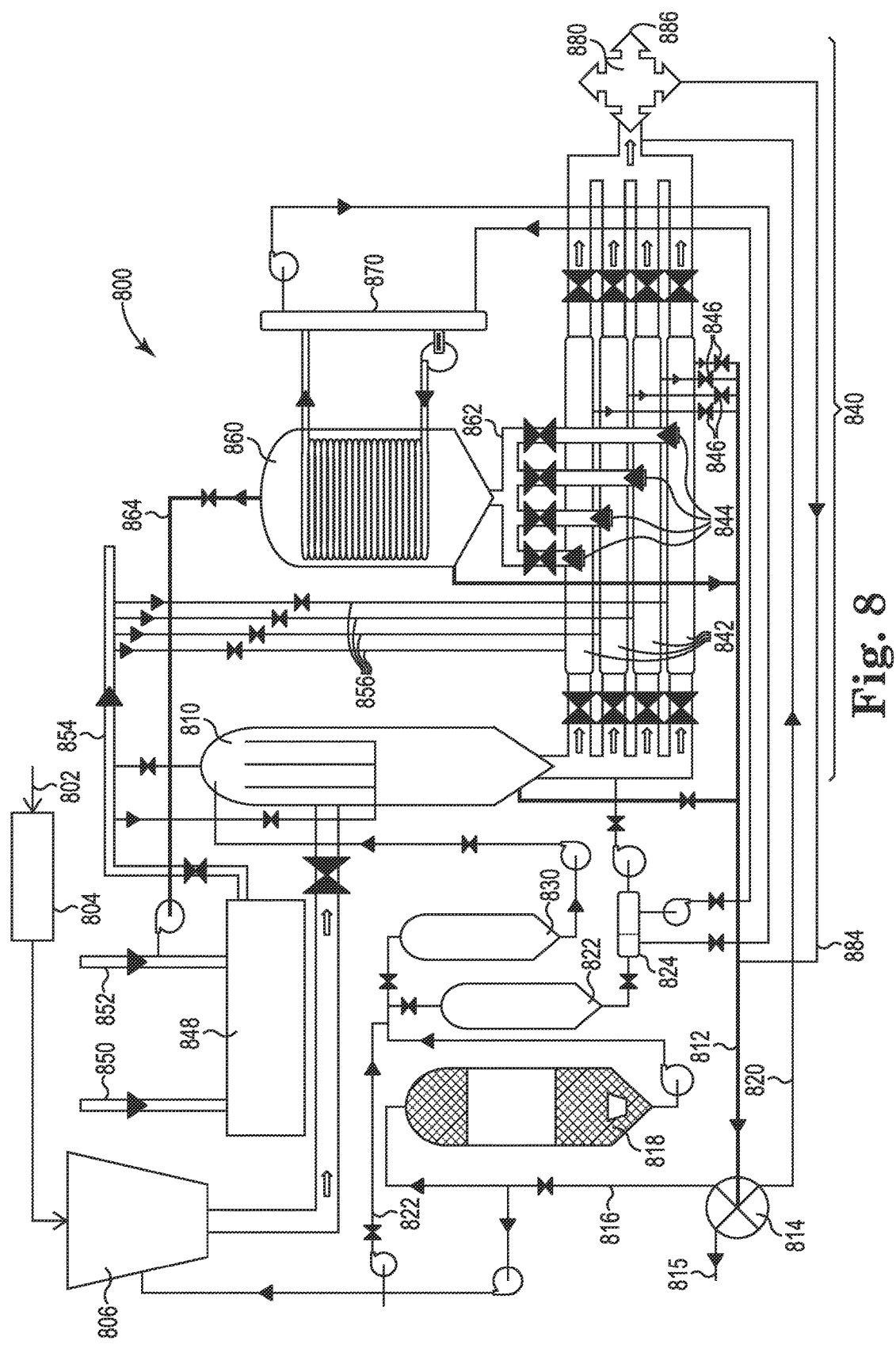
FIG. 8 is a diagram of a side view of an embodiment of a beneficiation sub-system having four reaction chambers in parallel, a pretreatment chamber, and a vapor condensation chamber.

Multiple reaction chambers may be used in parallel to simulate a continuous process. FIG. 8 is a diagram of a side view of an embodiment of a beneficiation sub-system having four reaction chambers in parallel, a pretreatment chamber, and a vapor condensation chamber. A system (800) includes an input section (802) that delivers organic-carbon-containing feedstock to system 800. Feedstock passes through a mastication chamber (804) prior to entry into an organic-carbon-containing feedstock hopper ((806) from where is passes on to a pretreatment chamber (810). Contaminants are removed through a liquid effluent line (812) to a separation device (814) such as a centrifuge and having an exit stream (815) for contaminants, a liquid discharge line (816) that moves liquid to a filter media tank (818) and beyond for reuse, and a solid discharge line (820) that places solids back into the porous organic-carbon-containing feedstock. Liquid from the filter medial tank 818 is passed to a remix tank (822) and then to a heat exchanger (824) or to a second remix tank (830) and to pretreatment chamber 810. The organic-carbon-containing feedstock passes onto one of four reaction chambers (840) comprising three sections. The first section of each reaction chamber, a wet fibril disruption section (842), is followed by the second section, a vapor explosion section (844), and a rinsing subsection (846). A high pressure steam boiler (848) is fed by a makeup water line (850) and the heat source (not shown) is additionally heated with fuel from a combustion air line (852). The main steam line (854) supplies steam to pretreatment chamber 810 and through high pressure steam lines (856) to reaction chambers 840. A vapor expansion chamber (860) containing a vapor condensation loop is attached to each vapor explosion sections with vapor explosion manifolds (862) to condense the gas. A volatile organic components and solvent vapor line (864) passes the vapor back to a combustion air line (852) and the vapors in vapor expansion chamber 860 are passes through a heat exchanger (870) to capture heat for reuse in reaction chamber 840. The now porous organic-carbon-containing feedstock now passes through the third section of reaction chamber 840, a compaction section (880). Liquid fluid passes through the liquid fluid exit passageway (884) back through fluid separation device (814) and solid processed organic-carbon-containing feedstock exits at (886).

Heating Sub-System

The optional heating sub-system is used to convert the processed organic-carbon-containing feedstock to processed biochar for subsequent blending with coal. In its broadest understanding, the heating sub-system comprises a reaction chamber configured to heat the processed organic-carbon-containing feedstock in an oxygen deficient atmosphere. The heating sub-system comprises at least two forms, one an oxygen-deficient thermal sub-system and one a microwave sub-system. Others are possible as long as they provide heat in an oxygen deficient environment.

Oxygen-Deficient Thermal Sub-System

The oxygen-deficient thermal sub-system is used to convert the processed organic-carbon-containing feedstock from the beneficiation sub-system into the clean porous processed biochar of the invention. In its broadest understanding, the oxygen-deficient thermal sub-system comprises a reaction chamber configured to heat processed organic-carbon-containing feedstock in an atmosphere that contains less than 4 percent oxygen to a temperature sufficient to convert at least some processed organic-carbon-containing feedstock into processed biogas and processed biochar. In some embodiments, the atmosphere contains less than 3 percent oxygen and in some less than 2 percent oxygen. The sub-system further comprises at least two aspects that are suitable for the invention—a conventional pyrolysis oxygen-deficient thermal system, and a sublimation oxygen-deficient thermal sub-system.

Pyrolysis Oxygen-Deficient Thermal Sub-System

The common pyrolysis oxygen-deficient thermal sub-system produces biochar, liquids, and gases from biomass by heating the biomass in a low/no oxygen environment. The absence of oxygen prevents combustion. The relative yield of products from pyrolysis varies with temperature. Temperatures of 400-500° C. (752-932° F.) produce more char, while temperatures above 700° C. (1,292° F.) favor the yield of liquid and gaseous fuel components. Pyrolysis occurs more quickly at the higher temperatures, typically requiring seconds instead of hours. Typical yields are 60% bio-oil, 20% biochar, and 20% volatile gases. In the presence of stoichiometric oxygen concentration, high temperature pyrolysis is also known as gasification, and produces primarily syngas. By comparison, slow pyrolysis can produce substantially more char, on the order of about 50%. The main benefit from the invention is that the resulting processed biochar made with processed organic-carbon-containing feedstock has a water-soluble salt content that is reduced by at least 60 wt % from that of processed biochar made with similar unprocessed organic-carbon-containing feedstock. In some embodiments, the water-soluble salt content is reduced by at least 65 wt %; in some at least 70 wt %; in some at least 80 wt %; in some at least 85 wt %; at least some at least 90 wt %.

Sublimation Oxygen-Deficient Thermal Sub-System

Another oxygen-deficient thermal sub-system is sublimation oxygen-deficient thermal sub-system. Unlike the pyrolysis sub-system, the feedstock in the sublimation sub-system does not pass through a liquid phase and the products are only fuel gases and processed biochar.

The following description relates to approaches for processing organic-carbon-containing feedstock into gaseous fuel and a processed biochar fuel by a sublimation sub-system. The gaseous fuel is primarily methane but also may include ethane, propane, and butane depending on the nature of the organic-carbon-containing feedstock and the residence times employed during the sublimation process. Processed biochar fuel is the solid carbon-based residue that is unable to be converted into gaseous fuel at a sublimation temperature. Alternatively, system conditions may be adjusted to preferentially create more than the minimum processed biochar.

The sublimation sub-system is a high temperature sub-system configured to convert a solid renewable biomass to a gaseous fuel and processed biochar cleanly without passing through a liquid state, a passage that can result in many side reactions discussed above under gasification. The key to sublimation is to expose the solid to a high temperature in the absence of free water and in a substantially oxygen free atmosphere. Under sublimation, the methane molecules and higher carbon groups such as ethane, propane, and butane, are rejoined after being deconstructed from a carbon chain in the feedstock without breaking down to carbon dioxide and water.

The processed biochar made in the sublimation sub-system has several advantages over that of the low water-soluble salt content of processed biochar made in the pyrolysis sub-system discussed above. First, the processed biochar contains substantially no volatiles that may remain in the pyrolysis sub-system. Volatiles present during depolymerization temperatures cause adverse reactions with carbons to form compounds other than the desired processed biogas fuels and processed biochar of the invention. In addition, volatiles in the processed biochar reduce the heating content of the processed biochar by reducing the fixed carbon in the resulting biochar. In the invention, the processed biochar is substantially devolatilized of condensable and non-condensable gases and vapors. In some embodiments, the content of the gases and vapors is reduced by at least 95% by weight, in some embodiments it is reduced by at least 97% by weight, and in some it is reduced by at least 99% by weight versus char made from unprocessed organic-carbon-containing feedstock in the pyrolysis sub-system with a volatile content of at least 10% by weight. This is desirable in processed biochar applications such as a coke alternative for steel making, gasification, and combustion applications such as boilers because of the lowered content of adverse corrosive compounds in the processed biochar of the invention over that of processed biochar from the same feedstock but with the pyrolysis process.

Second, the processed biochar has a higher heating value than that of processed biochar made with the same feedstock by the pyrolysis process. Because of better devolatization, there are fewer side reactions with the volatiles and carbon during later use involving combustion of the processed biochar as fuel. Thus, a greater degree of fixed carbon can remain in the processed biochar of the invention than in the processed biochar from similar feedstock in a pyrolysis sub-system. The fixed carbon content in some embodiments is increased by at least 5% by weight, in some embodiments by at least 10% by weight, in some embodiments by at least 15% by weight, and in some embodiments by at least 20% by weight. This increase in fixed carbon can result in an increase in the heat content of some embodiments of the processed biochar of the invention over that of processed biochar from the same feedstock in a pyrolysis sub-system. Heat content is affected by the type of organic-carbon-containing feedstock used and generally ranges from at least 20 MMBTU/ton (23 GJ/MT) to over 28 MMBTU/ton (33 GJ/MT) compared with less than 12 MMBTU/ton (14 GJ/MT) to less than 20 MMBTU/ton (23 GJ/MT) for similar organic-carbon-containing feedstock made in the pyrolysis sub-system. In some embodiments, the heat content of the processed biochar is increased by at least 20% over processed biochar by the pyrolysis sub-system, in some by at least 30%, in some by at least 40%, in some by at least 50%, in some by at least 60%, and by some at least 70%. In addition, because of the reduced amount of volatiles, the processed biochar of the invention can burn without visible smoke and with a smaller flame than seen with biochar made of a similar feedstock in a pyrolysis sub-system. For some embodiments, the flame can be at least 5% less, for some embodiments at least 10% less, for some embodiments at least 15% less, for some embodiments at least 20% less, for some embodiments at least 25% less, for some embodiments at least 30% less, for some embodiments at least 35% less, and for some embodiments at least 40% less.

The sublimation system can be further illustrated by a horizontal sublimation system and a vertical sublimation system. Other orientations may be contemplated.

Horizontal Sublimation Oxygen-Deficient Thermal Sub-System

The horizontal sublimation oxygen-deficient thermal sub-system comprises four elements. The first is a hot box configured to be able to (1) heat from an ambient temperature to an operating sublimation temperature, (2) maintain an initial operating sublimation temperature and a final operating sublimation temperature that are stable within less than ±10° C., and (3) cool from operating sublimation temperatures to an ambient temperature. All without leaking any oxygen into the hot box and having at least one heat source in communication with the interior of the hot box to supply heat as needed. The second element is at least one substantially horizontal reaction chamber largely located within the hot box and having a surface. The reaction chamber is configured to heat the processed organic-carbon-containing feedstock without external catalyst or additional water to an operating sublimation temperature in a time frame that is short enough to sublime at least part of the processed organic-carbon-containing feedstock without creating substantially any liquid. The reaction chamber is also configured to heat from an ambient temperature to an operating sublimation temperature, operate at a sublimation temperature, and cool from an operating sublimation temperature to an ambient temperature without leaking any product gas fuel into the surrounding hot box, and comprising an input end outside the hot box. The reaction chamber is further configured to receive compressed feedstock through an input line and an output end outside the hot box and configured to discharge product gas fuel through a discharge line and solid char fuel through an output line. The third element is a first powered transport mechanism that is located within the reaction chamber and is configured to convey sublimation products of the processed organic-carbon-containing feedstock through the reaction chamber as the processed organic-carbon-containing feedstock is transformed into processed biogas and processed biochar. The fourth element is a gas-tight element on both the input line and output line and configured to prevent hot biogas from adversely escaping from the reaction chamber.

The overall process will now be discussed for using a substantially horizontal sublimator to efficiently convert processed carbon-containing feedstock to product biogas fuel and solid processed biochar fuel. The process will be discussed briefly for an embodiment that needs processed organic-carbon-containing feedstock preparation, drying and compression, and uses an apparatus with two reaction chambers and burners to deliver sublimation heat. In some embodiments, the beneficiation sub-system is attached directly to horizontal sublimation oxygen-deficient thermal sub-system and the processed organic-carbon-containing feedstock needs little if any preparation, drying, and compression. In some embodiments, the desired properties of the processed organic-carbon-containing feedstock are such that at least some additional preparation, drying and or compression are desirable. Briefly, the sublimation sub-system of this embodiment of the invention is configured to be able to perform a preparation step, a drying step, a compression step, a sublimation step, and a separation step. Processed organic-carbon-containing feedstock preparation will be dictated by the physical characteristics of the processed organic-carbon-containing feedstock being considered for processing/conversion such as its water content and physical characteristics such as size and thickness. Size reduction of carbon-containing feedstock will enhance the compressibility of the processed organic-carbon-containing feedstock to allow for maximum throughput in the reaction chamber. In some embodiments, sizes are of a volume that is less than the equivalent of a cube about 2 cm (about 0.75 in) on a side with a length in any one direction of no more than about 5 cm (about 2 in).

After the processed organic-carbon-containing feedstock is properly prepared, it will then pass through a gas-tight element on an input line into a substantially horizontal drying chamber with an internal auger and be treated with recycled heat from the downstream process to drive off as much free water as possible. Reducing the free water content will increase the heat absorption by the processed organic-carbon-containing feedstock and reduce the amount of oxygen present from the water inside the sublimation reaction chamber and the finished product biogas fuel and processed biochar. Reducing the free water and the oxygen will result in less carbon dioxide and carbon monoxide in the product biogas fuel. Less $CO_2$ and CO byproduct is desirable because it increases the energy content of the processed biochar and the produced biogas.

After the drying chamber, the processed organic-carbon-containing feedstock will pass into a compression chamber containing a compression screw that is designed to compress the carbon-containing feedstock to the desired density. This compression further decreases any free water remaining. It also removes entrained air in the processed organic-carbon-containing feedstock that also will minimize the oxygen present in the sublimation reaction chamber. This dewatered, de-aired, and densified carbon-containing feedstock will enter the reaction chamber.

The compression chamber develops a feedstock plug at its exit that enters the reaction chamber. This plug acts as a partial barrier or seal so a minimal amount of gases produced in the reaction chamber backflow and escape. The gas-tight element on the input line prevents the rest of the gases from escaping the system.

In the embodiment being discussed, the sublimation sub-system has a physical plant that is a three dimensional, rectangular box with an internal substantially horizontal reaction chamber running along the top, a drop passage, and then a second substantially horizontal reaction chamber in the reverse direction of the top reaction chamber. Each reaction chamber contains its own auger for transporting the feedstock, is continuous, and is completely sealed against the escape of any hot product gas fuel.

In this embodiment, burners are external to the heating box but attached to it and will heat the space between the inside wall of the heating box and the outside walls of the reaction chamber configuration so that there will be no intermingling of the heated transfer air heating the external surface of the reaction chamber and the contents of the processed organic-carbon-containing feedstock in the reaction chamber undergoing sublimation. All the internal surfaces of the heating box are lined with high thermal insulating material so as to minimize heat loss and minimize the internal reactor air space.

After the compression screw, the processed organic-carbon-containing feedstock plug now enters the reaction chamber. The reaction chamber containing an auger inside of it that may be inside of a tube vented to a head space above the tube but within the reaction chamber for aggregation of the gases that are generated. The auger propels and rotates the processed organic-carbon-containing feedstock so that it is evenly exposed to the sidewalls of the tube or reaction chamber for efficient heat exchange and to 'turn over' the feedstock for even heating. The reaction chamber is heated from the outside surface of the reaction chamber so the transfer heats the air and any combustion products from the burners do not get intermingled with the processed organic-carbon-containing feedstock and/or product gas fuel or biogas. The reaction chamber is constructed to prevent the leaking out of any hot gases.

The processed organic-carbon-containing feedstock is then augured down the length of the reaction chamber. At the end of the reaction chamber, the carbon-containing feedstock drops down into a second augured reaction chamber that is of the same design as the first reactor tube. The configuration of the three, chambers including the connecting passage looks like a U rotated 90 degrees to the left.

The processed organic-carbon-containing feedstock has now been reduced to devolatilized carbon and volatile gases. The volatile gases are passing and mixing with the hot carbon surfaces and reacting with it to form a dissociated hot product gas fuel. The residence time in both of the reaction chambers allows the volatile gases created during the sublimation to deconstruct down to several different structures approaching and including that of methane, and to move down the reaction chambers as product biogas fuel.

At the end of the second reactor chamber are two outlets. One outlet is for the devolatized carbon to pass through a gas-tight mechanism and be collected as solid biochar fuel and the second outlet is for the product biogas to be captured. The product gas is filtered and allowed to cool after it exits the reaction chamber as the final product biogas fuel and then stored.

More specifically, the apparatus aspect of the invention comprises a system that includes a hot box, at least one reaction chamber, a first powered transport mechanism, and gas-tight elements. The hot box is configured to be able to heat from an ambient temperature to an operating sublimation temperature, maintain an initial operating sublimation temperature and a final operating sublimation temperature that are stable within less than ±10° C., and cool from operating sublimation temperatures to an ambient temperature without leaking any oxygen into the hot box and having at least one heat source in communication with the interior of the hot box to supply heat as needed.

The temperature needed to sublime processed organic-carbon-containing feedstock depends on the individual feedstock. If an operating temperature is too low, a liquid forms during the phase change from solid to gas with accompanying adverse reactions discussed above and associated with gasification processes. If the temperature is too high, energy is wasted in an already endothermic reaction. Operating sublimation temperatures are typically between 600° C. and 850° C. More common low-density, processed, organic-carbon-containing feedstock have operating sublimation temperatures between 650° C. and 750° C.

For the above reasons, the operating temperature in the reaction chamber should be reasonably stable during operation of the apparatus. In some embodiments where the reaction chamber has a shorter length and the flowrate of the processed organic-carbon-containing feedstock is smaller, the operating temperature may be substantially constant within less than ±10° C. In other embodiments having a longer residence time and a larger processed organic-carbon-containing feedstock throughput, the reaction chamber may not be constant but rather forms a profile through the reaction chamber drops from the beginning to the end. In these embodiments, for energy efficiency reasons, the individual temperatures of the temperature profile through the reaction chamber should be stable during operation within less than ±10° C.

The heat source must be able to heat the inside of the hot box to a stable operating sublimation temperature and maintain that temperature during the operation of the apparatus. Heat sources may include any that can provide sufficient heat and include, for example, infrared sources, laser sources and combustion sources. Embodiments that use combustion sources have the additional advantage in that they can be fueled by some of the product biogas fuel such that they require no additional energy from external sources. Such embodiments may be self sufficient during operation with as little as 10 percent of the product gas fuel that is created in the apparatus. Some embodiments may be self-sufficient with as little as 7 percent and some with as little as 5 percent. This is due to the high energy content of the product gas fuel and the variable amounts of energy needed to process different feedstock.

The at least one reaction chamber is substantially horizontal, located largely within the hot box, has a surface, and is configured to heat the processed organic-carbon-containing feedstock without external catalyst or additional water to an operating sublimation temperature in a time frame that is short enough to sublime at least part of the processed organic-carbon-containing feedstock without creating substantially any liquid. Also, it is configured to heat from an ambient temperature to an operating sublimation temperature, operate at a sublimation temperature, and cool from an operating sublimation temperature to an ambient temperature without leaking any product biogas fuel into the surrounding hot box. Further, it comprises an input end outside the hot box and configured to receive compressed feedstock through an input line and an output end outside the hot box and configured to discharge product biogas fuel through a pressure-isolation element and processed biochar fuel through an output line.

Sublimation is a reaction that deconstructs smaller gaseous hydrocarbons from an organic-carbon-based feedstock and more particularly in the case of the invention from a processed organic-carbon-based feedstock. In the invention, the gas collects as a processed biogas fuel as it interacts with processed biochar solid fuel residue. Thus, there is no need for expensive external catalysts and subsequent elaborate reforming operations to create the processed biogas fuel. In addition, the sublimation of the invention is conducted in the presence of minimal oxygen since any oxygen reacts to cause non-fuel reaction products such as carbon dioxide and carbon monoxide. Thus it is desirable to not use superheated steam in contact with the processed organic-carbon-containing feedstock to achieve operating sublimation temperature. Some oxygen that is interstitially locked in the cells may be in the processed organic-carbon-containing feedstock. Also, some oxygen may enter the reaction chamber because of potentially incomplete drying when that drying step is desired. Both of these sources of potential oxygen sources should be mitigated by the beneficiation pre-processing: cell walls broken exposing interstitial water and oxygen to expulsion and also a good pre-drying process. Thus, these sources of oxygen comprise a small portion and contribute to less than 5 percent of the gaseous product and often less than 3 percent or 2 percent depending on the particular processed organic-carbon-containing feedstock used.

To avoid passing through the liquid phase, the solid surface of the processed organic-carbon-containing feedstock should reach the sublimation temperature immediately. In some embodiments, this is within 1 millisecond. In some embodiments, the time is within less than 0.1 millisecond. In still others it is within less than 0.01 millisecond.

Some embodiments have a single reaction chamber. These are constructed to withstand the temperature changes associated with passing from ambient to operating sublimation temperatures during start up operation and the reverse during shutdown operations. Features may include thicker walls and/or the use of supporting elements such as gussets where the conversion part of the reaction chamber wall is in communication with the side of the hot box.

The first powered transport mechanism is located within the reaction chamber and is configured to convey sublimation products of the processed organic-carbon-containing feedstock through the reaction chamber as the processed organic-carbon-containing feedstock is transformed into product gas fuel and solid char fuel. Some embodiments have a reaction chamber that comprises a tube containing the first powered transport mechanism. The reaction chamber also has a head space in communication with the tube for the collection of product biogas fuel as it is created. The first powered transport mechanism is configured to advance the solid portions of the processed organic-carbon-containing feedstock, particularly the low-density forms of the processed organic-carbon-containing feedstock. It is also configured to assist intermixing with the heat of the surface of the reaction chamber to assist in maintaining a stable operating sublimation temperature in contact with the solid parts of the feedstock as product biogas fuel continues to be removed from the solid parts of the feedstock. The first transport mechanism is one that is able to effectively operate at a sublimation temperature and not be adversely impaired by thermal expansion and contraction during the starting up and cooling down phases of operation. One example of an effective first transport mechanism is in an augur.

The gas-tight element is on both the input line and output line and configured to prevent hot product fuel biogas from adversely escaping from the reaction chamber. Leaks that permit product biogas fuel to exit the reaction chamber in an unregulated manner can cause a serious safety concern. Combustible product biogas fuel in the presence of hot surfaces can cause fires and explosions. Examples of gas-tight elements effective for this purpose at the temperatures discussed are a rotary valve, a rotary vacuum valve, and actuated double-gate valve. Alternatively, a more expensive configuration may include a box surrounding the hot box of the sublimation sub-system with purge nitrogen under a positive pressure in the box to keep any escaping gas from becoming hazardous.

The operating pressure in the reaction chamber may be protected from adverse instability from the product biogas fuel leaving in its discharge line by passing the product gas fuel through a pressure isolation element. This helps maintain the stable sublimation conditions within the reaction chamber. Pressure isolation elements include, for example, bubblers and cyclones to maintain pressure in the reaction chamber. Alternatively, the pressure in the reaction chamber may be controlled through the product biogas fuel being discharged into gas tight holding tanks.

Some embodiments of the system have at least two substantially horizontal reaction chambers that are in communication with each other in series, and the first powered transport mechanism has a part of a shaft that extends outside each reaction chamber and the hot box. Embodiments with more than one reaction chamber in series provide systems able to process higher amounts of carbon-containing feedstock with similar footprints to that of some systems having a single reaction chamber. These embodiments further comprise an adjustable sealing element located outside the hot box at the region of the hot box surrounding a collar about the extended part of the first powered transport mechanism. The adjustable sealing element is configured to prevent the adverse entry from outside the hot box of external oxygen entering the hot box during changing temperatures of startup and shutdown operations, and during steady-state sublimation operation. Leaks that permit oxygen to enter the hot box from the outside or product gas fuel to enter from the reaction chamber can cause undesirably large fluctuations in the operating sublimation temperatures. They represent an additional and uncontrolled source of heat when they combust.

Each sealing element comprises an adjustable plate and an adjustable seal to permit satisfactory exclusion of additional undesirable oxygen leaking into the hot box or reaction chamber through undesirable leaks created during thermal expansion and contraction of elements of the system during startup and shutdown operations. The adjustable plate comprises a substantially vertical plate that is adjustably attached to the hot box and configured to vertically move the collar about the extended part of the shaft of the first powered transport mechanism to prevent adverse contact between collar and the shaft. The adjustable seal is in communication with the adjusting plate, located about the extended portion of the shaft of the first powered transport mechanism and comprises a cone and rope configuration designed to maintain a gas-tight seal about the shaft of the first powered transport mechanism as it extends from the hot box.

The residence time in the reaction chamber varies with the nature of the processed organic-carbon-containing feedstock and the quantity being processed. Typically, between at least 50 percent by weight and over 90 percent by weight of processed organic-carbon-containing feedstock can be converted into product gas fuel with the remainder being solid char fuel having an energy density similar to coal. Longer residence times allow more methane units to reassociate from the disassociated gas and may result in a higher conversion to product gas fuel approaching over 70 weight percent to over 90 weight percent. Residence times may range from less than 10 minutes in some embodiments to less than 5 minutes in some embodiments to less than 2 minutes in some embodiments. Excessively long residence times have no adverse effect on the conversion once the theoretical conversion is substantially achieved.

In some embodiments the reactor chambers further comprise manifolds attached to the outside of the reaction chambers within the hot box. The reaction chamber surface and the manifold are configured to allow dissociated gas to pass between the reaction chamber and the manifold to increase the time the disassociated gas is exposed to sublimation temperatures. In some cases, this additional time may result in dissociating gases that have longer carbon-carbon structured chains such as, for example, ethane, propane, and butane, to further disassociate into methane.

Some embodiments of the system of the invention further comprise a vertical support within the hot box and further beneath the lower substantially horizontal reaction chamber to support its weight during startup, shutdown, and operating conditions where thick reaction chamber walls and support elements such as gussets are not desirable or not feasible to provide adequate support. Generally, the vertical support is configured to be dimensionally stable to within about 2.5 cm (about one inch) in the vertical direction over temperature variations between ambient temperature and about 850° C. that may occur during the startup, operation, and shutdown of the substantially horizontal reaction chamber.

Vertical dimensional stability is achieved by the use of insulation in combination with the use of cooling material flowing through the support in addition to the use of insulation. The cooling material is that commonly associated with cooling and includes, for example, water; refrigerants such as halogenated gas, carbon tetrachloride, chlorofluorocarbons, hydrochlorofluorocarbons, ammonia, carbon dioxide, ethane, propane, ether, and dimethylether; gaseous coolants such as air, hydrogen, inert gases, and sulfur hexafluoride; liquid coolants such as water, ethylene glycol, diethylene glycol, propylene glycol, and Freon® by DuPont; and solid coolants such as dry ice.

Cooling materials may pass through or around a vertical support in any manner that maintains the desired vertical dimensional stability. When the vertical support is not cooled, thermal expansions may result in vertical expansions of several inches. This is enough to cause welds in the supported reaction chamber to break and leak product gas fuel into the hot box or out into the environment. As discussed above, this can cause a safety issue and can adversely destabilize the operating temperature profile in the reaction chamber. Some embodiments may have the cooling material pass horizontally along the vertical support walls near the hot reaction chamber that is being supported. Some embodiments may have cooling material flow vertically up into the shaft of the vertical support. Other configurations are also possible as long as they limit vertical thermal expansion sufficiently to not cause leaks in welds in the reaction chamber.

Some embodiments of the system may further comprise a preparation chamber that is outside the hot box. This is useful when carbon-containing feedstock is not supplied in a dried and compressed manner. The preparation chamber is in communication with the substantially horizontal reaction chamber, is configured to remove some free water and oxygen from the processed organic-carbon-containing feedstock, and is configured to compress the processed organic-carbon-containing feedstock into a plug before it enters the substantially horizontal reaction chamber.

The preparation chamber also comprises a second powered transport mechanism that is located partly within the preparation chamber and has a part that extends outside the preparation chamber. The preparation chamber is configured to perform one or more of moving the processed organic-carbon-containing feedstock through the preparation chamber and compressing the processed organic-carbon-containing feedstock within the preparation chamber as it is dried of more free water.

Heat may be supplied internally for the drying function. In some embodiments, the heat used to dry the processed organic-carbon-containing feedstock comes from the combustion gasses in the hot box. In some embodiments, the heat may come from at least one of the hot product gas fuel and the solid char fuel through heat conveyance devices such as, for example, heat exchangers.

In some embodiments, the preparation chamber may be subdivided into a drying chamber and a compression chamber where additional drying may occur. The compression chamber may be equipped with its own second powered transport mechanism. The drying chamber may be equipped with its own third powered transport mechanism. In this embodiment, the drying chamber or pre-preparation chamber is in communication with the compression chamber or preparation chamber and is configured to reduce the particle size of low density processed organic-carbon-containing feedstock to a size and remove the bulk of initial water and trapped air to permit the processed organic-carbon-containing feedstock to be more easily conveyed through the preparation chamber of the system, more easily compressed there without entraining oxygen or water, and more easily heated there to a sublimation temperature without permitting the formation of a liquid phase. In this embodiment, a third powered transport mechanism that precedes and is in communication with the pre-preparation chamber, has a part that extends outside the pre-preparation chamber. The mechanism is configured to perform one or more of moving the processed organic-carbon-containing feedstock through the pre-preparation chamber and compressing the processed organic-carbon-containing feedstock within the pre-preparation chamber in more manageable sized particles.

In both cases, the individual transport mechanisms are to advance processed organic-carbon-containing feedstock forward into a condition for sublimation. One example of a transport mechanism is an augur but others are suitable if they accomplish the desired function.

The system of the invention may further comprise various units to prepare the processed organic-carbon-containing feedstock into a condition to be used by the system of the invention. Various feedstock must have their size reduced as discussed above to dimensions that can be dried, compressed, and sublimated in a timely manner. By way of illustration, tires must be reduced to tire crumbs and straws or stalks must be reduced to shapes that are more readily conveyed through the preparation chamber of the system, more easily compressed there without entraining oxygen or water, and more easily heated there to a sublimation temperature without permitting the formation of a liquid phase. Units may include, for example, devices that grind, chop, slice, or cut.

Figure 9:
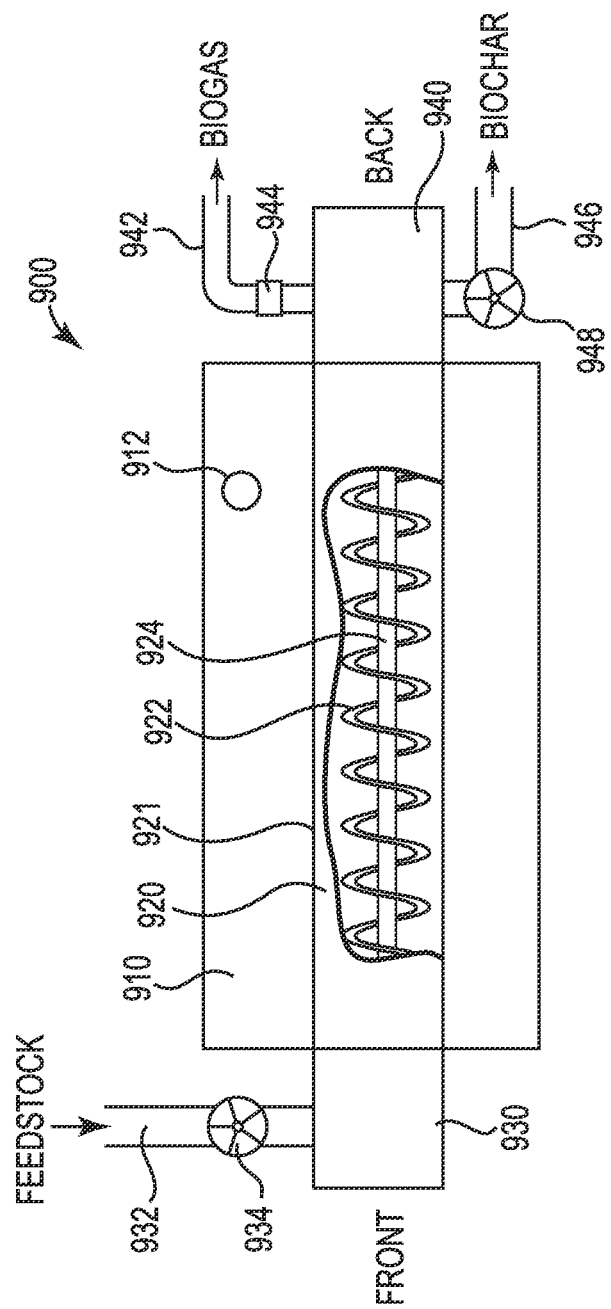
FIG. 9 is a diagram of a side view of an embodiment of a horizontal sublimation oxygen-deficient thermal sub-system with a reactor chamber having one pass.

FIGS. 9 to 17 illustrate various embodiments of the sublimation oxygen deficient thermal systems described above. The same numbers are used for similar functional elements even if the embodiments are different. FIG. 9 is a diagram of a side view of an embodiment of a system with a single substantially horizontal reaction chamber having one pass. A system (900) is depicted with a hot box (910) containing a vent (912) that surrounds a reaction chamber (920). The vent is needed when the hot box is heated with burners that create combustion products. When heat is generated by other sources of heat, excess gas may not be generated that needs to be vented. Reaction chamber 920 has a surface (921), and contains a first transport mechanism (922), an augur, with a shaft (924). At one end of reaction chamber 920 and extending outside hot box 910 is a front end (930) that processed organic-carbon-containing feedstock enters into thorough an input line (932) with a rotary vacuum valve (934) to isolate any sublimed gases within the reaction chamber. At the other end of the reaction chamber and extending outside hot box 910 is a back end (940) where product gas fuel exits from a discharge line (942) with a pressure isolation element (944) positioned to isolate any sublimed processed biogas within the reaction chamber and solid processed biochar fuel exits from a discharge line (946) with a rotary vacuum valve (948) positioned to isolate any sublimed processed biogas within the reaction chamber.

Figure 10:
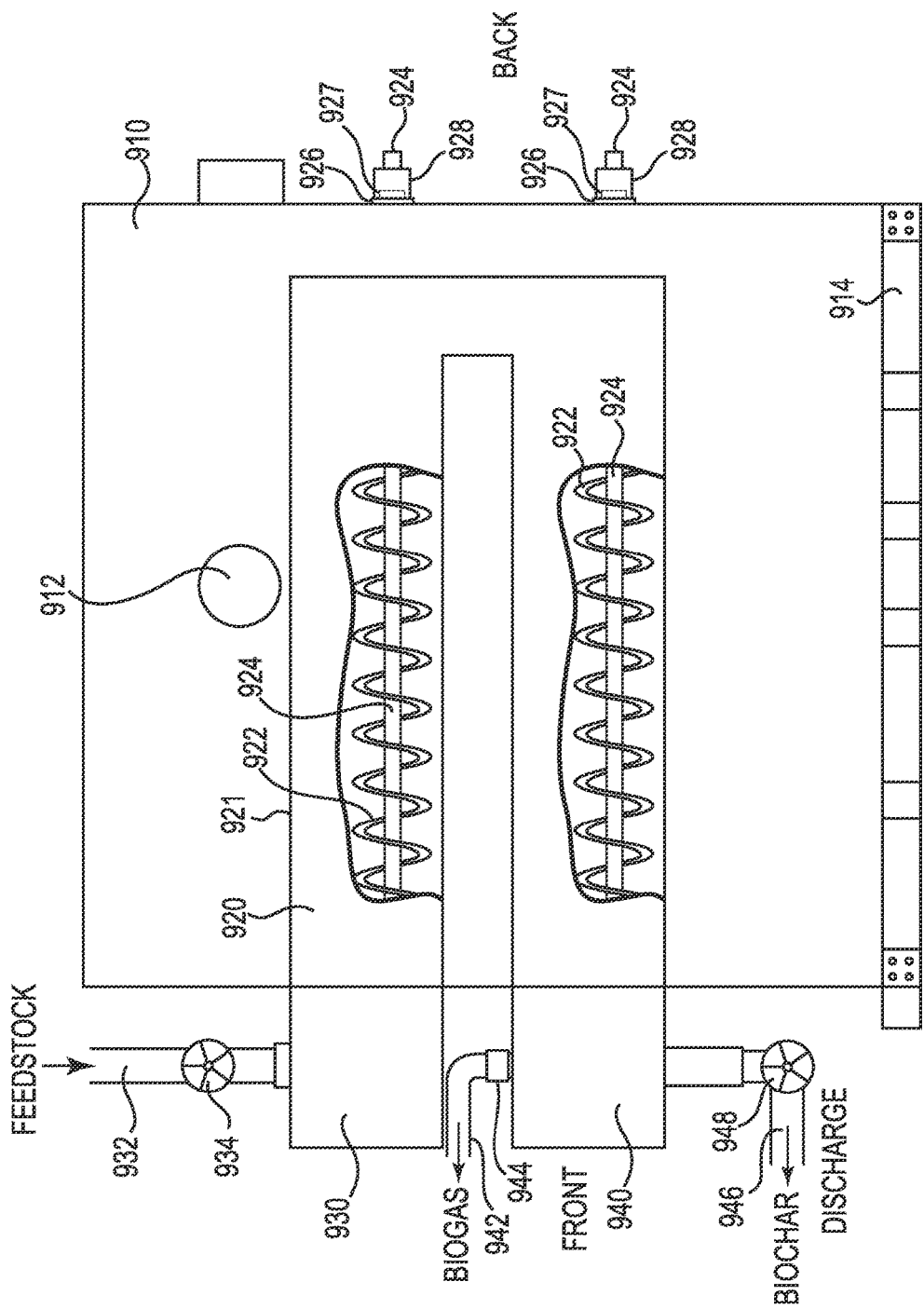
FIG. 10 is a diagram of a side view of an embodiment of a system with a reaction chamber having two passes, a flexible shaft seal, and a high temperature adjustable shaft cover plate.

FIG. 10 is a diagram of a side view of an embodiment of a system with a reaction chamber having two passes, a flexible shaft seal, and a high temperature adjustable shaft cover plate. System 900 is depicted with hot box 910 containing vent 912 that surrounds a reaction chamber 920 and is on a base (914). Reaction chamber 920 with surface 921 is configured like an open "U" on its side with two horizontal passages connected with a vertical passage on the right ends. Each horizontal passage contains first transport mechanism 922, an augur, with a shaft 924. Each shaft extends out of the horizontal passages of reaction chamber 920 and hot box 910. For each shaft end, a high temperature adjustable shaft seal plate (926) encloses each shaft collar (927) and adjustably fastens to the hot box. For each shaft end, an adjustable high temperature seal (928) is fastened on shaft collar 927 at one end and encompasses both a portion of shaft collar 927 and a portion of the extended shaft end of shaft 924. At the end of the first reaction chamber 920 and extending outside hot box 910 is front end 930 into which processed organic-carbon-containing feedstock enters thorough input line 932 with rotary vacuum valve 934 positioned to isolate any sublimed process biogas within the reaction chamber. At the end of the second reaction chamber 920 and extending outside hot box 910 is back end 940 where processed biogas fuel exits from discharge line 942 with cooling element 944 positioned to isolate any sublimed process biogas within the reaction chamber and solid char fuel exits from discharge line (946) with rotary vacuum valve (948) positioned to isolate any sublimed processed biogas within the reaction chamber.

Figure 11A:
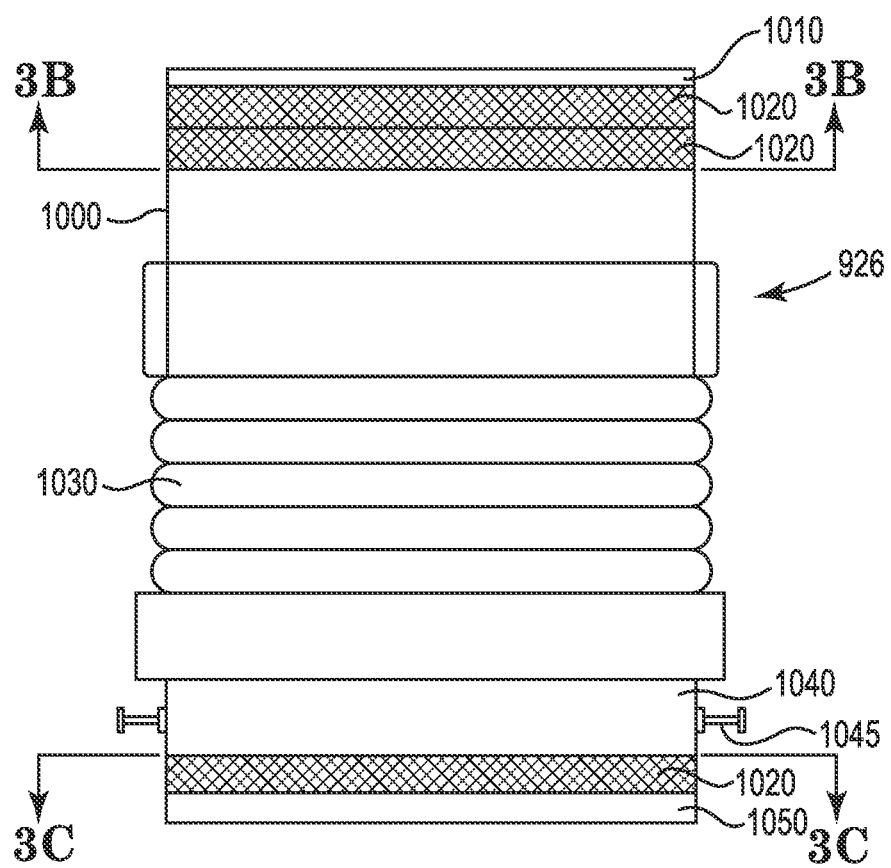
FIG. 11A is a diagram of a side view of an embodiment of the flexible shaft seal casing with the rope seals compressed in place.

The high temperature adjustable seal and plate that is shown in FIG. 10 may have various forms as long as the function is accomplished. One embodiment is illustrated in FIGS. 11A to 11E and FIGS. 12A to 12E adjustable shaft seal plate 926. FIG. 11A is a diagram of a side view of an embodiment of the high temperature adjustable shaft seal casing with the rope seals compressed in place. Seal 928 comprises a casing (1000) that contains a double rope seal base plate (1010) in its front end facing the end of shaft 1024. Base 1010 is connected to two rope seals (1020) to form a double rope seal. This construction is further illustrated in FIG. 11B. The backend of casing 1000 that faces hot box 910 contains a boltable collar (1040) that is configured to affix shaft collar 927 next to single rope seal 1020 on a single rope seal base plate (1050) that is further illustrated in FIG. 11C.

Figure 11B:
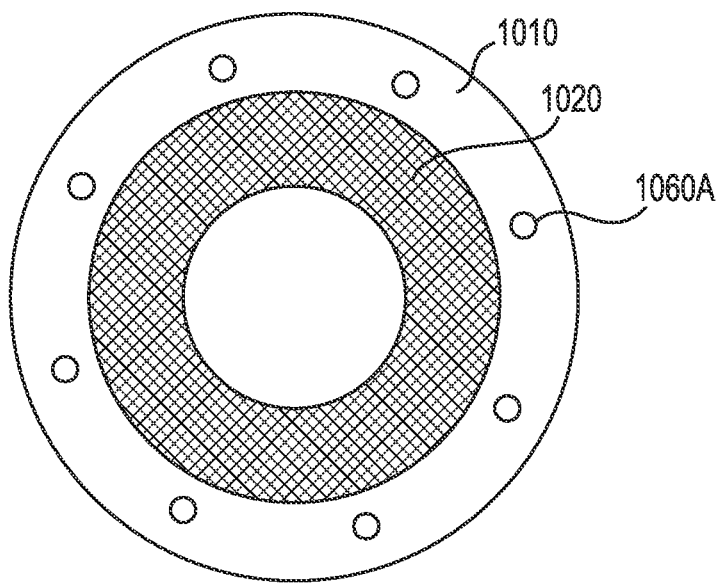
FIG. 11B is a diagram of a view of an element of the embodiment of FIG. 11A showing a back view of the frame holding the double rope seal.

FIG. 11B is a diagram of a view of an element of the embodiment of FIG. 11A showing a back view of the frame holding the double rope seal. The view is one of looking through casing 1000 from the end of shaft 924. Bolt holes (1060A) are depicted.

Figure 11C:
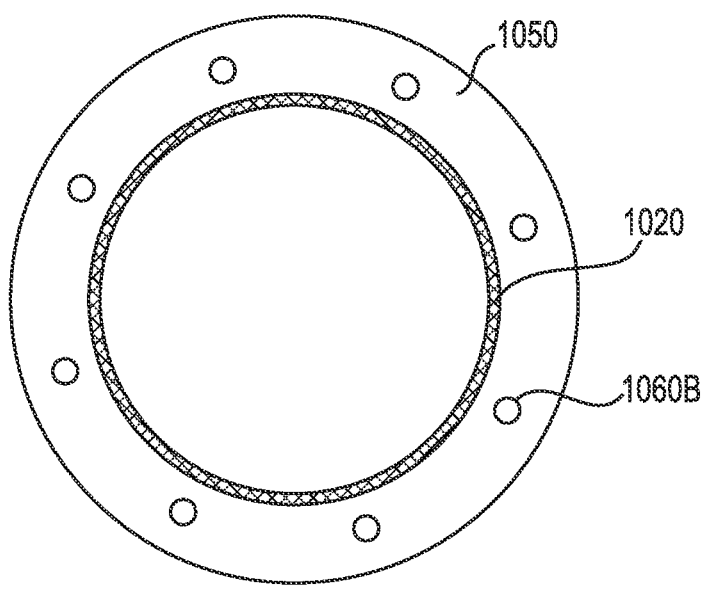
FIG. 11C is a diagram of a view of an element of the embodiment of FIG. 11A showing a back view of the frame holding a single rope seal.

FIG. 11C is a diagram of a view of an element of the embodiment of FIG. 11A showing a back view of the frame holding a single rope seal. The view is one of looking through casing 1000 from hot box 910. Bolt holes (1060B) are depicted.

Figure 11D:
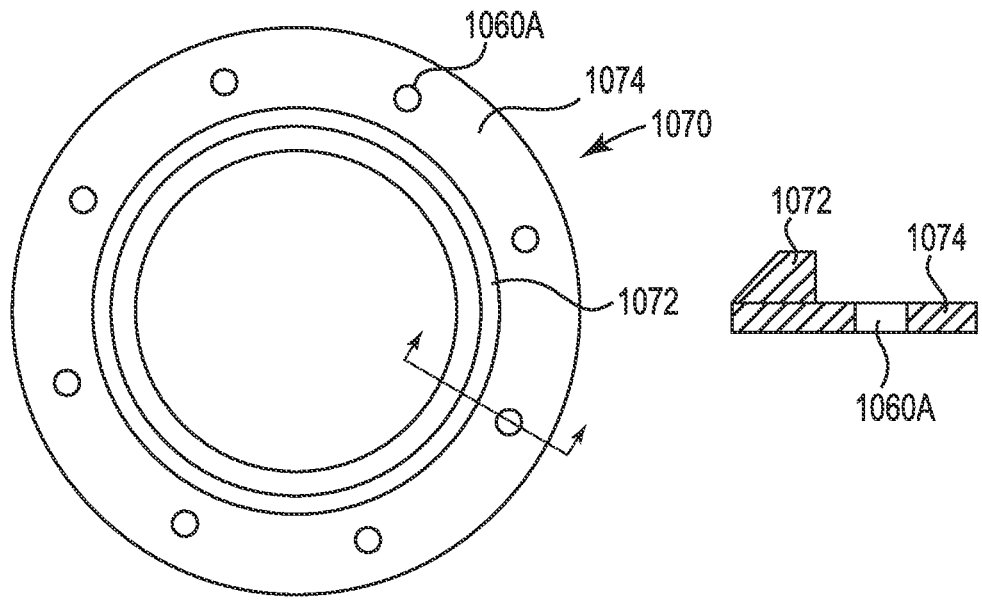
FIG. 11D is diagram of a front view and side view of an element of the embodiment of FIG. 11A showing a cover that compresses the double rope seal of FIG. 11B.

FIG. 11D is diagram of a front view and side view of an element of the embodiment of but not shown in FIG. 11A showing a cover that compresses the double rope seal of FIG. 11B. The front view is of the side that faces the rope seal. A cover (1070) comprises a raised inner compression ring (1072) that has a sloping cross-sectional edge attached to an outer support ring (1074) with bolt holes 1060A. When bolted to the holes of FIG. 11B, raised inner compression ring 1072 pushes the rope seal inward against the shaft to eliminate adverse leaks of air containing oxygen from entering the hot box during startup and shutdown temperature expansion and contraction cycles.

Figure 11E:
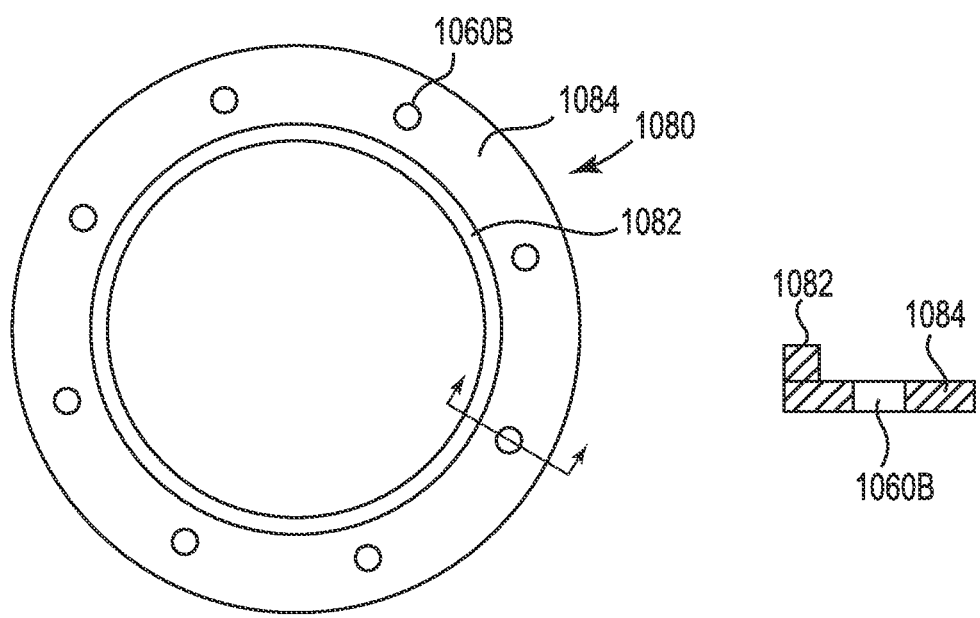
FIG. 11E is a diagram of a front view and side view of an element of the embodiment of FIG. 11A showing a cover that compresses the single rope seal of FIG. 11C.

FIG. 11E is a diagram of a front view and side view of an element of the embodiment of but not shown in FIG. 11A showing a cover that compresses the single rope seal of FIG. 11C. The front view is of the side that faces the rope seal. A cover (1080) comprises a raised inner compression ring (1082) that has a square cross-sectional edge attached to an outer support ring (1084) with bolt holes 1060B. When bolted to the holes of FIG. 11C, raised inner compression ring 1082 pushes the rope seal downward against seal collar 1040 to eliminate adverse leaks of air containing oxygen from entering the hot box during startup and shutdown temperature expansion and contraction cycles.

FIG. 12A is a diagram of the front view and side view of an embodiment of the high temperature adjustable cover plate showing a top half. The upper half (1110) of high temperature adjustable seal plate 926 comprises two adjustable holes (1112), connecting holes (1114), and a semicircular opening (1116) designed to fit around half of shaft collar 927. The cross-section (1118) is straight.

FIG. 12B is a diagram of the front view and side view of the embodiment of the high temperature adjustable cover plate of FIG. 12A showing a bottom half. The lower half (1120) of high temperature adjustable seal plate 926 comprises two adjustable holes (1122), connecting holes (1124), a semicircular opening (1126) designed to fit around half of shaft collar 927, and a step plate (1125) that contains connecting holes 1124 to permit a smooth surface to contact the hot box when assembled. The cross-section (1128) is stepped.

FIG. 12C is a diagram of the front view of the embodiment of the high temperature adjustable cover plate of FIG. 12A showing the top half of FIG. 12A and the bottom half of FIG. 12B joined.

Figure 12E:
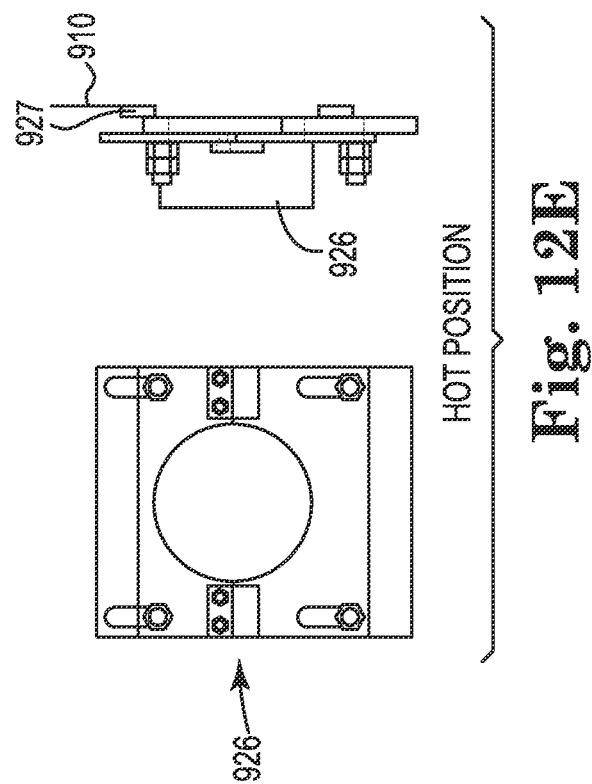
FIG. 12E is a diagram of the front view of the assembled high temperature adjustable cover plate in the hot temperature position.
Figure 12D:
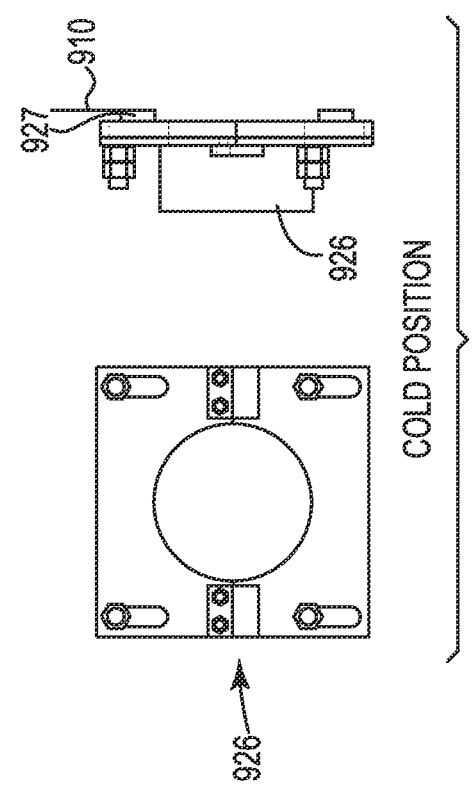
FIG. 12D is a diagram of the front view of the assembled high temperature adjustable cover plate in the cold temperature position.

FIG. 12D is a diagram of the front view of the assembled high temperature adjustable cover plate in the cold temperature position. As seen, because hot box 910 has not yet experienced thermal expansion, shaft 924 exits hot box 910 through collar 927 at a lower position to avoid adversely having collar 927 contact shaft 924 during operation.

FIG. 12E is a diagram of the front view of the assembled high temperature adjustable cover plate in the hot temperature position. As seen, because hot box 910 has thermally expanded in an upward manner during start-up heating operations, collar 927 must be moved upward to avoid adversely contacting shaft 924 during operation. Adjustable holes 1112 and 1122 permit such adjustment. Some embodiments use manual adjustment. Some embodiments use automated adjustment.

Figure 13:
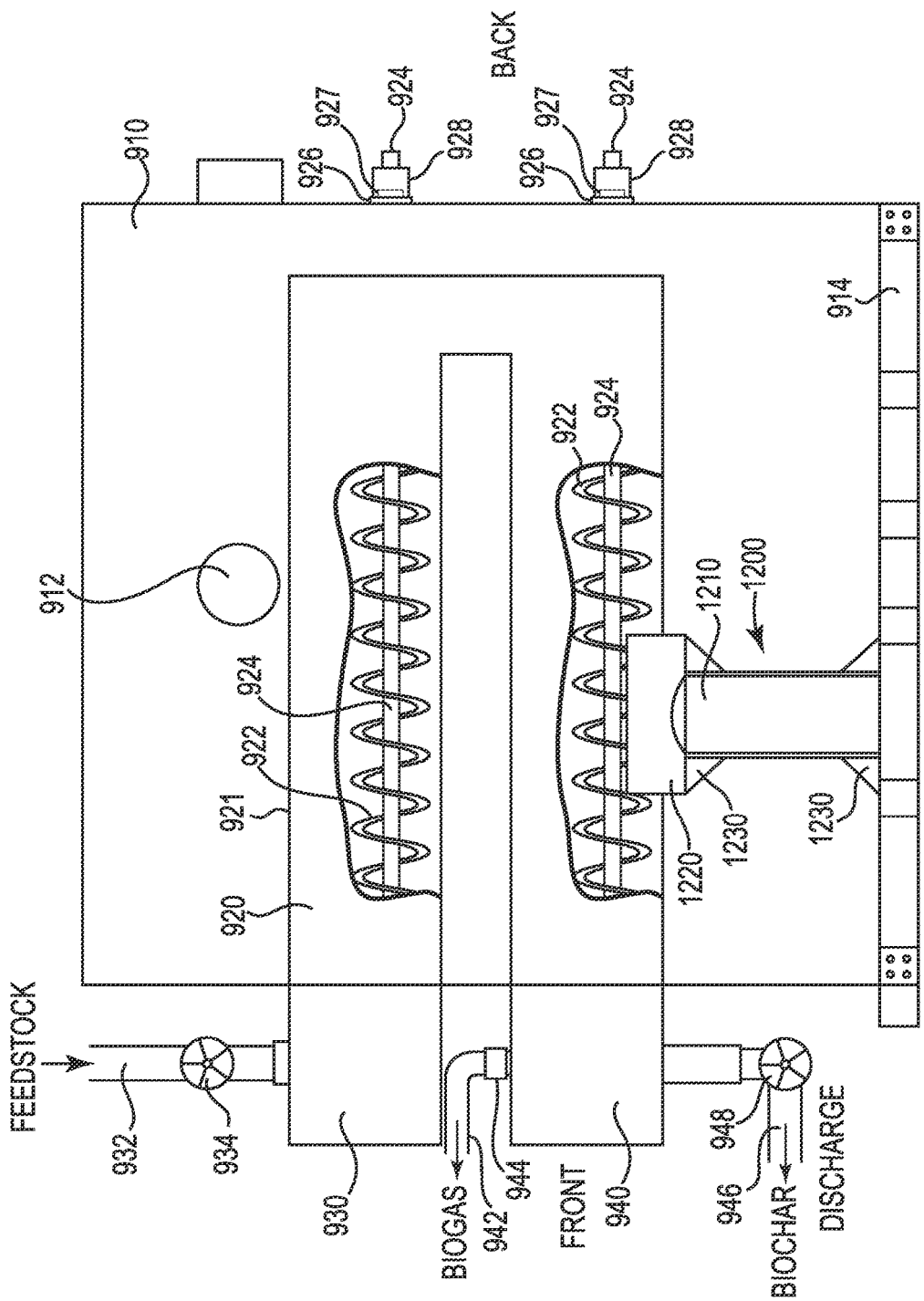
FIG. 13 is a diagram of a side view of an embodiment of a system with a reaction chamber having two passes, a flexible shaft seal, a high temperature adjustable shaft cover plate, and a high temperature vertical support stand.

FIG. 13 is a diagram of a side view of an embodiment of a system with a reaction chamber having two passes, a flexible shaft seal, a high temperature adjustable shaft cover plate, and a vertical support stand. This embodiment is similar to the embodiment shown in FIG. 10 except a high temperature vertical support (1200) is used to support reaction chamber 920 within hot box 910. Vertical support 1200 comprises a vertical shaft (1210) and a cradle (1220) to hold reaction chamber 920. The stability of the vertical shaft and cradle configuration is reinforced with gussets (1230) attaching shaft 1210 to cradle 1220 and shaft 1210 to system base 914.

Figure 14A:
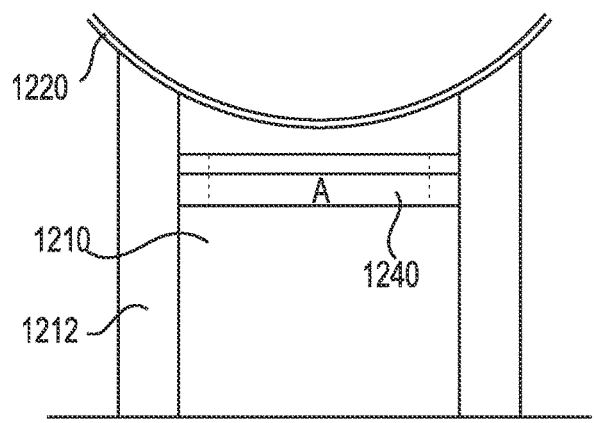
FIG. 14A is a front view of an embodiment of a vertical stand showing a curved cradle and a horizontal ring for passing coolant.
Figure 14B:
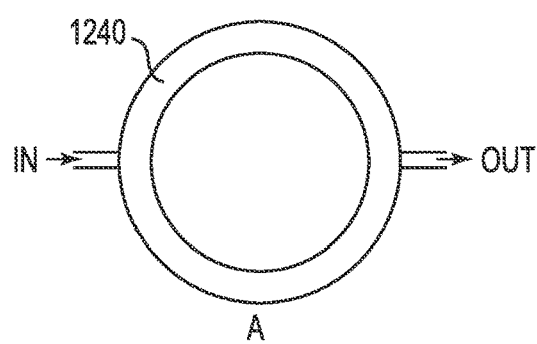
FIG. 14B is a top view of the embodiment of FIG. 14A showing the cooling ring.
Figure 14C:
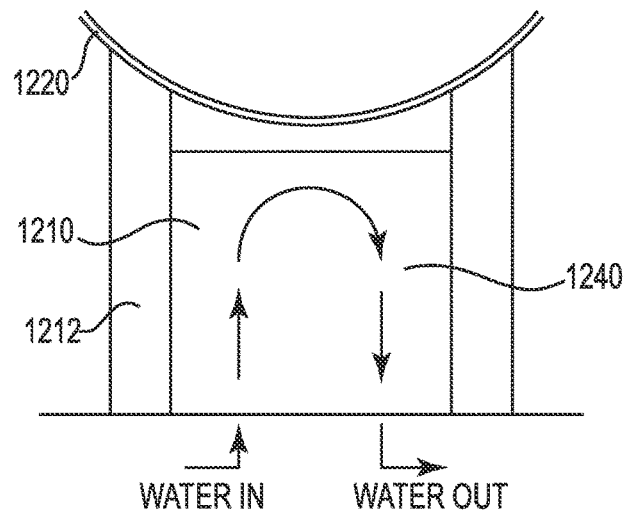
FIG. 14C is a front view of an embodiment of a vertical stand showing a curved cradle and a vertical up and down cooling passage within the vertical shaft of the vertical stand.

The high temperature vertical support stand that is shown in FIG. 13 may have various forms as long as the function is accomplished. One embodiment is illustrated in FIGS. 14A and 14B. A variation of that embodiment is illustrated in FIG. 14C. FIG. 14A is a front view of an embodiment of a vertical stand showing a curved cradle and a horizontal ring for passing coolant. The cradle is designed to conform to the bottom of reaction chamber 920. In embodiments of the system where the bottom of reaction chamber 920 is other than curvature, a different conforming shape of the cradle would be employed. Shaft 1210 is surrounded with insulation (not shown). However, heat passing from reaction chamber 920 through cradle 1220 to stand 1210 can cause adversely large vertical thermal expansion of shaft 1210 as discussed above. A cooling ring (1240) horizontally displaced within the upper part of shaft 1210 can be used to minimize thermal expansion of shaft 1210 to satisfactory lengths over the ranges of temperatures employed by the apparatus as discussed above.

FIG. 14B is a top view of the embodiment of FIG. 14A showing cooling ring 1240.

FIG. 14C is a front view of an embodiment of a vertical stand showing a curved cradle and a vertical up and down cooling passage within the vertical shaft of the vertical stand.

Figure 15:
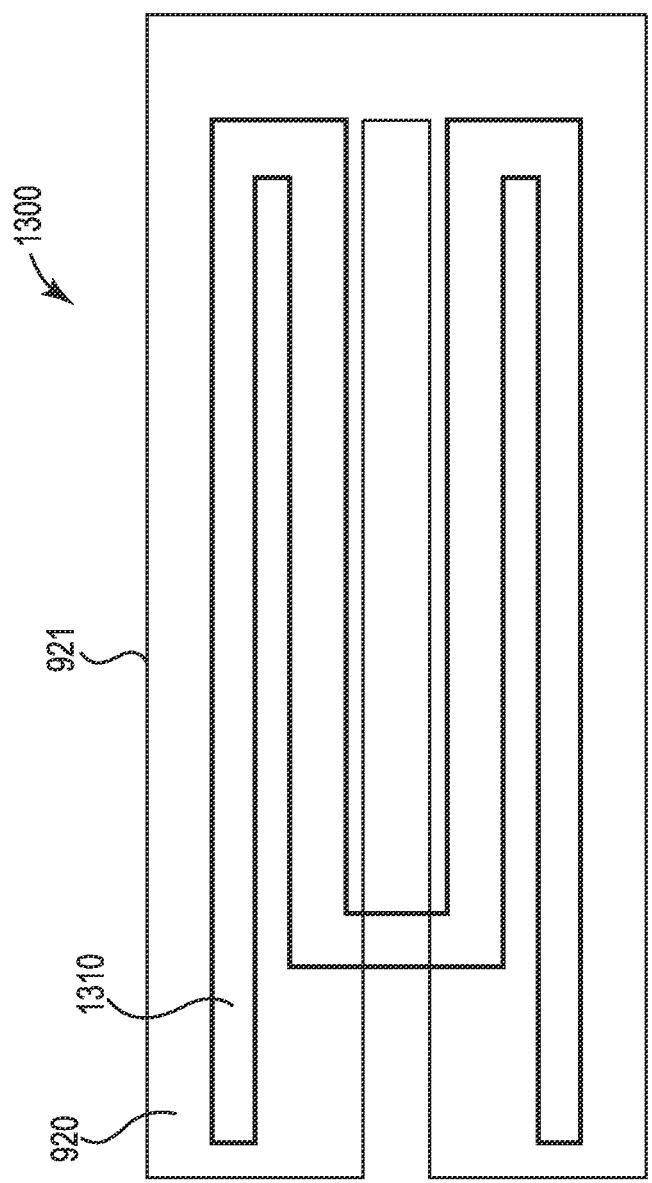
FIG. 15 is a diagram of a side view of an embodiment of a system with a reaction chamber having two passes and a four-pass bypass manifold attached to the outside of the reaction chamber to increase residence time.

FIG. 15 is a diagram of a side view of an embodiment of a system with a reaction chamber having two passes and a four-pass bypass manifold attached to the outside of the reaction chamber to increase residence time. The system (1300) comprises a bypass manifold (1310 that is in communication with the processed biogas within reaction chamber through apertures (not shown) in the surface (921) of the reaction chamber and manifold where they connect. This permits the deconstructed gas product to experience extended residence times where appropriate for desired conversion of processed organic-carbon-containing feedstock into product gas fuel and solid char fuel.

Figure 16:
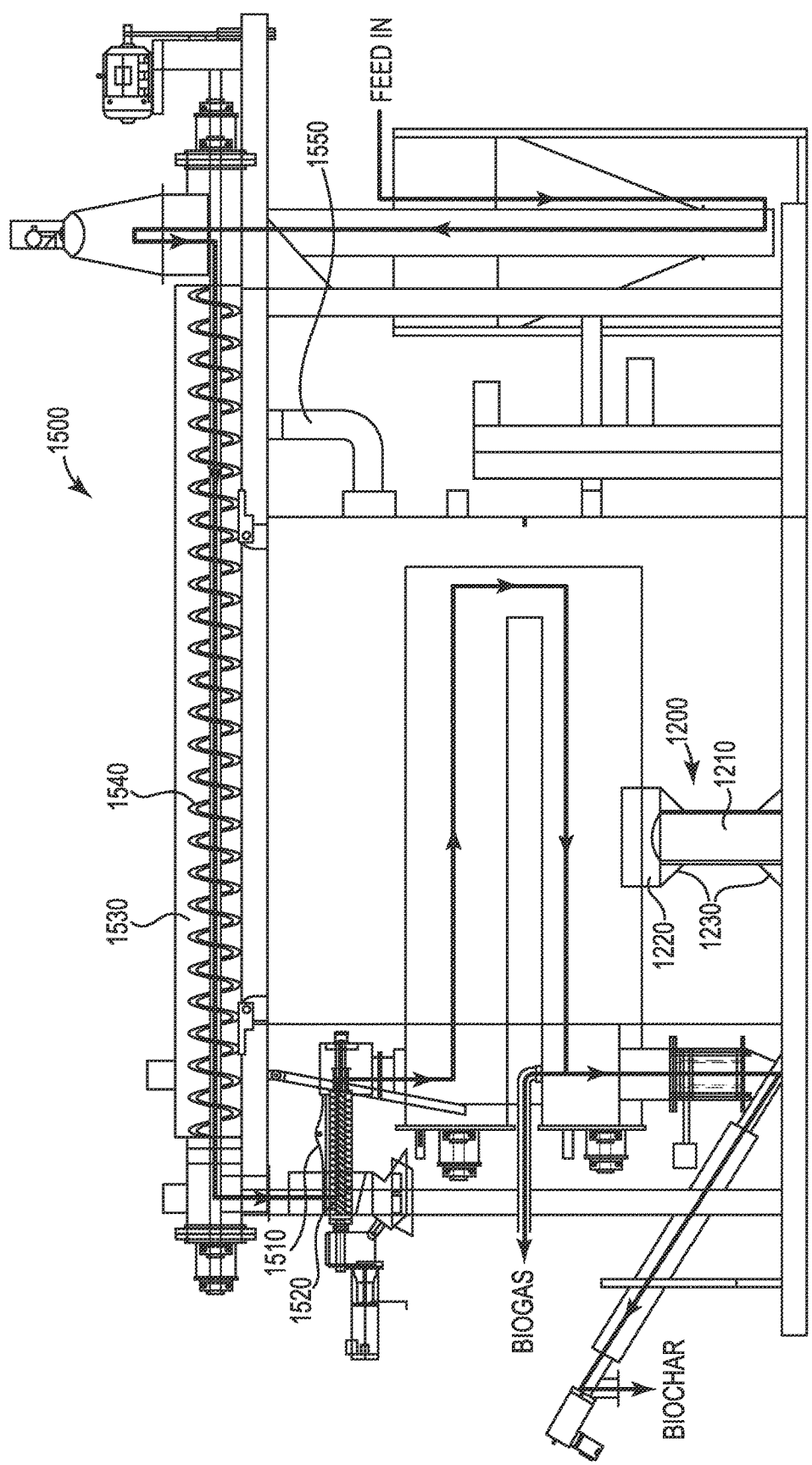
FIG. 16 is a diagram of a side view of an embodiment of a system with a substantially horizontal reaction chamber having two passes, a compression chamber, and a drying chamber.

FIG. 16 is a diagram of a side view of an embodiment of a system with a reaction chamber having two passes, a compression chamber, and a drying chamber. This system is similar to that shown in FIG. 14 with additional processing chambers. The passage of material as it enters and progresses through the system until it exits as product fuel is shown by a heavy line. System 1500 comprises a preparation chamber (1510) for compressing carbon-containing feedstock into a plug prior to entry into the front end 930 of the reaction chamber. A second powered transport mechanism (1520) is inside the chamber to accomplish the compression. Some additional drying may also occur here. A pre-preparation chamber (1530) is in communication with the preparation chamber 1510 with a third powered transport mechanism (1540) to convey the processed organic-carbon-containing feedstock in a heated environment to dry the feedstock. A channel (1550) is used to funnel hot combustion gases from the hot box into the pre-preparation chamber to assist in part or all of this drying.

Another embodiment of the invention involves a process for converting a carbon-containing compound to product gas fuel and solid char fuel. The process comprises at least four steps. The first step is inputting processed organic-carbon-containing feedstock into a substantially horizontal sublimating reaction chamber largely contained within a hot box and configured to be able to heat from an ambient temperature to an operating sublimation temperature, operate at a sublimation temperature, and cool from an operating sublimation temperature to an ambient temperature without leaking any hot product gas fuel from the reaction chamber into the hot box or atmosphere, or leaking any oxygen from outside the hot box into the hot box. The second step is heating processed organic-carbon-containing feedstock to a sublimating temperature before it is able to form a liquid phase. The third step is maintaining the temperature at a sublimation temperature for a residence time that is as long a time as needed to convert the carbon-containing feedstock to product gas fuel and solid char fuel. The fourth step is separating the product gas fuel from the solid char fuel.

Heat generated by the process may be used in various ways. Some embodiments may use direct heated combustion gases from the hot box to a pre-preparation chamber to dry the processed organic-carbon-containing feedstock before it enters a preparation chamber for compression, if needed, and a sublimation chamber. Some embodiments may use the heat for other purposes such as heating buildings.

Heat used to sublimate the feedstock may be supplied by combusting part of the product fuel gas. Sublimation temperatures can be maintained with a small fraction of the product gas fuel being used as fuel for burners as discussed above.

Vertical Sublimation Oxygen-Deficient Thermal Sub-System

The vertical sublimation oxygen-deficient thermal sub-system comprises three elements, a vertical reaction chamber, a first powered transport mechanism, and a self-adjusting seal. The first, at least one substantially vertical reaction chamber, is configured to heat the processed organic-carbon-containing feedstock without external catalyst or additional water, carbon dioxide, or carbon monoxide, to an operating sublimation temperature in a time frame that is short enough to sublime at least part of the processed organic-carbon-containing feedstock without creating substantially any liquid. The second, the first powered transport mechanism, is located partly within the reaction chamber, has an extended part that extends outside the reaction chamber, and is configured to convey sublimation products of the processed organic-carbon-containing feedstock through the reaction chamber as the processed organic-carbon-containing feedstock is transformed into biogas and processed biochar. The third, the self-adjusting seal, is configured to continuously contain the processed biogas within the reaction chamber at the region surrounding the extended part of the powered transport mechanism during changing temperatures of startup and shutdown operations, and during steady-state sublimation temperature during operation.

To better understand this sub-system, the vertical sublimation sub-system will be discussed with reference at times to a particular embodiment or embodiments. However, it is understood that other embodiments may be used as long as they perform the sublimation desired.

The vertical sublimation oxygen-deficient thermal sub-system is designed for processing high-density feedstock, like tires, plastic, wood, and coal. High density means that the feedstock has a high weight per unit volume. Feedstock preparation will be dictated by characteristics of the processed organic-carbon-containing feedstock such as size or thickness, and density of the processed organic-carbon-containing feedstock from the beneficiation sub-system. In general the desirable size or thickness is on the order of less than 0.5 inch (13 mm) in the longest dimension of the particle. The particle size is important in the vertical sub-system because denser materials take more time to heat thoroughly from the particle surface to its internal midpoint. Volatile gases are formed at the midpoint or center of the particle and have to travel to the surface of the particle where they are released into the reaction chamber environment. The sublimed gas should be created as quickly as possible and stay in the gas phase at all times for best conversion of the processed organic-carbon-containing feedstock into processed biogas and processed biochar. A high density feedstock allows the particles to fall through the reaction chamber and reach the bottom where they are eventually separated in to the gas and solid forms. At times, the processed organic-carbon-containing feedstock may have to be further compressed to achieve desired density and further manipulated to achieve desired particles sizes.

After the processed organic-carbon-containing feedstock is properly prepared, it is conveyer to the top of the vertical sub-system by such as, for example, an auger or some other material conveying device. During the transportation of the feedstock, heat may be recycled from downstream processes to maximize removal of any free water. Then the feedstock is deposited into a hopper of a compression auger. The compression auger reduces the free water and entrained air content. This will increase the heat absorption by the feedstock and reduce the amount of oxygen present. Reducing the oxygen content that comes from the water and air will result in less carbon dioxide and carbon monoxide in the produced biogas and less contaminants in the processed biochar. A feedstock plug or seal is created at the end of the compression screw at the entrance point to the reaction chamber. Thus, when the feedstock enters the reaction chamber, the produces biogas that is created does not travel back and escape to create a hazardous situation.

As the feedstock enters the reaction chamber, the feedstock is immediately subjected to a stream of superheated gas that sublimes the volatiles from the feedstock. As the volatilized gas and the devolatized feedstock, now reduced to carbon, falls the length of the reaction chamber tube, the volatilized gas and the carbon solid intermingle, react, and gain momentum. At the bottom of the shared common reaction chamber tube, the devolatilized carbon drops down into a collection hopper and the gas stream is split into two streams that move laterally over and up two reaction chamber tubes on either side of the common down tube. The reaction chamber looks like two of the letters "O" that are connected in the middle. The two up tubes of the reaction chamber now carry the hot gas upward and assisted by a turbine fan. Two-thirds of the way up each of the two up-tubes is a super-heater that raises the temperature of the gas. It is more economical to super heat just the gas than to heat the incoming feedstock. The super heated gas is now reaching the top of the up reaction chamber tubes and is directed from the top of each up tube, laterally, over to the top of the shared common down tube where the entrance of the feedstock is located. The super heated gas then is used to sublime the incoming feedstock and everything repeats itself in the down tube in a closed loop cycle. When the tubes in the reaction chamber are in equilibrium and balanced, the produced biogas is pulled through an outlet at the top of one of the upward reaction tubes, cooled, and stored as processed biogas. The carbon exits the bottom of the common middle tube and is transported by auger, cooled, and collected for storage as processed biochar.

The reaction chamber in the sub-system is a three dimensional, rectangular box with the longest side perpendicular to the ground. On the topside is a compression screw and feedstock entrance port. On the bottom side is a collection cone with an exit auger at the bottom of the cone for produced biochar.

Inside the reaction chamber heater box are three connected and continuous tubes with the middle tube shared between the two outside tubes such that the three tubes act as one tube. The middle tube acts as a down draft while the two outside tubes act as updrafts. In this configuration, the feedstock enters at the top of the middle tube and free falls as the feedstock traverses the length of the tube. This is where the sublimation of the feedstock occurs. There is a junction at the bottom of the middle tube where the tube makes two lateral splits. At the end of each lateral split, a tube continues up on both sides of the middle tube. Thus, all three reaction chamber tubes are continuous and sealed so that the reaction chamber remains isolated from outside contaminants and only contains the feedstock that is to be processed. No external air, steam, or catalyst is introduced.

On the outside of the reaction chamber, but connected to it, are two burners that heat the space between the inside of the outside box wall and the outside of the inside wall of the internal tube configuration. This space is heavily insulated and keeps the reaction chamber environment at a minimum temperature.

In operation, the sublimated feedstock at the bottom of the middle downdraft tube of the reaction chamber has separated into a devolatilized carbon and processed biogas. The stream of processed biogas splits and travels laterally to the outside updraft reaction chamber tubes. The devolatilized carbon settles into the collection cone and is removed by an auger. The devolatilized carbon is still in the heated reaction chamber environment so this acts as a polishing step to make sure all of the volatile gases that can be created will be captured and continue in the subliming process through the reaction chamber updraft tubes. After some residence time, the carbon can be passed through an auger into a cooling chamber and then stored as processed biochar. Residence time depends on the nature and volume of the processed organic-carbon-containing feedstock. In some embodiments, the residence time is less than 10 minutes, in some less than 7 minutes, in some less than 5 minutes, in some less than 3 minutes, and in some less than 2 minutes.

At the split at the bottom of the middle downdraft tube the carbon drops out and only the processed biogas continues to travel laterally to the outside updraft tubes of the reaction chamber. The product processed biogas travels up the updraft tubes carried by their own inertia from traversing the downdraft tube with some optional assistance by a turbine fan placed at the top of the updraft tubes. Attached on the outside wall of both updraft tubes but still inside of the external wall of the reaction chamber box is laced one super heater on each outside tube. During startup, as the processed biogas traverses the updraft tube back to the top of the top part of the reaction chamber tubes, it passes through the super heaters and the temperature in the reaction chamber is increased to a preselected temperature that is the desired equilibrium temperature. It is more economical to super heat just the processed biogas than the input processed organic-carbon-containing feedstock. The superheating assists in the further dissociation of the processed biogas when it comes in contact with the devolatilized carbon in the downdraft tube.

As the two superheated processed biogas streams reach the top of the two outside tubes, they are comingled with the fresh incoming feedstock as it enters the middle downdraft tube and sublime that feedstock. The cycle of the fresh feedstock coming into the reaction chamber, the fresh feedstock mixing with the superheated processed biogas and the mixture entering the reaction chamber tubes completes the reaction processing cycle. When the reaction reaches equilibrium and balance, more feedstock is added and both processed biochar and processed biogas is removed according to predetermined production rates.

Figures 17, 17A:
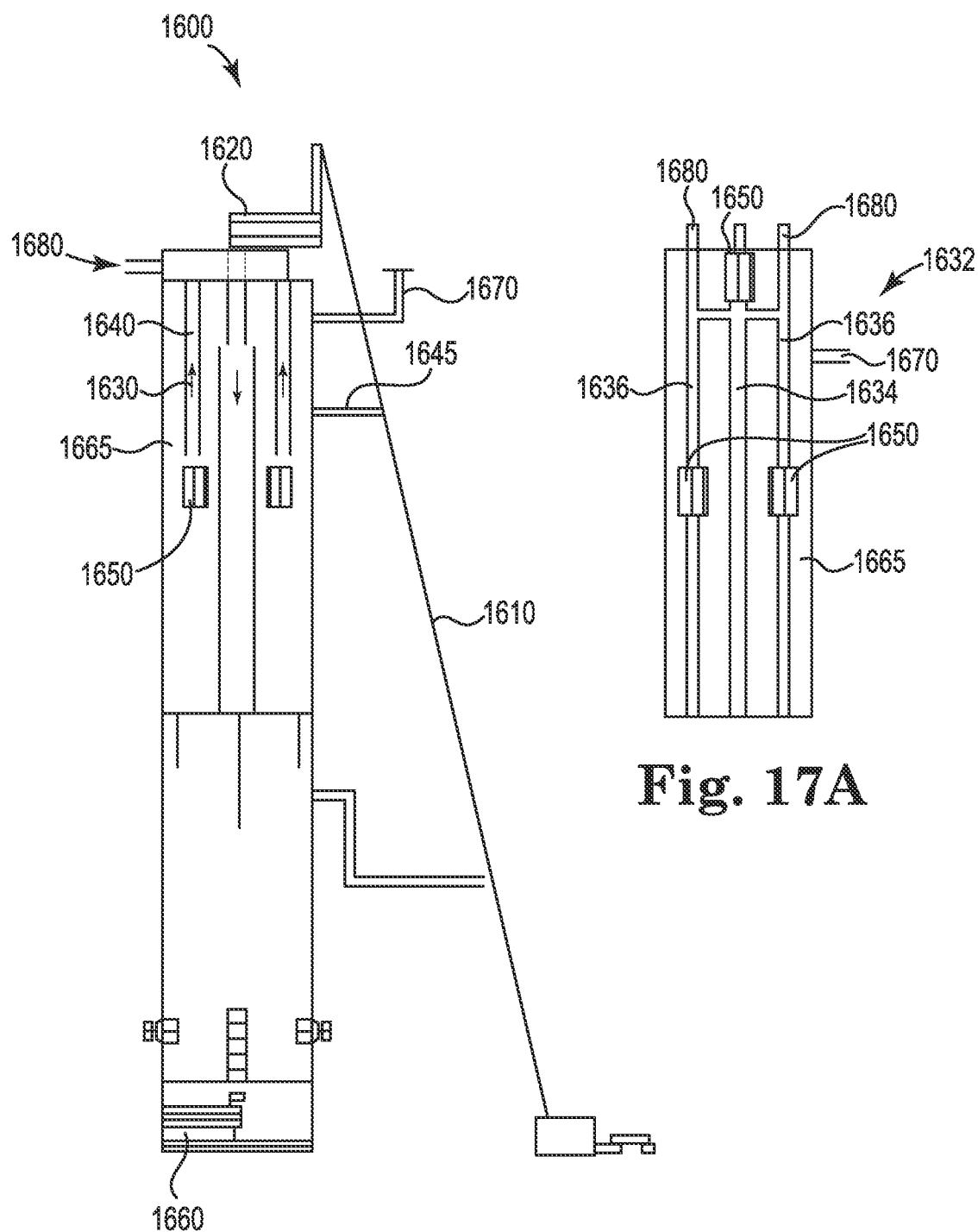
FIG. 17 is a diagram of a side view of an embodiment of a system with a substantially vertical reaction chamber.
FIG. 17A is a diagram of the reaction tube array of the embodiment shown in FIG. 17.

FIG. 17 is a diagram of a side view of an embodiment of a system with a substantially vertical reaction chamber. This system (1600) has a compression feed system (1610) that is in communication with a compression auger (1620). Processed organic-carbon-containing feedstock follows a double circular path (1630) with circulating processed biogas (1640) a reaction chamber (1632) that is more clearly illustrated in FIG. 17A. Reaction chamber 1632 is in a hot box (1665). A bypass (1645) directs some overflow heat from hot box 1665 to preheat the incoming processed organic-carbon-containing feedstock in compression feed system 1610. Heat exchangers 1650 within hot box 1665 super heat circulating processed biogas 1640 to achieve and maintain the target subliming temperature. A carbon auger (1660) removes the processed biochar. The rest of the overflow heated gas leaves hot box 1665 through a heater exhaust exit (1670) and processed biogas passes through a processed biogas exhaust exit (1680).

FIG. 17A is a diagram of tube array of the embodiment shown in FIG. 17. A reaction chamber (1632) is depicted with a tube array comprising a middle downdraft reaction tube (1634) bracketed by two outer updraft reaction tubes (1636) within hotbox 1665. Heat exchangers 1650 heat outer updraft reaction tubes 1636 below the cross tee and the input downdraft tube 1634 above the cross tee. Excess hot gas leaves through exhaust exit 1670 and processed biogas leaves through outlet 1680 in reaction chamber 1632.

Microwave Sub-System

The microwave sub-system is another form of the heating sub-system that is used to convert the processed organic-carbon-containing feedstock from the beneficiation sub-system into a processed biochar that is subsequently made into a processed biomass/cleaned coal blended compact aggregate of the invention. The sub-system comprises a processed biochar composition made from a processed organic-carbon-containing feedstock that passes through a microwave process sub-system. The sub-system includes at least one reaction chamber within a microwave reflective enclosure and comprising at least one microwave-transparent chamber wall and a reaction cavity configured to hold the processed organic-carbon-containing feedstock in an externally supplied oxygen-free atmosphere. A microwave sub-system includes at least one device configured to emit microwaves when energized. The microwave device is positioned relative to the reaction chamber so that the microwaves are directed through the microwave-transparent chamber wall and into the reaction cavity. The sub-system also includes a mechanism that provides relative motion between the microwave device and the reaction chamber. The processed biochar composition includes substantially no free water. Also the processed biochar composition includes a number of pores per volume that is at least 10 percent more than would have been in a char made with the same feedstock but using a thermal process that creates a liquid phase during the process. The characteristics of the feedstock and resulting processed biochar have already been discussed above. The microwave process used to make the processed biochar of the invention is now discussed.

In the following description of the illustrated embodiments, references are made to the accompanying drawings that help to illustrate various embodiments of the microwave process used to make the processed biochar of the invention. It is to be understood that other embodiments of the process may be utilized and structural and functional changes may be made without departing from the scope of the present invention.

The following description relates to approaches for processing solid and/or liquid organic-carbon-containing feedstock into fuels, e.g., diesel fuels, gasoline, kerosene, etc., by microwave enhanced reaction deconstruction processes.

Deconstruction, also referred to as "cracking", is a refining process that uses heat to break down (or "crack") hydrocarbon molecules into shorter hydrocarbon chains which are useful as fuels. Deconstruction may be enhanced by adding a catalyst to the feedstock which increases the speed of the reaction and/or reduces the temperature and/or the radiation exposure required for the processes. Furthermore, the catalyst, such as zeolite, has a nanostructure which allows only molecules of a certain size to enter the crystalline grid or activate the surface areas of the catalyst and to interact with the catalyst. Thus, the catalyst advantageously is very effective at controlling the product produced by the reaction processes because only substances having a specified chain length may be produced using the catalytic process. Catalytic deconstruction is particularly useful for transforming biomass and other organic-carbon-containing feedstock into fuels useable as transportation or heating fuels.

One aspect of efficient deconstruction is the ability to heat and irradiate the feedstock substantially uniformly to the temperature that is sufficient to cause deconstruction as well as activate the catalyst. Upon deconstruction, long hydrocarbon chains "crack" into shorter chains. Microwave heating has been shown to be particularly useful in heating systems for thermal deconstruction. Heating systems such as flame, steam, and/or electrical resistive heating, heat the feedstock by thermal conduction through the reaction chamber wall. These heating systems operate to heat the feedstock from the outside of the reaction chamber walls to the inside of the feedstock, whereas microwaves heat uniformly throughout the width of the reaction chamber. Using non-microwave heating sources, the heat is transferred from the heat source outside wall to the inside of the vessel wall that is in direct contact with the feedstock mixture. The heat is then transferred to the surfaces of the feedstock and then transferred, again, through the feedstock until the internal areas of the feedstock are at a temperature near the temperature of the reaction chamber wall.

One problem with this type of external heating is that there are time lags between vessel wall temperature transmission and raising the feedstock temperature that is contained in the center of the vessel as well as the internal area of the feedstock matrix. Mixing the feedstock helps to mitigate these conditions. Still, millions of microenvironments exist within the reactor vessel environment and the feedstock particles themselves. This causes uneven heat distribution within the reaction chamber of varying degrees. These variant temperature gradients cause uncontrollable side reactions to occur as well as degradation of early conversion products that become over-reacted because of the delay in conversion reaction timeliness. It is desirable to produce and retain consistent heating throughout the feedstock and the reaction products so that good conversion economics are achieved and controllable. Microwave heating is an efficient heating method and it also serves to activate catalytic sites.

Embodiments of the invention are directed to a reaction chamber system that can be used to process any organic-carbon-containing feedstock, whether solid and/or liquid, to extract the volatile organic compounds in the feedstock at a temperature range that will produce liquid transportation fuels.

Microwaves are absorbed by the water molecules in the material that is irradiated in the microwave. When the water molecules absorb the microwaves, the molecules increase their vibrorotational motions, which create heat by friction, and the heat is convected to the surrounding material. The reason microwaves are absorbed by water molecules is specific to the covalent bonds that attach the hydrogen to the oxygen in a water molecule. The oxygen atom in water has a large electronegativity associated with it. Electronegativity for an element is its propensity to collect extra electrons, either completely in an ionic bond or through skewing the electron cloud of a covalent bond toward that element. The driving force is from quantum chemistry, namely the filling of the 2p shell of oxygen from the addition of 2 electrons. The electronegativity scale, driven by the stability of filling the outer electron shell, starting at the most electronegative element, is F>O>N>Cl>Br>S>C>H. Therefore, the valence electrons in water are skewed toward the oxygen, creating a permanent electric dipole moment with the negative pole toward the oxygen and the positive pole between the two hydrogen atoms. The electrons from the two hydrogen atoms are drawn closer to the oxygen atom. This gives this end of the molecule a slight negative charge and the two hydrogen atoms then have a slight positive charge. The consequence of this distortion is that the water molecule possesses a permanent electric dipole. The dipole feature of the water molecule allows the molecule to absorb the microwave radiation and increases the rotational speed of gaseous water molecules and/or increases the low frequency vibrational movements associated with frustrated rotations of the extended structure of liquid water. The increased motion of the water molecules causes friction that turns to heat and then convects out into the irradiated material.

To take advantage of this feature of microwave radiation, a reaction chamber system described herein takes advantage of microwave irradiation and heating in processing feedstock that contains carbon and can be converted to transportation fuels. The reactor may be made from a substantially microwave transparent substance such as quartz, a crystalline material that is substantially transparent to microwave radiation. Because quartz can be manipulated into many shapes, it provides design discretion for shaping the reaction chamber, but in one example the reaction chamber is configured in the shape of a tube or cylinder. The cylindrical shape allows for the feedstock to feed in one end and exit at the opposite end. An example of a suitable reaction chamber would be a quartz tube that is about four feet (1.2 meters) long with a wall thickness of about 3/16 inch (4.8 mm).

The microwave reaction chamber is surrounded by a microwave reflective enclosure. This causes the microwave radiation to pass repeatedly through the reaction chamber and devolatize the organic-carbon-containing feedstock after the water, if present, is evaporated and driven off. The microwave reflective enclosure is any that reflects microwaves. Materials include, for example, sheet metal assembled as Faraday cages that are known to the art.

Microwave radiation is generated by a magnetron or other suitable device. One or more microwave producing devices, e.g., magnetrons can be mounted external to the quartz tube wall. Magnetrons come in different power ranges and can be controlled by computers to irradiate the processing feedstock with the proper power to convert the feedstock to most desirable fuel products efficiently, given the residence time in the reactor. In one application, the magnetron can be mounted on a cage that would rotate around the outside of the reactor tube as well as travel the length of the reactor tube. Feedstock traveling through the length of the inside of the tube will be traveling in a plug flow configuration and can be irradiated by fixed and/or rotating magnetrons. A computer may be used to control the power and/or other parameters of the microwave radiation so that different feedstock, with different sizes and densities can be irradiated at different parameter settings specific to the feedstock and thus convert the feedstock more efficiently.

These configurations of a reactor will allow efficient processing of feedstock, from relatively pure feedstock streams to mixed feedstock streams that include feedstock of different densities, moisture contents, and chemical makeup. Efficiencies can occur because the fuel products are extracted from the reactor chamber as they are vaporized from the feedstock, but further processing of the remaining feedstock occurs until different fuel products are vaporized and extracted. For example, dense feedstock, such as plastics, take longer to process into a useable fuel than less dense feedstock, such as foam or wood chips. The microwave sub-system described herein continues to process dense feedstock without over-processing the earlier converted products from the less dense feedstock. This is accomplished by using both stationary and rotating microwave generators.

One example of a mixed feedstock would be unsorted municipal solid waste. In some implementations, catalyst may be added in the feedstock which helps in the conversion of the feedstock as well as the speed at which the conversion can progress. A catalyst can be designed to react at the preset processing temperature inside the reactor or to react with the impinging microwave radiation. In some embodiments, no catalyst is required. In other embodiments, the catalyst may be a rationally designed catalyst for a specific feedstock.

The plug flow configuration with the reactors described herein will allow adjustments to the residence time that the feedstock resides within the reactor core for more efficient exposure to the heat and the radiation of the microwaves to produce the desired end products.

Inlets and/or outlets, e.g., quartz inlets and/or outlets can be placed along the walls of the reaction chamber to allow for pressure and/or vacuum control. The inlets and outlets may allow the introduction of inert gases, reactive gases and/or the extraction of product gases.

Thus, the design of the microwave-transparent reaction chamber, the use of microwaves as a heating and radiation source with fixed and/or rotating magnetrons, plug flow processing control, with or without the use of catalysts, will allow the processing of any organic-carbon-containing feedstock. An advantage to beneficiating the organic-carbon-containing feedstock is that it has, to a large extent, already been brought to an acceptable moisture level and is already fairly homogeneous. For homogeneity on the macro-scale, the output from different organic-carbon-containing feedstock inputs have substantially similar characteristics (e.g. energy density, consistency, moisture content), and these characteristics extend throughout the material. On, the molecular scale, with fewer salts present, there are fewer microenvironments where the microwaves would deposit energy differently than in the bulk of the organic-carbon-containing feedstock. Therefore, the heating would be more uniform from beneficiated organic-carbon-containing feedstock than from raw unprocessed organic-carbon-containing feedstock inputs.

A microwave sub-system in accordance with embodiments of the invention includes a reaction chamber having one or more substantially microwave-transparent walls and a microwave heating/radiation system. The microwave heating/radiation system is arranged so that microwaves generated by the heating/radiation system are directed through the substantially microwave-transparent walls of the reaction chamber and into the reaction cavity where the feedstock material is reacted without substantially heating the walls of the reaction chamber. To enhance the temperature uniformity of the feedstock, the reaction chamber and the heating/radiation system may be in relative motion, e.g., relative rotational and/or translational motion. In some implementations, the heating system may rotate around a stationary reaction chamber. In some implementations, the feedstock within the reaction chamber may rotate by the use of flights with the heating/radiation system remaining stationary. In some implementations, the reaction chamber may rotate with the heating system remaining stationary. In yet other implementations, both the reaction chamber and the heating/radiation system may rotate, e.g., in countercurrent, opposing directions. To further increase temperature uniformity, the system may include a mechanism for stirring and/or mixing the feedstock material within the reaction chamber. The reaction chamber may be tilted during reaction process, for example, to force the feedstock to go through the catalytic bed.

Figure 18A:
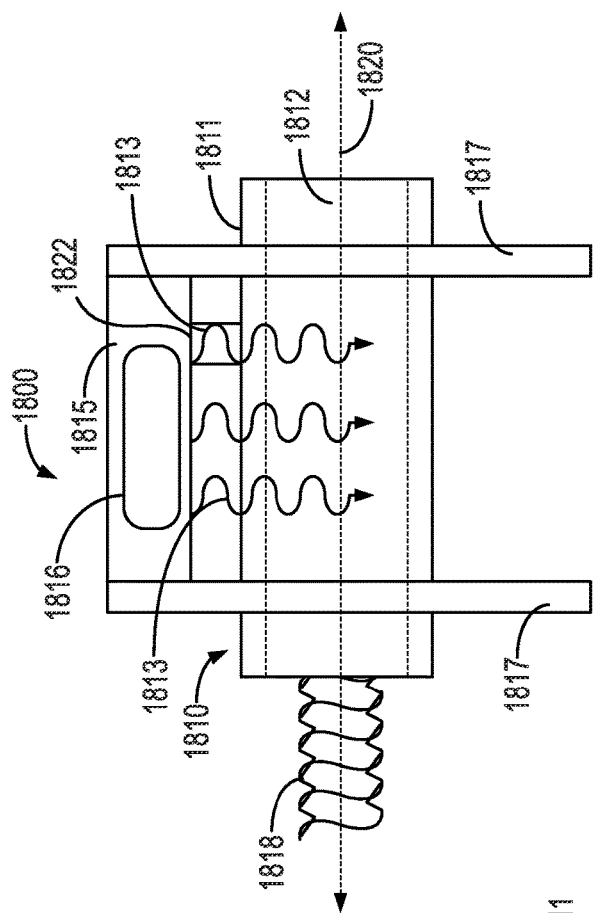
FIGS. 18A and 18B illustrate side and cross sectional views, respectively, of a reaction chamber of an embodiment of a microwave sub-system configured to convert organic-carbon-containing materials to biochar.
Figure 18C:
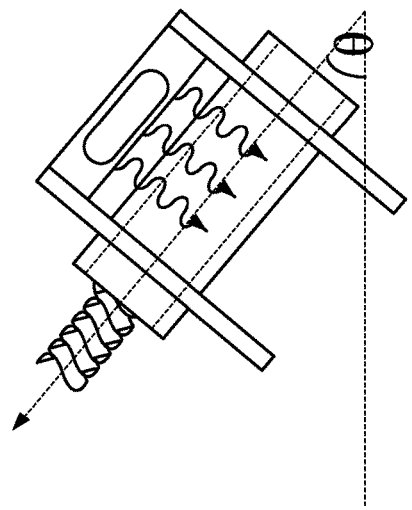
FIG. 18C is a diagram of a tilted reaction chamber of an embodiment of the microwave sub-system.
Figure 18B:
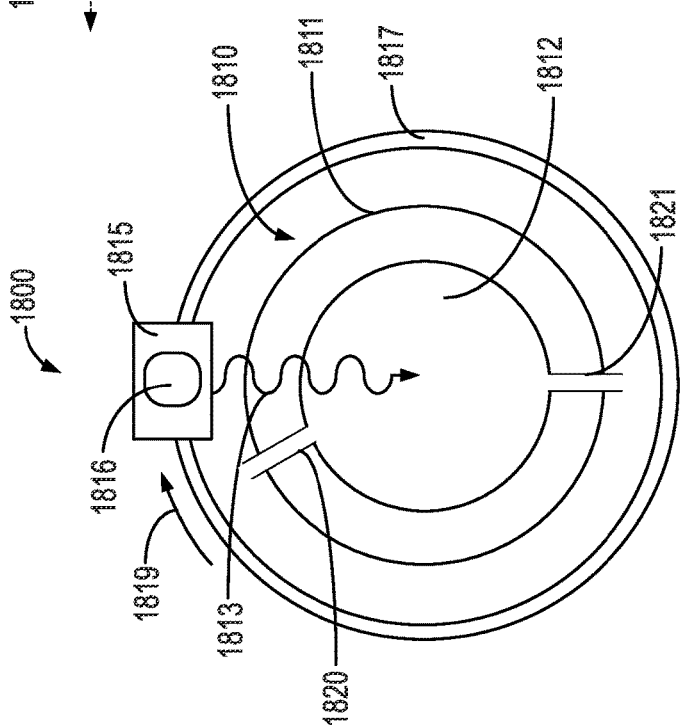

FIGS. 18A and 18B illustrate side and cross sectional views, respectively, of a microwave sub-system (1800) for converting organic-carbon-containing feedstock to liquid fuel and processed biochar fuel in accordance with embodiments of the invention. Although a reaction chamber (1810) may be any suitable shape, reaction chamber 1810 is illustrated in FIGS. 18A and 18B as a cylinder having a cylindrical wall (1811) that is substantially transparent to microwaves in the frequency range and energy used for the reaction process. Reaction chamber 1810 includes a reaction cavity (1812) enclosed by cylindrical wall 1811. Microwave sub-system 1800 includes a transport mechanism (1818) configured to move the feedstock through the reaction chamber. The operation of microwave sub-system 900 with regard to the reactions taking place within reaction chamber 1810 may be modeled similarly to that of a plug flow reactor.

As illustrated in FIG. 18A, a microwave sub-system includes transport mechanism 1818 for moving the feedstock material through reaction chamber 1810. Transport mechanism 1818 is illustrated as a screw auger, although other suitable mechanisms, e.g., conveyer, may also be used. Transport mechanism 1818 may further provide for mixing the feedstock within the reaction chamber. In some embodiments, reaction chamber wall 1811 may have a thickness of about 3/16 inch (4.8 millimeters). The smoothness of reaction chamber wall 1811 facilitates the movement of the feedstock through reaction chamber 1810.

A heating/radiation subsystem (1815) may include any type of heating and/or radiation sources, but preferably includes a microwave generator (1816) such as a magnetron which is configured to emit microwaves (1813) having a frequency and energy sufficient to heat the organic-carbon-containing feedstock to a temperature sufficient to facilitate the desired reaction of the feedstock, for example, for deconstruction of the feedstock, microwaves in a frequency range of about 0.3 GHz to about 300 GHz may be used. For example, the operating power of the magnetrons may be in the range of about 1 Watt to 500 kilowatts. Magnetron 1816 is positioned in relation to reaction chamber 1810 so that microwaves 1813 are directed through wall 1811 of reaction chamber 1810 and into reaction cavity 1812 to heat and irradiate the material therein. A mechanism (1817) provides relative motion between magnetron 1816 and reaction chamber 1810 along and/or around longitudinal axis 1820 of reaction chamber 1810. In some embodiments, mechanism 1817 may facilitate tilting reaction chamber 1810 and/or magnetron 1816 at an angle θ (see FIG. 18C) to facilitate the reaction of the feedstock and/or the extraction of gases, for example. In the embodiment illustrated in FIGS. 18A-C, magnetron 916 is positioned on rotational mechanism 1817, such as a rotatable cage or drum that rotates magnetron 1816 around stationary reaction chamber 1810. In some implementations, the rotation around the chamber may not be complete, but the rotation path may define an arc around the circumference of the reaction chamber. The rotation may occur back and forth along the path of the arc. As previously mentioned, in some embodiments, reaction chamber 1810 may be the rotating component, or both magnetron 1816 (also called the heating/radiation subsystem) and reaction chamber 1810 may rotate, e.g., in opposing, countercurrent directions. The rotation between the reaction chamber and the magnetron provides more even heating and more even microwave exposure of the feedstock within reaction cavity 1812, thus enhancing the efficient reaction chemistry of the feedstock and/or other processes that are temperature/radiation dependent, such as removal of water from the feedstock. The rotation lessens the temperature gradient and/or maintains a more constant microwave flux across the plug inside the reaction chamber.

Reaction chamber 1810 may include one or more entry ports (1820), e.g., quartz entry ports, configured to allow the injection or extraction of substances into or out of reaction cavity 1812. Reaction chamber 1810 is also surrounded by a microwave-reflective enclosure (1822). In one implementation, the quartz ports may be used to extract air and/or oxygen from the reaction cavity. Extraction of air and/or oxygen may be used to suppress combustion which is desirable for some processes.

For example, in certain embodiments, microwave sub-system 1800 may be used to preprocess the feedstock through compression and/or removal of air and/or water. In this application, gases such as hydrogen and/or nitrogen may be injected through one or more ports 1820 to hydrogenate and/or suppress combustion of the feedstock. Reaction chamber 1810 may also include one or more exit ports (1821), e.g., quartz exit ports, configured to allow passage of water, water vapor, air, oxygen and/or other substances and/or by-products from reaction chamber 1810. In other embodiments, the processed organic-carbon-containing feedstock is already sufficiently compressed and reduced in both air and water to be introduced directly into the reaction chamber.

Figure 18D:
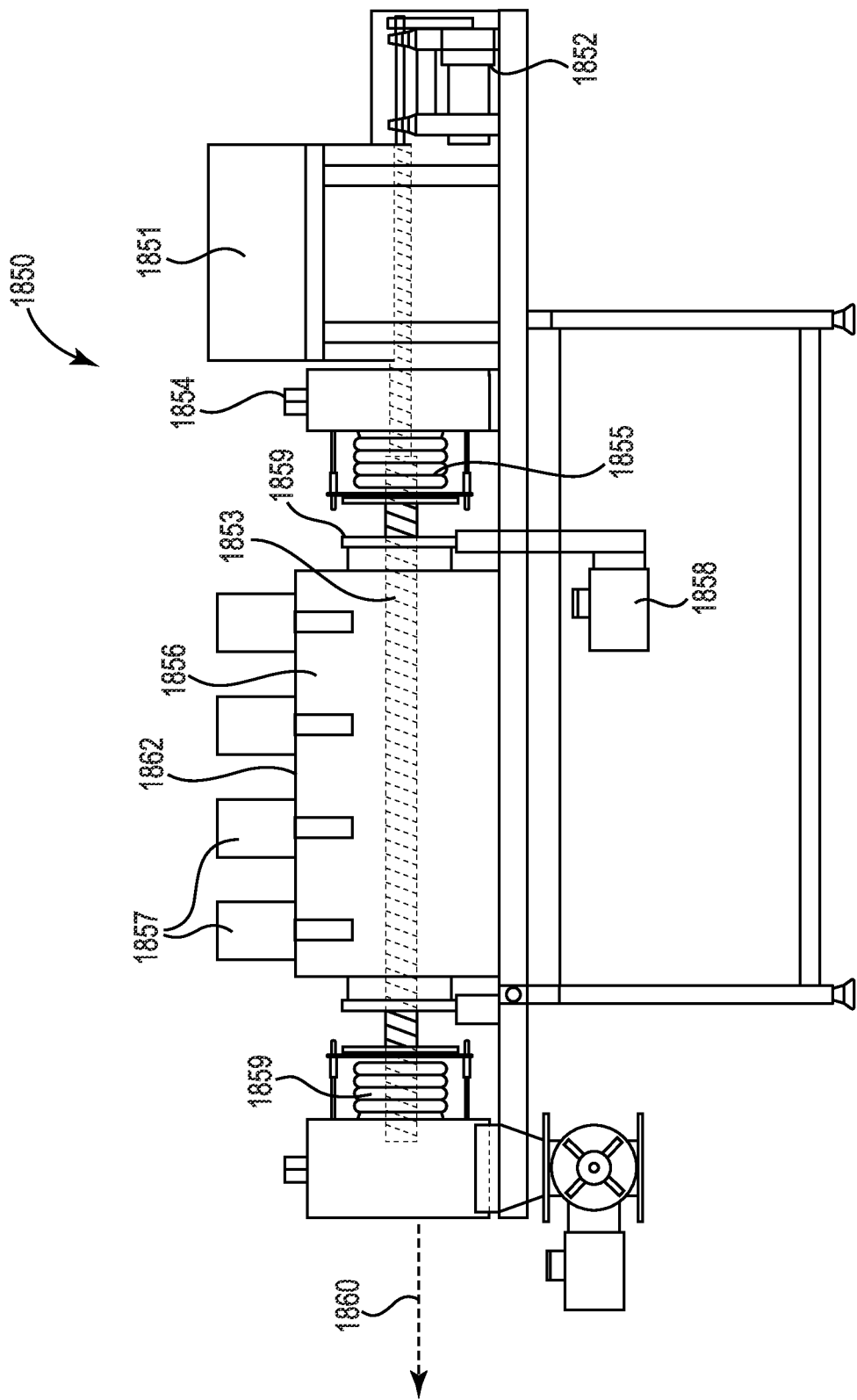
FIG. 18D is a diagram of a side view of an embodiment of the microwave sub-system.

FIG. 18D is a diagram illustrating a microwave-sub-system (1850) for producing fuel from organic-carbon-containing feedstock in accordance with embodiments of the invention. Microwave sub-system 1850 includes an input hopper (also referred to as a load hopper) 18951) configured to allow introduction of the feedstock material into microwave sub-system 1850. A gearmotor auger drive (1852) provides a drive system for the auger (1853) that transports the feedstock through microwave sub-system 1850. As the feedstock is compressed in load hopper 951, air is extracted through an atmosphere outlet (1854). A seal (1855) isolates load hopper 1851 from a reaction chamber (1856) to maintain a level of vacuum. Reaction chamber 1856 includes walls of a microwave-transparent material. One or more stationary microwave heads 1857 are positioned at the walls of the reaction chamber 1856. In addition, microwave sub-system 1850 includes one or more rotating microwave heads (1858). In one implementation, each rotating microwave head is located at a fixed position with respect the longitudinal axis (1860) of reaction chamber 1856. The rotating microwave head is mounted on a slipring bearing (1859) which allows microwave head 958 to rotate around reaction chamber 1856. A microwave reflective enclosure (1862) encompasses reaction chamber 1856. In some implementations rotating microwave head(s) 958 may rotate around the longitudinal axis 1860 of the reaction chamber 1856 as well as moving back and forth along the longitudinal axis 1860. Microwave sub-system 950 includes a seal at the exit of reaction chamber 1856 to maintain the reaction chamber vacuum. In some embodiments, the organic-carbon-containing feedstock is compressed in the sub-beneficiation system discussed earlier before it enters the microwave sub-system and little if any air extraction is needed.

Figure 19A:
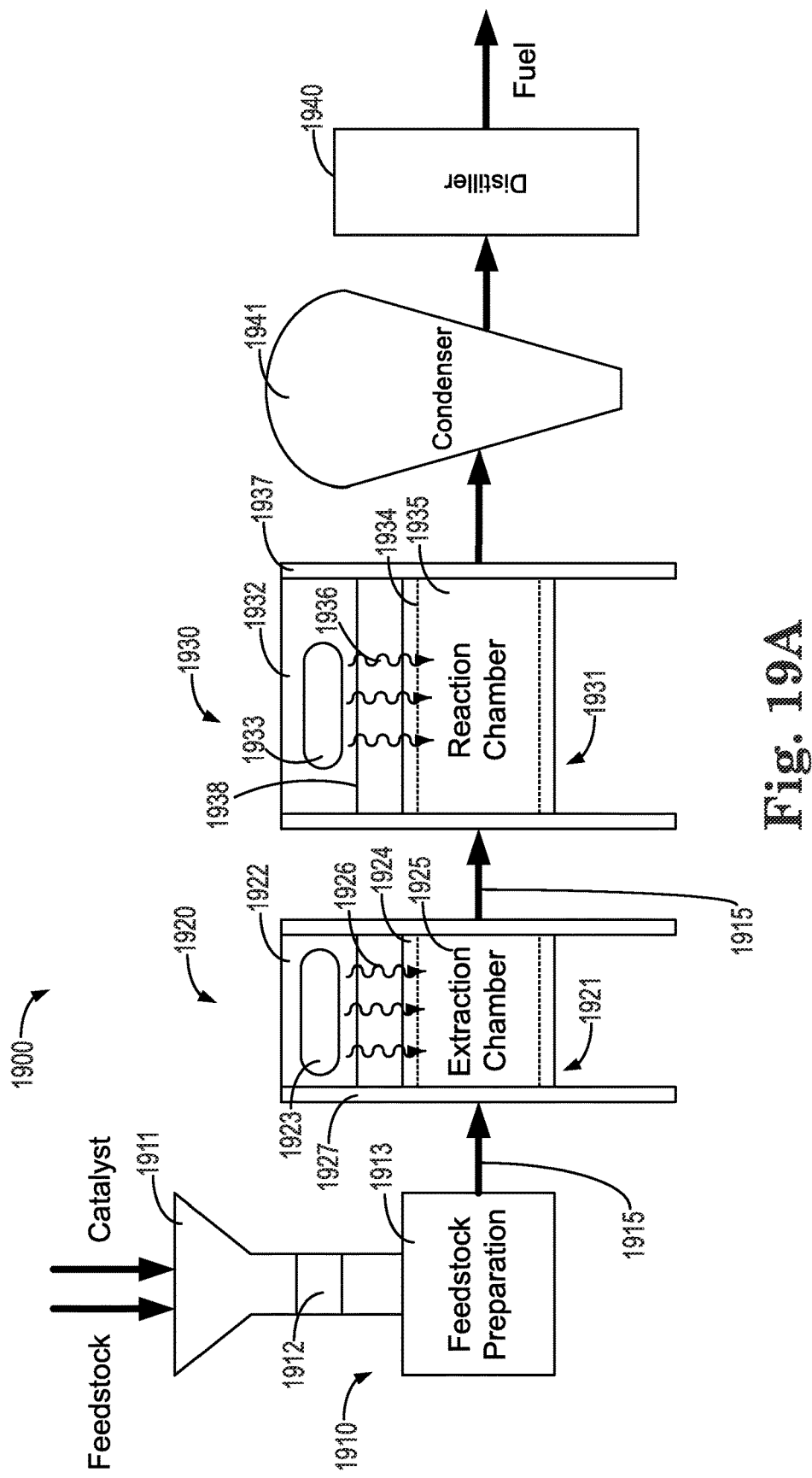
FIG. 19A is a block diagram of an embodiment of the microwave sub-system that uses the reaction chamber illustrated in FIG. 9 for water/air extraction and a reaction process.

FIG. 19A is a block diagram of a microwave sub-system 1900 that uses one or more of the reaction chamber illustrated in FIGS. 18A and 18B. The reaction chamber 1920, 1930 may be arranged and/or operated in series or in a parallel configuration. An extraction process (1920) and a reaction process (1930) depicted in FIGS. 19A and 10B are illustrated as occurring in two separate reaction chambers, e.g., that operate at different temperatures. Alternatively, the extraction process and the reaction process may be implemented in a single reaction chamber with two separate zones, e.g., two separate temperature zones.

In microwave sub-system 1900 of FIG. 19, one or both of water/air extraction section 1920 and reaction section 1930 may be similar to the reaction chamber in microwave sub-system 1800 of FIGS. 18A and 18B. Organic-carbon-containing feedstock, such as, for example, one or more of a manure containing plant cells, wood chips, and plant-based cellulose, enters the microwave sub-system through a hopper (1911), and traverses an airlock (1912) to enter a feedstock preparation module (1913). If needed, a catalyst, such as zeolite, and/or other additives that enhance the reaction process, for example to adjust the pH, may be introduced into microwave sub-system 1000 through input hopper 1911 and/or the entry ports (shown in FIG. 18B). In the feedstock preparation module 1913, the feedstock material may be shredded to a predetermined particle size that may be dependent on the properties of the feedstock, such as the purity, density, and/or chemical composition of the feedstock. If used, the catalyst may be added at the time that the feedstock is being prepared so that the catalyst is evenly dispersed within the feedstock material before entering a reaction chamber (1931). In general, the less uniform the feedstock, the smaller the particle size needed to provide efficient reaction.

After the initial feedstock preparation stage, the shredded and mixed feedstock is transported by a transport mechanism 1915 into the extraction chamber 1921 of the next stage of the process. An air/water extraction subsystem (1920), which performs the optional processes of water and/or air extraction prior to the reaction process, includes a heating/radiation module (1922) comprising at least a magnetron (1923) configured to generate microwaves (1926) that may be mounted on a rotational or stationary mechanism (1927). If mounted on a rotational mechanism, the mechanism rotates magnetron 1923 either partially or fully around extraction chamber 1921 as microwaves 1926 are directed through a wall (1924) of extraction chamber 1921 and into an extraction cavity (1925) impinging on and heating the feedstock therein. In some embodiments, heating module 1922 may utilize only one magnetron 1923 or only two or more magnetrons without using other heat/radiation sources.

In some embodiments, heating/radiation module 1922 may utilize magnetron 1923 in addition to other heat sources, such as heat sources that rely on thermal conduction through the wall of the extraction chamber, e.g., flame, steam, electrical resistive heating, recycled heat from the process, and/or other heat sources. During the air and/or water extraction process, the feedstock may be heated to at least 100 C, the boiling point of water, to remove excess water from the feedstock. The excess water (e.g., in the form of steam) and/or other substances may exit extraction chamber 1921 via one or more exit ports. Additives to the feedstock, such as inert and/or reactive gases including hydrogen and/or nitrogen, may be introduced via one or more input ports into extraction chamber 1921 of the water/air extraction process. In addition to being heated and irradiated by microwaves, the feedstock may also be subjected to a pressurized atmosphere and/or a vacuum atmosphere and/or may be mechanically compressed to remove air from extraction chamber 1921.

After the optional air and/or water extraction process, transport mechanism 1915 moves the feedstock to the next processing stage, a reaction section (1930) which involves the reaction process, e.g., thermal deconstruction, of the feedstock. After the feedstock/catalyst mixture enters a reaction chamber (1931) surrounded by the microwave reflecting enclosure (1938), the mixture is heated to a temperature that is sufficient to facilitate the desired reaction. For example a temperature of in a range of about 200 C to about 350 C is used to crack the hydrocarbons in the feedstock into shorter chains to produce liquid fuel through deconstruction. In addition to being heated, the feedstock may also be subjected to a pressurized atmosphere or a vacuum atmosphere, and/or may be mechanically compressed in reaction chamber 1931.

In some embodiments, heating/radiation in the reaction chamber 1031 is accomplished using a magnetron (1933) emitting microwaves (1936). Magnetron 1033 may rotate relative to reaction chamber 1031. As previously described in connection with the water extraction section 1920, a rotating magnetron (1933) may be supported by rotational mechanism (1937), such as a cage or drum. Rotational mechanism 1937 allows relative rotational motion between magnetron 1933 and reaction chamber 1931. For example, magnetron 1933 may rotate completely around reaction chamber 1931 or the rotation of magnetron 1933 may proceed back and forth along an arc that follows the circumference of reaction chamber 1931. The rotating magnetron heating system 1933 may be supplemented using a stationary magnetron, and/or other conventional heat sources such as a flame or electrical resistive heating. Rotating magnetron 1933 provides more even heating/radiation of the feedstock material and catalyst within a reaction cavity (1935) and enhances the heating properties over that of stationary heat sources.

The cracked hydrocarbons vaporize and are collected in a condenser (1041) and liquefy and then are sent to a distiller (1940) to produce the diesel fuel, while heavier, longer chain hydrocarbon molecules may be recycled back to the reaction chamber. In some implementations, distillation may not be necessary, and the fuel product only needs to be filtered.

Figure 19B:
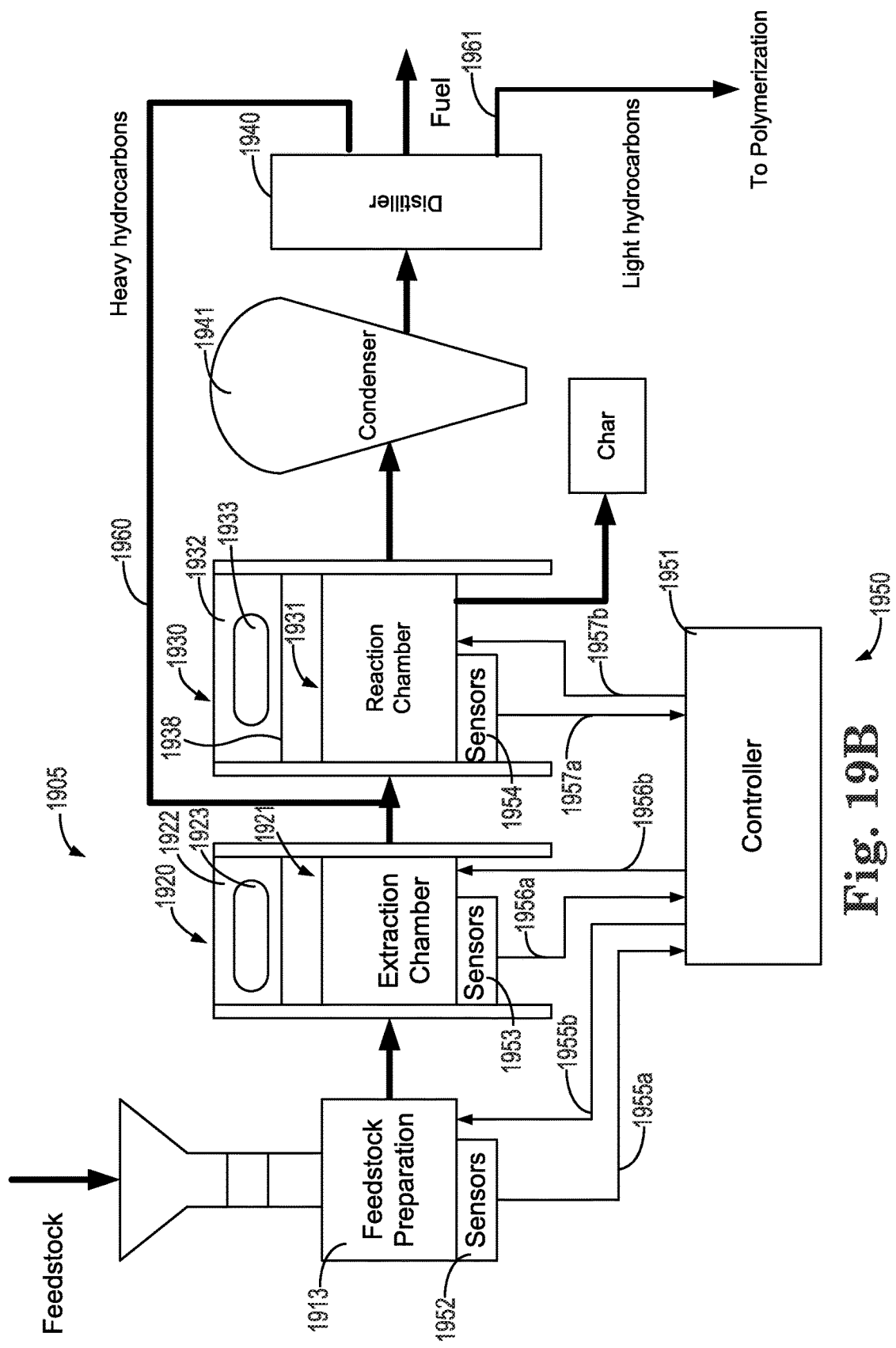
FIG. 19B illustrates an embodiment of the microwave sub-system that includes feedback control.

In some configurations, it is desirable to control the processes of the reaction to allow a higher efficiency of fuel extraction from the feedstock. FIG. 19B is a block diagram of a microwave sub-system (1905) that includes the subsystem components described in connection with FIG. 19A along with a feedback control system (1950). The illustrated feedback control system 1950 includes a controller (1951) and one or more sensors (1952), (1953), (1954) which may be configured to sense parameters at various stages during the process. Feedback control system 1950 may include sensors 1952 at the feedstock preparation stage which are configured to sense parameters of the feedstock and/or feedstock preparation process. For example, sensors 1952, may sense the chemical composition of the feedstock, density, moisture content, particle size, energy content or other feedstock parameters. Sensors 1952 may additionally or alternatively sense the conditions within the feedstock preparation chamber, e.g., flow, pressure, temperature, humidity, composition of the gases present in the chamber, etc. Sensors 1952 develop signals (1955*a*) which are input to controller electronics 1951 where they are analyzed to determine the condition of the feedstock and/or the feedstock preparation process. In response to sensed signals 1955*a*, controller 1951 develops feedback signals (1955*b*) which control the operation of the feedstock preparation module (1913). For example, in some implementations, the controller 1951 may control feedstock preparation module 1913 to continue to shred and/or grind the feedstock material until a predetermined particle size and/or a predetermined particle size variation is detected. In another example, based on the sensed chemical composition of the feedstock, controller 1951 may cause a greater or lesser amount of catalyst to be mixed with the feedstock or may cause different types of catalyst to be mixed with the feedstock.

A control system (1950) may also develop feedback signals (1956*b*), (1957*b*) to control the operation of water extraction module 1920 and/or the reaction module 1930, respectively, based on sensed signals 1956*a*, 1957*a*. For example, the sensors (1953), (1954) may sense the temperature of the water extraction and/or reaction processes and controller 1951 may develop feedback signals 1956*b*, 1957*b* to control the operation of heating/radiation systems 1922, 1932, e.g., power, frequency, pulse width, rotational or translational velocity, etc. of one or both of magnetrons 1923, 1933. Controller 1051 may develop feedback signals to the magnetrons to control the amount of radiation impinging on the feedstock so that the feedstock will not be over-cooked or under-cooked and development of hot spots will be avoided. Controller system 1950 may control the injection of various substances into one or both of the extraction chamber and/or the reaction chamber 1921, 1931 through the entry ports to control the processes taking place within the chambers 1921, 1931. Biochar, the residue of the depleted feedstock, is sent to a storage unit. In some embodiments, controller system 1950 may be used to control conditions that beneficially affect the properties of the processed biochar where specific properties are desired beyond that resulting just from the feedstock choice. After the distillation stage, the heavy hydrocarbons may be recycled back into the reaction chamber and the lighter hydrocarbons may be sent on to a polymerization stage.

Figure 20A:
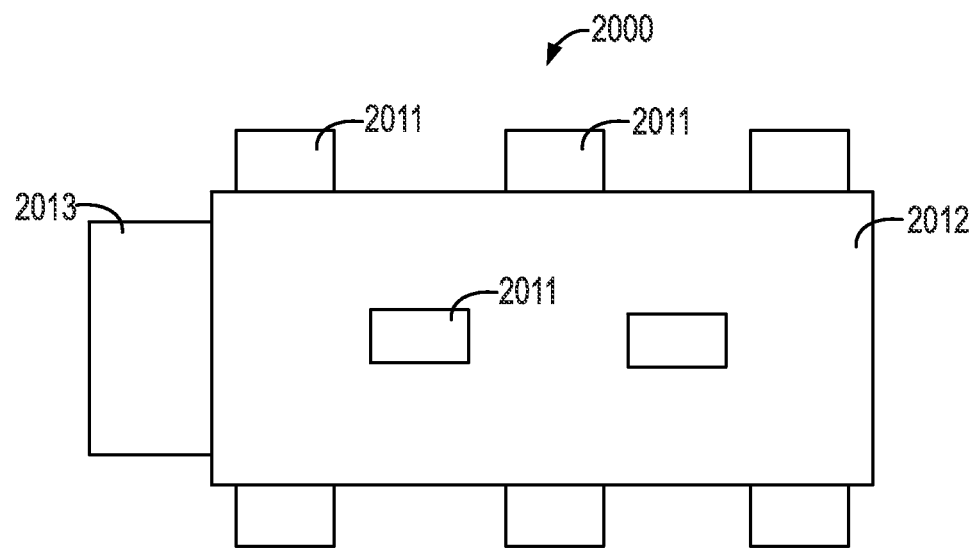
FIG. 20A shows a microwave sub-system which includes multiple stationary magnetrons arranged on a drum that is disposed outside a cylindrical reaction chamber having one or more microwave-transparent walls.
Figure 20B:
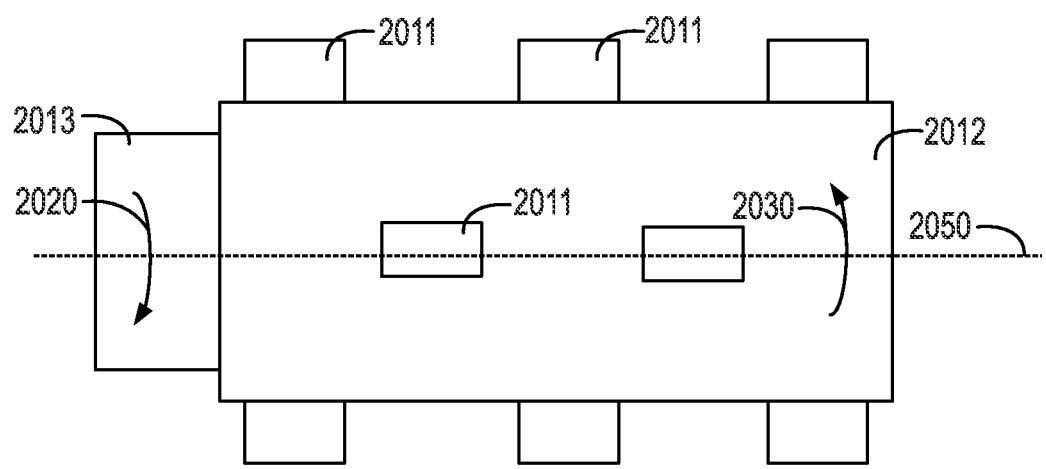
FIG. 20B illustrates an embodiment of a microwave sub-system having a drum supporting magnetrons which may be rotated around the longitudinal axis of the reaction chamber while the reaction chamber is concurrently rotated around its longitudinal axis.

The reaction chambers may be made of quartz, glass, ceramic, plastic, and/or any other suitable material that is substantially transparent to microwaves in the frequency and energy range of the reaction processes. In some configurations, the heating/radiation systems described herein may include one or more magnetrons that rotate relative to the reaction chamber. In some embodiments, the magnetrons may be multiple and/or may be stationary. FIG. 20A illustrates a reaction system (2000) which includes multiple stationary magnetrons (2011) arranged on a drum (2012) that acts as a Faraday cage and is disposed outside a cylindrical reaction chamber (2013) having one or more microwave-transparent walls. In reaction system 2000, the drums made of a material that is microwave opaque, such as, for example, metal, so as to cause the microwaves in reaction chamber 2013 to reflect back and forth through the feedstock, thus more efficiently being used to convert the feedstock into liquid renewable fuel and solid renewable fuel biochar. The operation of the magnetrons may be continuous, or may be pulsed, e.g., in a multiplexed pattern. In some embodiments (FIG. 20B), drum 2013 supporting magnetrons 2011 may be rotated (2030) around the longitudinal axis (2050) of reaction chamber 2012 and/or reaction chamber 2012 may be rotated (2020) around its longitudinal axis 2050.

Figure 20C:
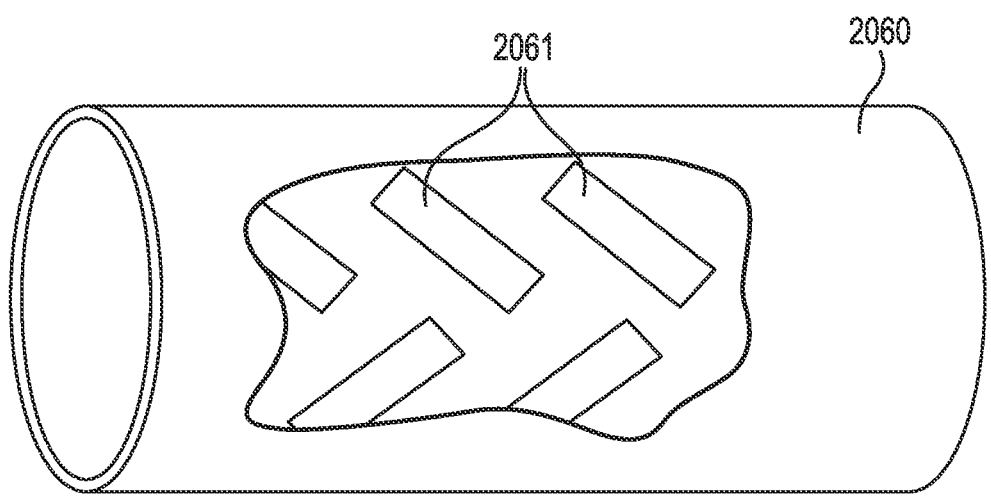
FIG. 20C shows an embodiment of a microwave-sub system reaction chamber with a feedstock transport mechanism comprising baffles.

A feedstock transport mechanism may be disposed within a reaction chamber. For example, as illustrated in FIG. 20C, the feedstock transport mechanism may comprise one or more baffles (2061) that are configured to move the feedstock through a reaction chamber (2060) as the reaction chamber rotates. The baffles 361 may be mounted to the walls of reaction chamber 2060 and/or may be otherwise installed within the reaction chamber to provide movement of feedstock within and through reaction chamber 2060, e.g., longitudinally through the reaction chamber.

In some embodiments, illustrated in FIG. 21, one or more secondary heat sources (2150), such as a flame, steam, and/or electric resistive heating, or recycled heat, may be used in addition to magnetrons (2116) which are stationary, or are supported on a mechanism (2117) that rotates around the circumference of the reaction chamber (2120) enclosed in a microwave-reflecting Faraday cage (2121). In some configurations, magnetrons 2116 may not make a complete revolution around reaction chamber 2120, but may rotate back and forth (2119) along an arc that follows the circumference of reaction chamber 2120. Various configurations are possible as long as the feedstock is exposed to substantially uniform heat throughout the mass of the feedstock particles to form processed biochar having pore density, distribution, and variance in size and distribution as described above for processed biochar of the invention.

Figure 22:
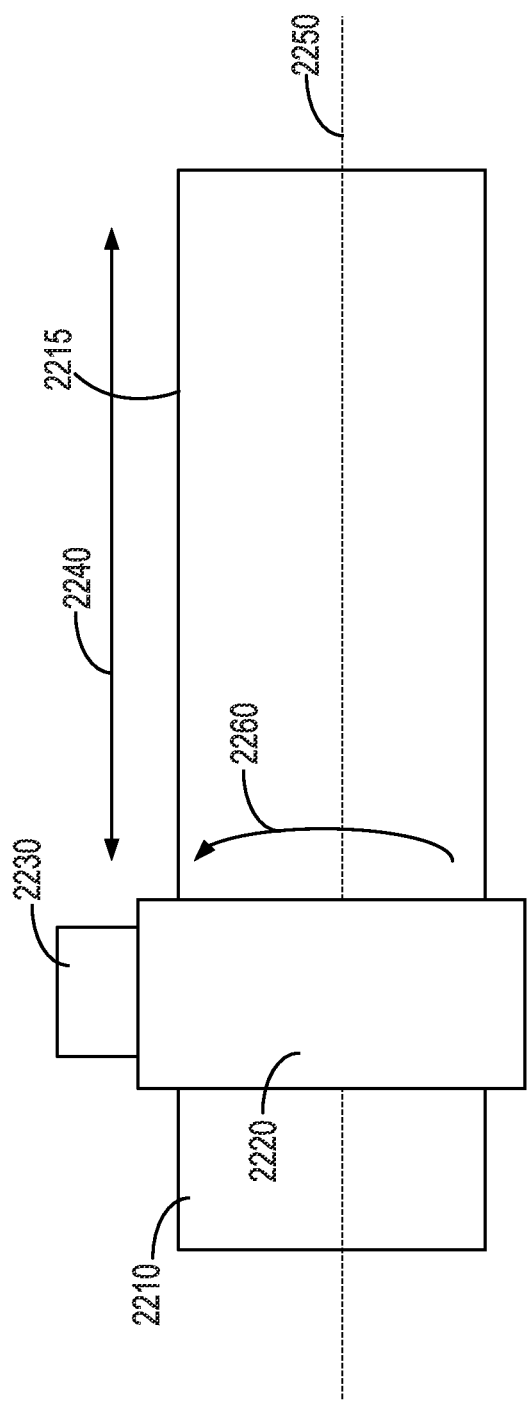
FIG. 22 depicts a microwave sub-system wherein a magnetron is moved along the longitudinal axis of the reaction chamber and is rotated around the longitudinal axis of the reaction chamber.

Movement of the one or more magnetrons relative to the reaction chamber may also include motion that moves the magnetron along the longitudinal axis of the reaction chamber, as illustrated in FIG. 22. A reaction chamber (2210) and a cage (2220) are illustrated that support a magnetron (2230). Cage 2220 and magnetron 1330 may be moved (2240) back and forth along the longitudinal axis (2250) of reaction chamber 2210 and over a metal microwave-reflecting Faraday cage (2215) enclosing reaction chamber 2210. In some implementations, in addition to and/or concurrent with the motion (2240) of cage 2220 and magnetron 2230 along longitudinal axis 2250, cage 22320, and magnetron 2230 may be rotated (2260) around the longitudinal axis 2250.

Cleaning Sub-System

The coal cleaning sub-system is configured to reduce the content of magnetic and paramagnetic impurities such as pyrite in coal by at least 50 wt % of that of the content of the impurities in un-cleaned coal. Use of directed generated magnetic fields as known to the art or an oscillating magnetic field such as, for example, that taught in U.S. Pat. No. 8,052,875 by Oder et al., are configured to remove the impurities by use of magnetic separation in a push and pull manner. Iron pyrite and most minerals found in coal are at least feebly paramagnetic. Magnetic methods can be used to separate iron pyrite and most ash forming minerals and hence to reduce the burden of pollutants to the burner. More strongly magnetic material such as magnetic and paramagnetic material is pulled into a magnetic field with great force. Alternatively, other processes known to create beneficiated coal such as jets of compressed gases may also be used to remove strongly magnetic impurities because magnetic and paramagnetic materials typically are denser than clean coal.

Sulfur can be removed from coal through washing and exposure to magnetic fields. Washing is effective through gravimetric separation of denser inorganic mineral materials from pulverized coal. Magnetic separation is effective because sulfur in coal is generally part of a paramagnetic iron complex (e.g. pyrite $FeS_2$). A paramagnetic particulate can be attracted into a magnetic field and therefore separated from pulverized bulk coal dust. Other materials, such as mercury, arsenic, and silica, are observed by Oder to be removed magnetically. However it is believed that these are removed primarily because they are coprecipitated or agglomerated to iron particles such as pyrite.

Typical impurities that can be removed from coal include hard to grind, dense, and abrasive minerals such as, for example, iron carbonate, and iron pyrite; mineral content; sulfur; and hazardous trace metals such as mercury, arsenic, selenium, lead, thallium, and nickel. Paramagnetic coal impurities include, for example, iron carbonate and iron pyrite. Magnetic separation is able to remove at least 50 wt % of a particular impurity from that found in un-cleaned coal.

Typically the coal content is reduced by 5 and in some cases 10 wt % as some coal is invariably removed along with the impurities. In some embodiments, the impurities are reduced by at least 70 wt %, in some at least 80 wt %, and in some at least 90 wt %.

For magnetic cleaning to occur without excessive loss of coal that is also separated out of the un-cleaned coal, the size of the coal particles should be reduced. The smaller the particle the easier the magnetic forces of the cleaning sub-system are able to separate the impurities from the coal. In some embodiments a suitable size that balances cleanliness of the coal with loss of coal that is also separated out is on the order particles able to pass through an 8 mesh size with square holes of 0.097 inches (2.380 mm). Some embodiments have particles able to pass through a finer screen such as a 16 mesh screen with square holes of 0.0469 inches (1.190 mm) on a side. With some studies using magnetic fields, half of the impurities were be removed from coal with the removal of less than 5 wt % of the carbon in the coal for coal sized to pass through an 16 mesh screen.

The coal cleaning sub-system comprises two chambers or functions that may be separate or combined into one chamber when the functions are performed sequentially. The first chamber is configured to size the coal as discussed above. The second chamber is configured to subject the un-cleaned coal to either gravimetric or magnet separation. Gravimetric separation occurs through washing techniques such as fluid bed using liquid or air to wash the coal so that heavier paramagnetic and mineral impurities are removed. Magnetic separation occurs through subjecting the un-cleaned coal to one or more magnetic fields to pull tramp iron and the paramagnetic material from the un-cleaned coal to form cleaned coal. Iron pyrite and most iron-bearing minerals found in coal are at least feebly paramagnetic. Magnetic methods can be used to separate iron pyrite and most ash forming minerals agglomerated to the iron pyrite and hence to reduce the burden of pollutants to the burner. Both gravimetric separation and magnetic separation may be used in combination. Other processed known to create cleaned coal may also be used such as jets of compressed gases alone or in combination with magnetic fields because paramagnetic materials typically are denser than clean coal. Because coal particles such as fines and powder are potentially explosive, oxygen-deficient atmospheres are typically employed.

Pelletizing/Blending Sub-System

The pelletizing sub-system is used to convert the processed organic-carbon-containing feedstock from the beneficiation sub-system into the pellets suitable for use in a coal combustion apparatus such as many electricity-producing power plants that combust coal or coal-like solid fuels. The pelletizing sub-system comprises a compression chamber and a collection chamber. The a compression chamber is configured to separate the processed organic-carbon-containing feedstock into discrete units of mass having a longest length of at least 0.16 inch (0.41 cm) and a density of at least 37.5 pounds per cubic foot (0.60 grams per cubic centimeter) to form processed biomass pellets. In some embodiments the compression is done under heat. In other embodiments, the slurry of micro particles and lignin from the reactor of the beneficiation sub-system, discussed above, is mixed with the processed organic-carbon-containing feedstock before compression. This results in the need for little if any heat or high energy biomass binder to form the processed biomass pellets. The collection chamber is configured to gather an aggregate of processed biomass pellets.

In some embodiments, the pelletizing sub-system further comprises a heating chamber configured to apply sufficient heat to the processed organic-carbon-containing feedstock to reduce its water content to less than 10% by weight and form pellets. In some embodiments, the compression chamber and the heating chamber are the same chamber.

In some embodiments, the pelletizing sub-system is used to prepare the coal stream where the coal is a substituted processed biomass.

In some embodiments, a blending sub-system is also used where coal is a blend of coal and processed biomass. The blending sub-system is used to size the coal particles, mix the coal particles with the processed biomass, pulverize the blend, and compact the blend into high energy processed biomass/cleaned coal blended compact aggregate that, for example, are suitable for use in a coal combustion apparatus such as an electricity-producing power plant. The blending sub-system first comprises one or more sizing chambers to separately or together size coal and processed biomass into suitable sized particles for subsequent blending. Because and biomass powder have a potential to be explosive, chambers that handle them may have oxygen-deficient atmospheres. Any chunks of coal are reduced to the size of fines in an oxygen-deficient atmosphere, if necessary to prevent any danger of explosions. Similar sized particles of coal and processed biomass are easier to mix into subsequent aggregates that are substantially uniform. In some embodiments a suitable size that balances cleanliness of the coal with loss of coal that is also separated out is on the order of particles being able to pass through an 8 mesh size with square holes of 0.097 inches (2.380 mm). Some embodiments have particles able to pass through a finer screen such as a 16 mesh screen with square holes of 0.0469 inches (1.190 mm) on a side. Similarly, oxygen-deficient atmospheres are used in the blending system as needed to prevent explosions from high concentrations of processed biomass and coal dust or fines. Next the sized particles of coal and processed biomass is combined in a blending chamber that is configured to combine properly sized particles of high energy coal with processed biomass into a blended powder of a predetermined ratio of high energy coal to processed biomass. Then the blend passes to a compacting chamber is configured to compress the blended powder into high energy blended compact aggregates. Finally, the high energy processed biomass/cleaned coal blended compact aggregate is collected in a collection chamber. In some embodiments, the processed biomass and coal are mixed and simultaneously sized and blended in a device, such as for example, a high speed vortex in the blending and pulverizing unit followed by remixing as necessary with high energy biomass binder.

In some embodiments, the blending sub-system further comprises a heating chamber configured to apply sufficient heat to the processed organic-carbon-containing feedstock to reduce its water content to less than 10% by weight and to form the processed biomass/cleaned coal blended compact aggregates. In some embodiments, the compression chamber and the heating chamber are the same chamber.

In some embodiments, the vapor explosion section of the beneficiation sub-system further comprises a wash element that is configured to remove and clean micro particles of unprocessed organic-carbon-containing feedstock, lignin fragments, and hemicellulosic fragments from the vapor explosion section into a fine, sticky mass of biomass with high lignin content that is a high energy processed biomass binder. In this embodiment, the blending chamber of the blending subsection is further configured to receive the high energy binder to permit at least one of lower temperatures or less if any additional high energy processed biomass binder content in a compaction chamber formation during formation of blended compact aggregates. In another embodiment, another binder such as corn starch may be added in lieu of or in combination with the high lignin micro particles from the vapor explosion section to the compression chamber to lower the temperature needed to produce viable pellets.

Figure 23:
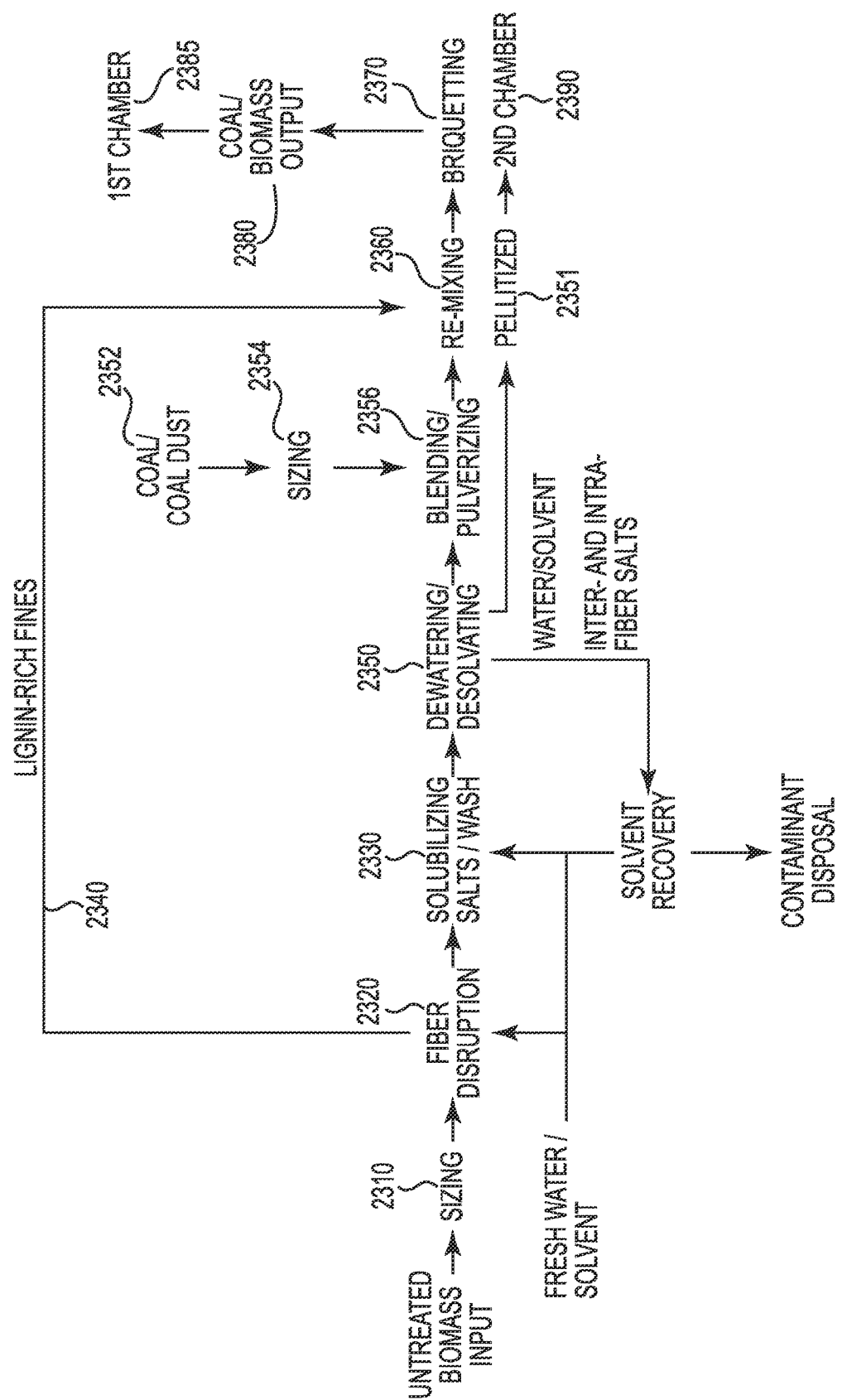
FIG. 23 is a diagram of a system to make processed biomass made from unprocessed organic-carbon-containing feedstock and co-fire them with cleaned coal in a coal combustion apparatus.

FIG. 23 is a diagram of a system to make processed biomass made from unprocessed organic-carbon-containing feedstock and co-fire them with coal in a coal combustion apparatus with the addition of micro particle and lignin slurry that is optional. In this embodiment the coal is replaced with a blended compact aggregate of coal and processed biomass. In this embodiment, the unprocessed organic-carbon-containing feedstock, untreated biomass input, is sized (2310), then passed through beneficiation reaction chamber where the fibers are disrupted (2320), the salt is solubilized and the feedstock is then washed (2330). During fiber disruption 2330, the effluent containing micro particles and lignin is removed (2340), washed and introduced to the processed organic-carbon-containing feedstock in a remixing step (2360) after the processed organic-carbon-containing feedstock has gone through a dewatering and desolvating step (2350) to become processed biomass. At least some of it then passes through a pelletizing sub-system (2351) to become processed biomass pellets that are sent to a second chamber (2390) of a coal combusting apparatus at some later time. Coal and coal dust or fines (2352) is sized similar to the size of the processed biomass particles and cleaned (2354), blended with additional processed biomass in a blending and pulverizing unit (2356), and remixed (2360) as necessary with high energy biomass binder. The mixture is then compacted in to aggregates or briquettes (2370) and collected (2380) to be sent to a first chamber (2385) of a coal combusting apparatus at some later time. The use of the washed effluent stream of high energy sticky biomass may also serve to reduce the need for heat to form the blended aggregates in a cold pressing pelletizing/briquetting scheme although heat still may be advantageous to remove additional water or to form a more viable briquette or pellet in some embodiments.

Gas Separation Sub-System and Consumption Sub-system

While many of the adverse gaseous byproducts found in typical coal combustion systems are removed in the system of our invention because of cleaner biomass diluents of or substituted for the bulk of coal, some such as carbon dioxide gas and carbon monoxide gas remain. Of the two, carbon dioxide is in the greater concentration in the gaseous waste stream of a coal combustion apparatus. Part of the atmosphere and considered for many years to be harmless, in recent years carbon dioxide has become associated with green house global warming when concentrations become excessive. Economical technologies are needed to both separate the gas from the gaseous waste streams after coal combustion, such as in passage ways leading to exhaust stacks or in the exhaust stacks before the gases reach the open atmosphere. In addition, economical technologies are needed to consume the isolated gases so that they are no longer free to enter the atmosphere and adversely contribute to global warming by raising global carbon dioxide levels in the atmosphere above safe levels.

In recent years means have been developed for separating and consuming waste gases such as the carbon dioxide from the exhaust streams that are produced in the coal consumption apparatus. The waste gas separation sub-system involves at least one exhaust chamber in the coal combustion apparatus having a gaseous waste stream and comprises at least one gas separation sub-system configured to separate at least 50 volume % of carbon dioxide from the gaseous waste stream. Some embodiments involve removing the carbon dioxide directly from the exhaust stream flue gas and others involve removing the carbon dioxide through air capture. Air capture is the removal of carbon dioxide from an exhaust stream that has been cooled and diluted. Global Thermostat allows air capture, the pulling out of carbon dioxide from an air stream rather than an exhaust stream from a coal consumption apparatus. The technology uses low-cost left over process heat as energy for the capture of carbon dioxide from the atmosphere. Since energy typically accounts for over two-thirds the total operating cost of competing carbon capture technologies, this technology dramatically lowers the cost of reducing carbon emissions. When process heat is used, the current paradigm (more-energy-equals-more-emissions) reverses and the more energy produced means more carbon reduced. Air capture is different from other forms of carbon capture in that it extracts carbon dioxide directly from the atmosphere. Other carbon capture technologies typically extract carbon dioxide from flue gases. The air capture process is known and requires separating carbon from ambient air, at low temperatures, and at a concentration of about 400 parts per million, as opposed to high temperatures and 15,000 parts in the case of flue gas. Compared with flue gas extraction, the air capture with Global Thermostat's technology has multiple advantages including lower costs, proven processes, higher purity of carbon dioxide gas, extraction at lower concentrations, and more flexibility in location.

The consumption sub-system includes a carbon dioxide gas consumption sub-system configured to receive the separated carbon dioxide gas and consume it in the forming of useful materials. Embodiments may make use of several technologies are suitable for the consumption sub-system. Some embodiments use the encapsulation of separated carbon dioxide in plastic or the insertion into cement. Another embodiment involves the conversion of carbon dioxide into useful chemicals. Liquid Light has developed technology that allows carbon dioxide to be converted with low-energy catalytic electrochemistry into beneficial industrial chemicals such as glycols, alcohols, olefins, and organic acids. The process combines carbon dioxide with water, natural gas or wastes such as, for example, process water, shale gas, and smokestack acids, and clean energy such as, for example, the waste heat of energy conversion units such as boilers that are typically 40-60% efficient. Additionally, by using 'co-feedstock along with carbon dioxide, a plant built with this technology is able to produce multiple products simultaneously. Another example of a consumption technology is the encapsulation of separated carbon dioxide in plastic or stored in cement.

Figure 23A:
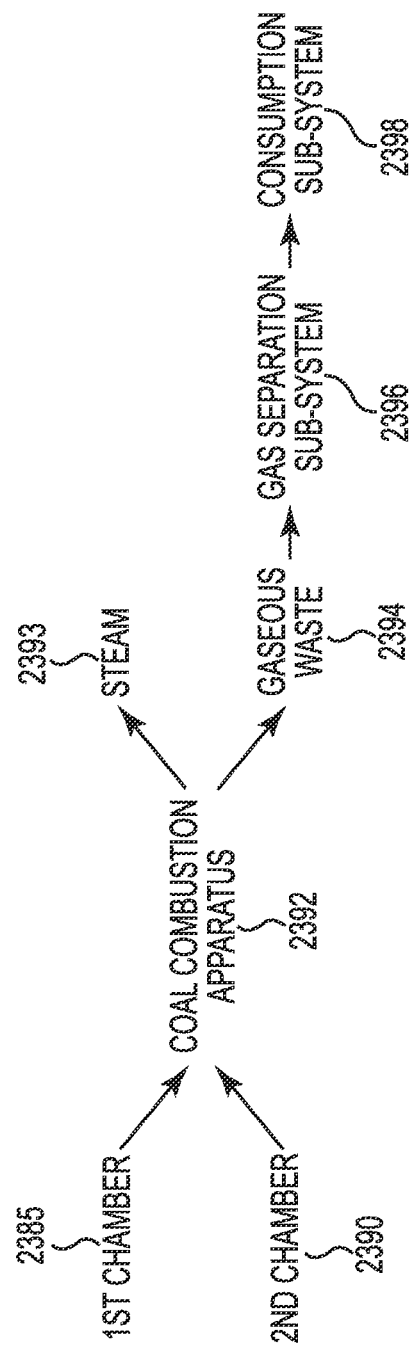
FIG. 23A depicts a diagram of the system shown in FIG. 23 showing the coal combustion apparatus with the gas separation sub-system and the consumption sub-system for the removal of carbon dioxide from the gas waste stream of the apparatus.

FIG. 23A depicts a diagram of the system shown in FIG. 23 showing the coal combustion apparatus with the gas separation sub-system and the consumption sub-system for the removal of carbon dioxide from the gas waste stream of the apparatus. In this embodiment, the pulverized coal containing or coal substituted feedstock in the first chamber (2385) and the pulverized processed biomass from the second chamber (2390) are passed to a coal combustion apparatus (2392) that converts water to a steam (2393) used for generating power and emit a gaseous waste (2394). Gaseous waste 2394 passes through a gas separation sub-system (2396) to remove at least 50 volume % of carbon dioxide from the gaseous waste stream. Separated carbon dioxide is then passed through a consumption sub-system (2398) to be used in the making of materials such as, for example, encapsulated plastics, cement, or specific chemicals, Processes The invention also comprises a process for making a processed biomass/cleaned coal blended compact aggregate that comprises at least 10 wt % of a coal having an energy density of at least 21 MMBTU/ton (24 GJ/MT) and at least 10 wt % of a processed biomass comprises three steps. The first step is to input into a system comprising a first, a second, and a third subsystem components comprising coal and a renewable, unprocessed organic-carbon-containing feedstock that includes free water, intercellular water, intracellular water, intracellular water-soluble salts, and at least some plant cells comprising cell walls that include lignin, hemicellulose, and microfibrils within fibrils. The second step is to pass unprocessed organic-carbon-containing feedstock through a beneficiation sub-system process to result in processed biomass having a water content of less than 20 wt % and a water soluble intracellular salt content that is reduced by at least 60 wt % on a dry basis for the processed organic-carbon-containing feedstock from that of the unprocessed organic-carbon-containing feedstock. The third step is to pass the processed biomass through a blending sub-system process, to be joined with coal to result in a processed biomass/cleaned coal blended compact aggregate that comprises at least 10 wt % of a coal having an energy density of at least 21 MMBTU/ton (24 GJ/MT) and at least 10 wt % of a processed biomass comprising a processed organic-carbon-containing feedstock with characteristics that include an energy density of at least 17 MMBTU/ton (20 GJ/MT) and a water-soluble intracellular salt content that is decreased more than 60 wt % on a dry basis for the processed organic-carbon-containing feedstock from that of unprocessed organic-carbon-containing feedstock that was the source of the processed organic-carbon-containing feedstock. Some embodiments augment the process by using a heating sub-system process to make a processed biomass that is a processed biochar having an energy density of at least 21 MMBTU/ton (24 GJ/MT).

The process includes two aspects of the beneficiation process for making processed carbon-containing feedstock with the beneficiation sub-system discussed above and four aspects of the heating sub-system, three aspects of the oxygen-deficient thermal process for converting the processed carbon-containing feedstock into processed biochar and one aspect of a microwave process for converting the processed carbon-containing feedstock into processed biochar.

Beneficiation Sub-System Process

The beneficiation process step comprises the step of passing unprocessed organic-carbon-containing feedstock through a beneficiation sub-system process to result in processed organic-carbon-containing feedstock having a water content of less than 20 wt % and a salt content that is reduced by at least 60 wt % on a dry basis for the processed organic-carbon-containing feedstock from that of the unprocessed organic-carbon-containing feedstock that was the source of the processed organic-carbon-containing feedstock. There are two aspects of the beneficiation sub-system process. The first focuses on the properties of the processed organic-carbon-containing feedstock and the second focuses on the energy efficiency of the process of the invention over that of currently known processes for converting unprocessed organic-carbon-containing feedstock into processed organic-carbon-containing feedstock suitable for use with downstream fuel producing systems. Both use the beneficiation sub-system disclosed above.

First Aspect

The first aspect of the beneficiation process step of the invention comprises four steps. The first step is inputting into a reaction chamber unprocessed organic-carbon-containing feedstock comprising free water, intercellular water, intracellular water, intracellular water-soluble salts, and at least some plant cells comprising cell walls that include lignin, hemicellulose, and microfibrils within fibrils. Some embodiments have unprocessed organic-carbon-containing feedstock that comprises water-soluble salts having a content of at least 4000 mg/kg on a dry basis.

The second step is exposing the feedstock to hot solvent under pressure for a time at conditions specific to the feedstock to make at least some regions of the cell walls comprising crystallized cellulosic fibrils, lignin, and hemicellulose more able to be penetrable by water-soluble salts without dissolving more than 25 percent of the lignin and hemicellulose. As mentioned above, this is accomplished by one or more of unbundling regions of at least some fibrils, depolymerizing at least some strands of lignin and/or hemicellulose, or detaching them from the cellulose fibrils, thereby disrupting their interweaving of the fibrils. In addition, the cellulose fibrils and microfibrils can be partially depolymerized and/or decrystallized.

The third step is rapidly removing the elevated pressure so as to penetrate the more penetrable regions with intracellular escaping gases to create porous feedstock with open pores in at least some plant cell walls. In some embodiments the pressure is removed to about atmospheric pressure in less than 500 milliseconds (ms), less than 300 ms, less than 200 ms, less than 100 ms, or less than 50 ms.

The fourth step is pressing the porous feedstock with conditions that include an adjustable compaction pressure versus time profile and compaction time duration, and between pressure plates configured to prevent felt from forming and blocking escape from the reaction chamber of intracellular and intercellular water and intracellular water-soluble salts, and to create processed organic-carbon-containing feedstock that has a water content of less than 20 wt % and a water-soluble salt content that is decreased by at least 60% on a dry basis that of the unprocessed organic-carbon-containing feedstock. In some embodiments, the water content is measured after subsequent air-drying to remove remaining surface water. In some embodiments, the pressure plate has a pattern that is adapted to particular organic-carbon-containing feedstock based on its predilection to form felts and pith content as discussed above. In some embodiments, the pressure amount and pressure plate configuration is chosen to meet targeted processed organic-carbon-containing feedstock goals for particular unprocessed organic-carbon-containing feedstock. In some embodiments, the pressure is applied in steps of increasing pressure, with time increments of various lengths depending on biomass input to allow the fibers to relax and more water-soluble salt to be squeezed out in a more energy efficient manner. In some embodiments, clean water is reintroduced into the biomass as a rinse and to solubilize the water-soluble slats before the fourth step begins.

The process may further comprise a fifth step, prewashing the unprocessed organic-carbon-containing feedstock before it enters the reaction chamber with a particular set of conditions for each organic-carbon-containing feedstock that includes time duration, temperature profile, and chemical content of pretreatment solution to at least initiate the dissolution of contaminates that hinder creation of the cell wall passageways for intracellular water and intracellular water-soluble salts to pass outward from the interior of the plant cells.

The process may further comprise a sixth step, masticating. The unprocessed organic-carbon-containing feedstock is masticated into particles having a longest dimension of less than 1 inch (2.5 centimeters) before it enters the reaction chamber.

The process may further comprise a seventh step, separating out the contaminants. This step involves the separating out of at least oils, waxes, and volatile organic compounds from the porous feedstock with solvents less polar than water.

As with the system aspect, the unprocessed organic-carbon-containing feedstock may comprise at least two from a group consisting of an herbaceous plant material, a soft woody plant material, and a hard woody plant material that are processed in series or in separate parallel reaction chambers. In addition, in some embodiments, the energy density of each plant material in the processed organic-carbon-containing feedstock may be substantially the same. In some embodiments, the organic-carbon-containing feedstock comprises at least two from the group consisting of an herbaceous plant material, a soft woody plant material, and a hard woody plant material, and wherein the energy density of each plant material in the processed organic-carbon-containing feedstock is at least 17 MMBTU/ton (20 GJ/MT).

Figure 24:
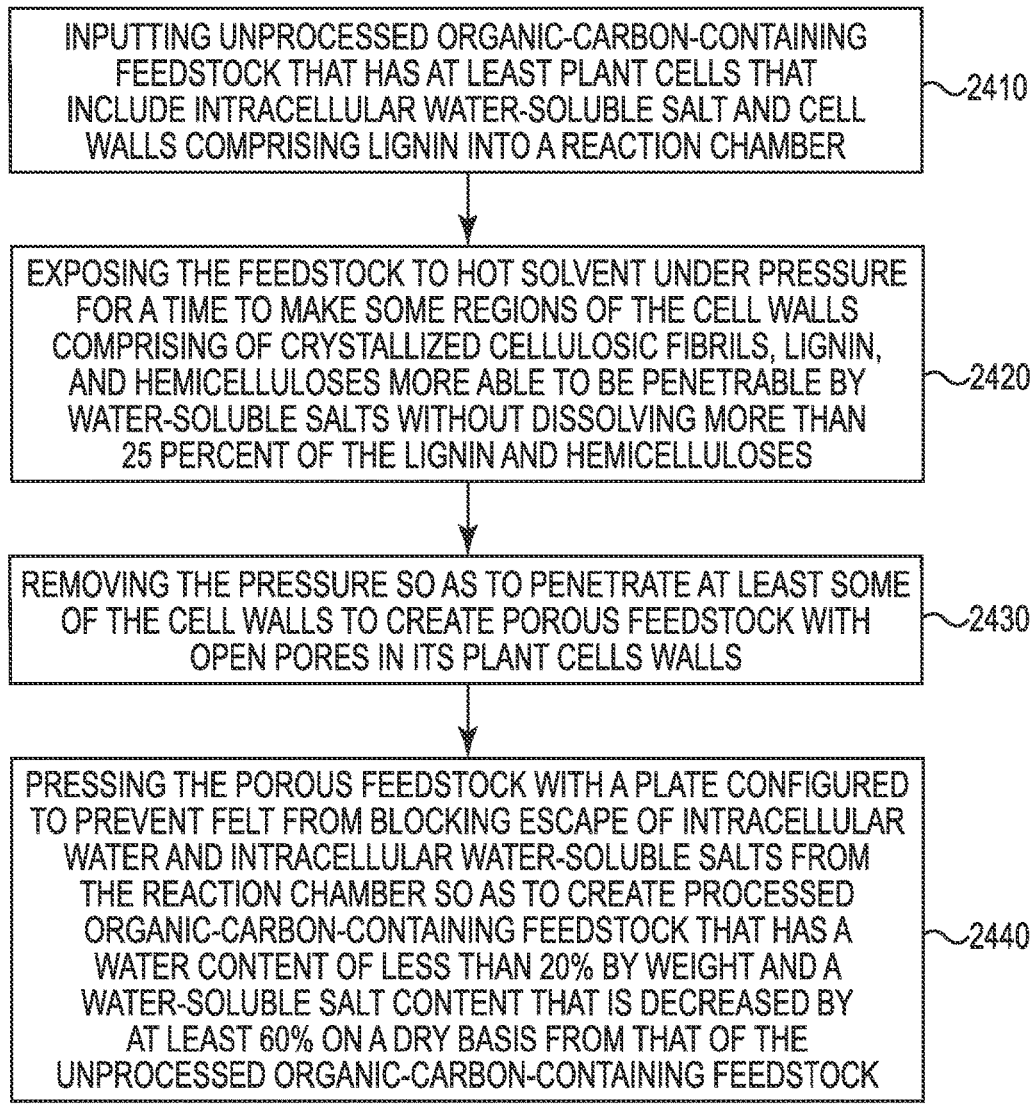
FIG. 24 is a block diagram of an embodiment of a process for passing unprocessed organic-carbon-containing feedstock through a beneficiation sub-system to create a processed organic-carbon-containing feedstock with a water content of less than 20 wt % and a water-soluble salt content that is decreased by more than 60 wt % on a dry basis for the processed organic-carbon-containing feedstock from that of unprocessed organic-carbon-containing feedstock.

FIG. 24 is a block diagram of a process for making processed organic-carbon-containing feedstock with less than 60 percent water-soluble salt on a dry basis over that of its unprocessed form and with less than 20 wt % water. Step 2410 involves inputting unprocessed organic-carbon-containing feedstock that has at least some plant cells that include intracellular water-soluble salt and cell walls comprising lignin into a reaction chamber. Step 2420 involves exposing the feedstock to hot solvent under pressure for a time to make some regions of the cell walls comprising crystallized cellulosic fibrils, lignin, and hemicellulose more able to be penetrable by water-soluble salts without dissolving more than 25 percent of the lignin and hemicelluloses. Step 2430 involves removing the pressure so as to penetrate at least some of the cell walls so as to create porous feedstock with open pores in its plant cell walls. Step 2440 involves pressing the porous feedstock with a plate configured to prevent felt from blocking escape of intracellular water and intracellular water-soluble salts from the reaction chamber so as to create processed organic-carbon-containing feedstock that has a water content of less than 20 wt % and a water-soluble salt content that is decreased by at least 60 wt % on a dry basis for the processed organic-carbon-containing feedstock from that of unprocessed organic-carbon-containing feedstock that was the source of the processed organic-carbon-containing feedstock.

Second Aspect

The second aspect is similar to the first except steps have an efficiency feature and the resulting processed organic-carbon-containing feedstock has a cost feature. The second aspect also comprises four steps. The first step is inputting into a reaction chamber organic-carbon-containing feedstock comprising free water, intercellular water, intracellular water, intracellular water-salts, and at least some plant cells comprising lignin, hemicellulose, and fibrils within fibril bundles. Each step emphasizes more specific conditions aimed at energy and material conservation. The second step is exposing the feedstock to hot solvent under pressure for a time at conditions specific to the feedstock to swell and unbundle the cellular chambers comprising partially crystallized cellulosic fibril bundles, lignin, hemicellulose, and water-soluble salts without dissolving more than 25 percent of the lignin and to decrystallize at least some of the cellulosic bundles. The third step is removing the pressure to create porous feedstock with open pores in its cellulosic chambers. After possibly mixing with fresh water to rinse the material and solubilize the water-soluble salts, the fourth step is pressing the porous feedstock with an adjustable compaction pressure versus time profile and compaction duration between pressure plates configured to prevent felt from forming and blocking escape from the reaction chamber of intracellular and intercellular water and intracellular water-soluble salts, and to create a processed organic-carbon-containing feedstock that has a water content of less than 20 wt %, a water-soluble salt content that is decreased by at least 60 wt % on a dry basis, and a cost per weight of removing the water and the water-soluble salt is reduced to less than 60% of the cost per weight of similar water removal from known mechanical, known physiochemical, or known thermal processes.

Figure 25:
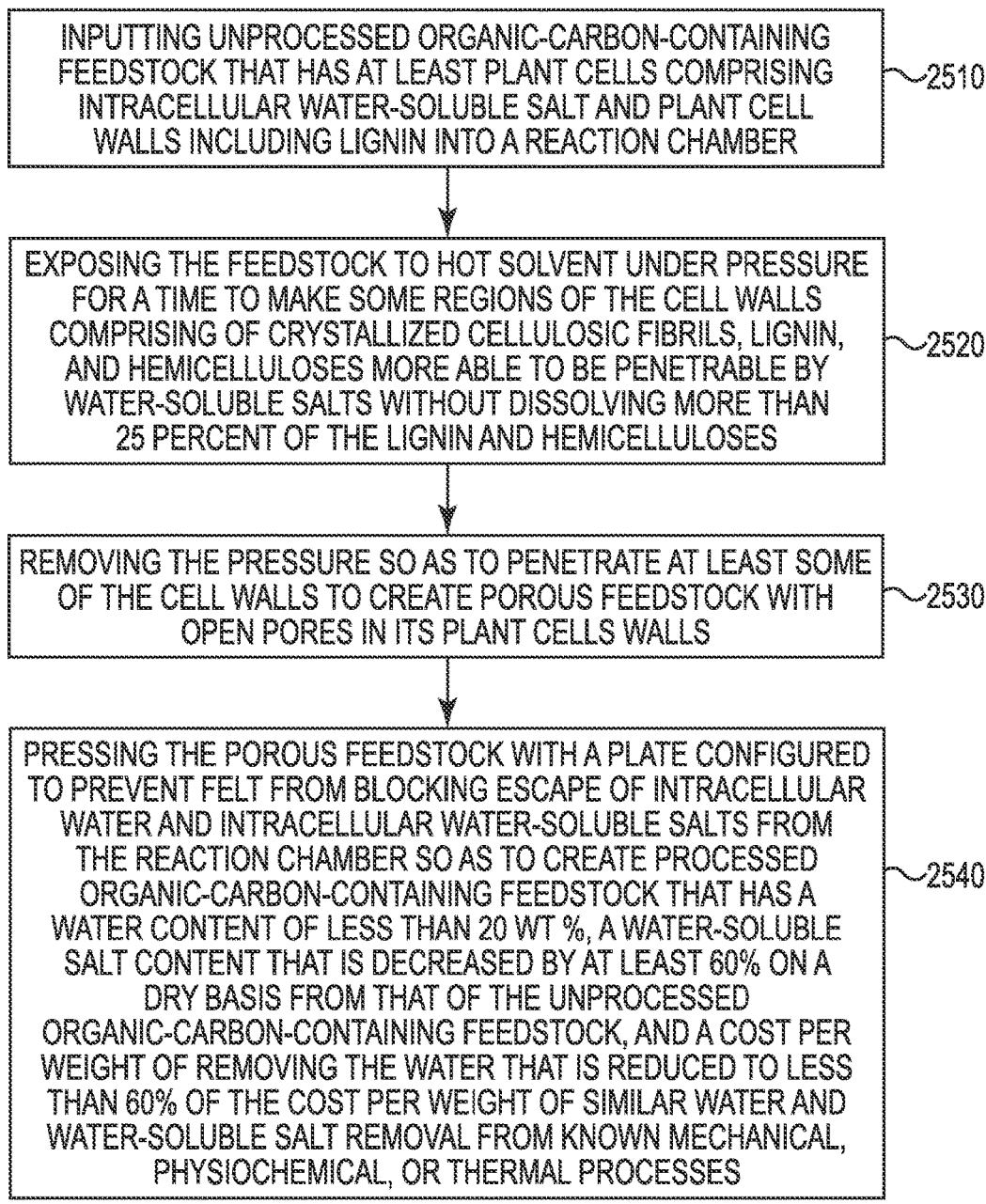
FIG. 25 is a block diagram of an embodiment of a process for passing unprocessed organic-carbon-containing feedstock through a beneficiation sub-system to create a processed organic-carbon-containing feedstock with a water content of less than 20 wt %, a water-soluble salt content that is decreased by more than 60 wt % on a dry basis for the processed organic-carbon-containing feedstock from that of unprocessed organic-carbon-containing feedstock, and an energy cost of removing the water-soluble salt and water that is reduced to less than 60% of the cost per weight of similar removal from known mechanical, known physiochemical, or known thermal processes.

FIG. 25 is a block diagram of a process for making processed organic-carbon-containing feedstock with less than 50 wt % water-soluble salt of a dry basis than that of unprocessed organic-carbon-containing feedstock and less than 20 wt % water, and at a cost per weight of less than 60% that of similar water removal from known mechanical, known physiochemical, or known thermal processes that can remove similar amounts of water and water-soluble salt. Step 2510 involves inputting unprocessed organic-carbon-containing feedstock that has at least plant cells comprising intracellular water-soluble salts and plant cell walls that include lignin into a reaction chamber. Step 2520 involves exposing the feedstock to hot solvent under pressure for a time to make some regions of the cell walls comprising crystallized cellulosic fibrils, lignin, and hemicellulose more able to be penetrable by water-soluble salts without dissolving more than 25 percent of the lignin and hemicelluloses. Step 2530 involves removing the pressure so as to penetrate at least some of the cell walls to create porous feedstock with open pores in its plant cell walls. Step 2540 involves pressing the porous feedstock with a plate configured to prevent felt from blocking escape of intracellular water and intracellular water-soluble salts from the reaction chamber so as to create processed organic-carbon-containing feedstock that has a water content of less than 20 wt %, a water-soluble salt content that is decreased by at least 60 wt % on a dry basis over that of the unprocessed organic-carbon-containing feedstock, and a cost per weight of removing the water and water-soluble salt that is reduced to less than 60% of the cost per weight of similar water removal from known mechanical, physiochemical, or thermal processes.

Energy efficiencies are achieved in part by tailoring process conditions to specific organic-carbon-containing feedstock as discussed above. Some embodiments use systems engineered to re-capture and reuse heat to further reduce the cost per ton of the processed organic-carbon-containing feedstock. Some embodiments remove surface or free water left from the processing of the organic-carbon-containing feedstock with air drying, a process that takes time but has no additional energy cost. FIG. 26 is a table that shows some process variations used for three types of organic-carbon-containing feedstock together with the resulting water content and water-soluble salt content achieved. It is understood that variations in process conditions and processing steps may be used to raise or lower the values achieved in water content and water-soluble salt content and energy cost to achieve targeted product values. Some embodiments have achieved water contents as low as less than 5 wt % and water-soluble salt contents reduced by as much as over 95 wt % on a dry basis from its unprocessed feedstock form.

Oxygen-Deficient Thermal Sub-system Process

The oxygen-deficient thermal sub-system process step comprises passing the processed organic-carbon-containing feedstock through an oxygen-deficient sub-system process to result in a solid fuel composition having an energy density of at least 17 MMBTU/ton (20 GJ/MT) a water content of less than 10 wt %, and a water-soluble salt that is decreased by at least 60 wt % on a dry basis for the processed organic-carbon-containing feedstock from that of the unprocessed organic-carbon-containing feedstock.

In the broadest perspective the process comprises three steps. The first step is to input into a system, comprising a first and a second subsystem, an unprocessed organic-carbon-containing feedstock that includes free water, intercellular water, intracellular water, intracellular water-soluble salts, and at least some plant cells comprising cell walls that include lignin, hemicellulose, and microfibrils within fibrils. The second step is to pass the unprocessed organic-carbon-containing feedstock through the first sub-system, a beneficiation sub-system process, to result in processed organic-carbon-containing feedstock having a water content of less than 20 wt % and a salt content that is reduced by at least 60 wt % on a dry basis for the processed organic-carbon-containing feedstock from that of the unprocessed organic-carbon-containing feedstock, The third step is to pass the processed organic-carbon-containing feedstock through the second sub-system, an oxygen-deficient thermal sub-system process, to result in a solid fuel composition having an energy density of at least 17 MMBTU/ton (20 GJ/MT) a water content of less than 10 wt %, and water-soluble salt that is decreased by at least 60 wt % on a dry basis for the processed organic-carbon-containing feedstock from that of the unprocessed organic-carbon-containing feedstock.

The process that uses the horizontal oxygen-deficient thermal sub-system involves four steps. The first step is to input processed organic-carbon-containing feedstock into a substantially horizontal sublimating reaction chamber largely contained within a hot box. The reaction chamber is configured to be able to (1) heat from an ambient temperature to an operating sublimation temperature, (2) operate at a sublimation temperature, and (3) cool from an operating sublimation temperature to an ambient temperature. This is done without leaking any hot product gas fuel from the reaction chamber into the hot box or atmosphere, or leaking any oxygen from outside the hot box into the hot box. The second step is to heat the processed organic-carbon-containing feedstock to a sublimating temperature before it is able to form a liquid phase. The third step is to maintain the temperature at a sublimation temperature for a residence time that is as long a time as needed to convert the processed organic-carbon-containing feedstock to processed biogas and processed biochar. The fourth step is to separate the processed biogas from the processed biochar.

Figure 27:
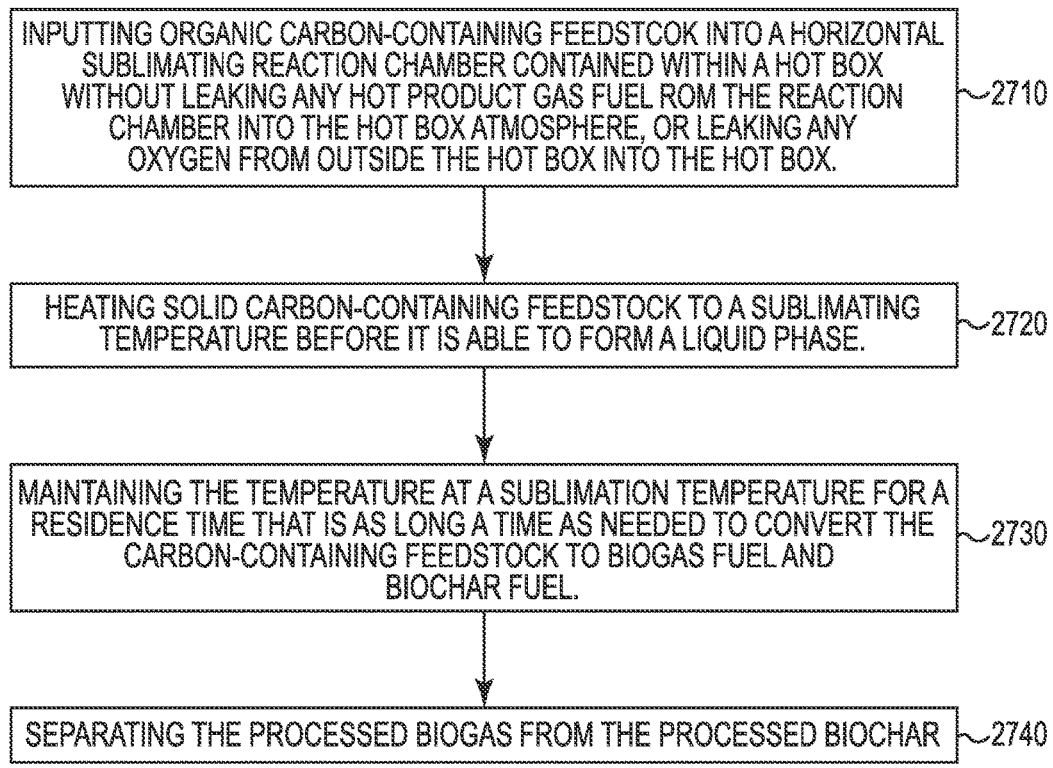
FIG. 27 is a block diagram of an embodiment of a process for passing processed organic-carbon-containing feedstock through a horizontal sublimation oxygen-deprived thermal sub-system to create a processed biochar having an energy density of at least 17 MMBTU/ton (20 GJ/MT), a water content of less than 10 wt %, and water-soluble salt that is decreased more than 60 wt % on a dry basis for the processed organic-carbon-containing feedstock from that of unprocessed organic-carbon-containing feedstock.

These steps are depicted in FIG. 27, a flow diagram of the process for generating processed biochar from processed organic-carbon-containing feedstock in accordance with embodiments of the invention. In 2710 the processed organic-carbon-containing feedstock is inputted into a horizontal sublimating reaction chamber contained within a hot box without leaking any hot product gas fuel from the reaction chamber into the hot box or atmosphere, or leaking any oxygen from outside the hot box into the hot box. Next, in step 2720, the processed organic-carbon-containing feedstock is heated to a sublimating temperature before it is able to form a liquid phase. In step 2730, the temperature is maintained at a sublimation temperature for a residence time that is as long a time as is needed to convert the processed organic-carbon-containing feedstock to processed biogas fuel and processed biochar fuel. Finally, in step 2740 the product gas fuel and the processed biochar fuel are separated from each other.

In some embodiments the process may use a horizontal sublimation sub-system, depending on its size, wherein the substantially horizontal sublimating reaction chamber is supported by a vertical support. It is beneath the substantially horizontal reaction chamber. It is also configures to be dimensionally stable in the vertical direction over temperature variations of from ambient temperature to about 850° C. that may occur during the startup, operating, and shutdown operations of the substantially horizontal reaction chamber.

Figure 28:
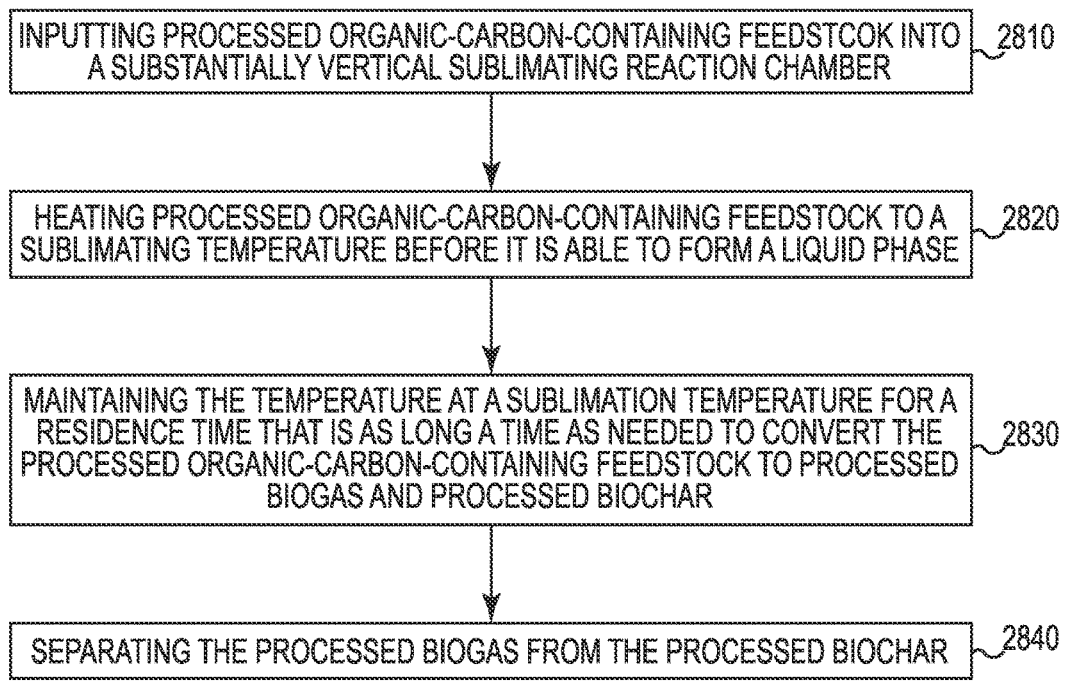
FIG. 28 is a block diagram of an embodiment of a process for passing processed organic-carbon-containing feedstock through a vertical sublimation oxygen-deprived thermal sub-system to create a processed biochar having an energy density of at least 17 MMBTU/ton (20 GJ/MT), a water content of less than 10 wt %, and water-soluble salt that is decreased more than 60 wt % on a dry basis for the processed organic-carbon-containing feedstock from that of unprocessed organic-carbon-containing feedstock.

The process that uses the vertical oxygen-deficient thermal sub-system involves four steps. This is depicted in FIG. 28. In 2810, the first step is to input processed organic-carbon-containing feedstock into a substantially vertical sublimating reaction chamber. In 2820, the second step is to heat the processed organic-carbon-containing feedstock to a sublimating temperature before it is able to form a liquid phase. In 2830, the third step is to maintain the temperature at a sublimation temperature for a residence time that is as long a time as is needed to convert the processed organic-carbon-containing feedstock to processed biogas and processed biochar. In 2840, the fourth step is to separate the processed biogas from the processed biochar.

Microwave Sub-system Process

The microwave sub-system process step comprises passing the processed organic-carbon-containing feedstock through a microwave sub-system process to result in a solid renewable fuel composition having an energy density of at least 17 MMBTU/ton (20 GJ/MT) a water content of less than 10 wt %, water-soluble salt that is decreased by at least 60 wt % on a dry basis for the processed organic-carbon-containing feedstock from that of the unprocessed organic-carbon-containing feedstock, and pores that have a variance in pore size of less than 10%.

Figure 29:
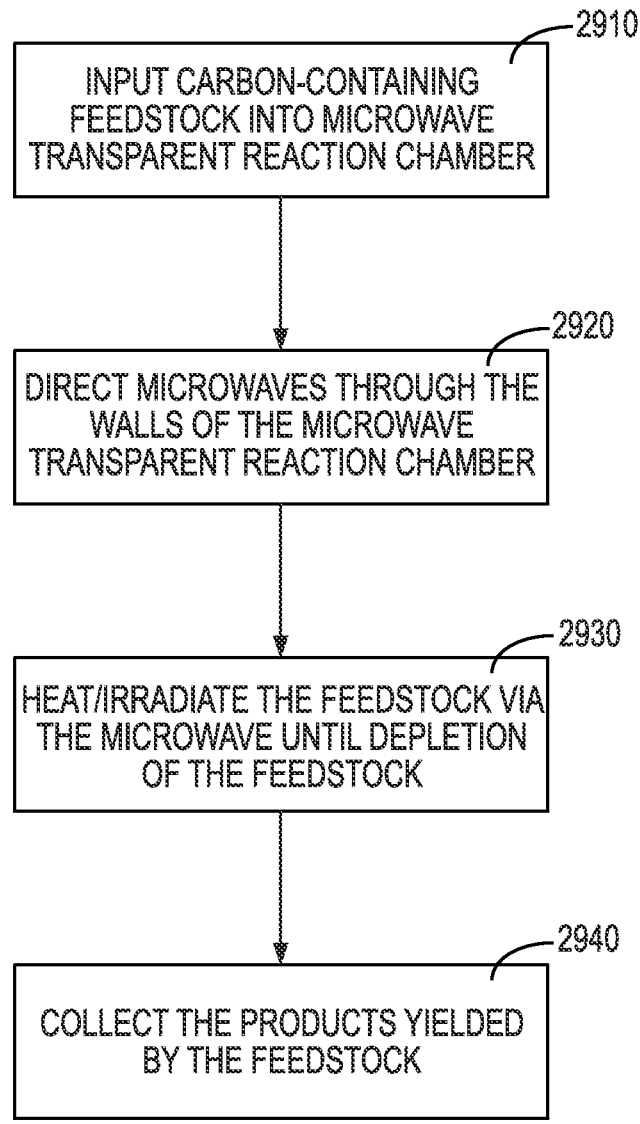
FIG. 29 is a block diagram of an embodiment of a process for passing processed organic-carbon-containing feedstock through a microwave sub-system to create a solid renewable fuel processed biochar having an energy density of at least 17 MMBTU/ton (20 GJ/MT), a water content of less than 10 wt %, water-soluble salt that is decreased more than 60 wt % on a dry basis for the processed organic-carbon-containing feedstock from that of unprocessed organic-carbon-containing feedstock, and pores that have a variance in pore size of less than 10%.

FIG. 29 is a block diagram of an embodiment of a process for passing processed organic-carbon-containing feedstock through a microwave sub-system to create a solid renewable fuel processed biochar of the invention. The processed organic-carbon-containing feedstock is input (2910) to a reaction chamber having walls that are substantially transparent to microwaves used to heat and/or irradiate the feedstock. The heating and/or radiation occur by directing (2920) the microwave energy through the walls of the reaction chamber so that it impinges on the feedstock disposed within the reaction chamber. The feedstock is heated/irradiated (2930) by the microwaves, optionally in the presence of a catalyst, until reaction of the organic-carbon-containing molecules occurs to produce the desirable end fuel product. The fuel product created by the reaction processes are collected (2940).

Coal Cleaning Sub-System Process

The coal cleaning process comprises two steps. The first step is to size the coal for easy handling and efficient removal of impurities with minimal adverse inclusion of coal in with the impurities that are removed. The second step is form cleaned coal by subjecting the un-cleaned coal to gravimetric separation via washing of the denser impurities from the coal or to magnetic separation via using magnetic fields to pull the paramagnetic material from the un-cleaned coal to form cleaned coal. Both separation methods may be used in combination. Other processed known to create cleaned coal may also be used such as jets of compressed gases alone or with magnetic fields because paramagnetic materials typically are denser than coal.

Pelletizing/Blending Sub-system Process

The pelletizing sub-system process step comprises two steps. The first step is compressing the processed biomass, also known as processed organic-carbon-containing feedstock, to separate it into pellets with discrete units of mass having a longest length of at least 0.16 inch (0.41 cm), a diameter of less than 0.25 inch (6 mm), and a density of at least 37.5 pounds per cubic foot (0.60 grams per cubic centimeter). The second step is collecting the aggregate of pellets. In some embodiments the compression is done under heat to at least assist the formation of aggregates or reduce the content of water to less than 10% by weight. In some embodiments, the steps of compression and heating are done at the same time. In some embodiments, the beneficiation sub-system process further comprises removing and cleaning of micro particles of unprocessed organic-carbon-containing feedstock, lignin fragments, and hemicellulosic fragments from the vapor explosion section into a high energy biomass binder, a fine, sticky mass of biomass with high lignin content, in the removing the pressure step, and the blending sub-system further comprises adding the high energy biomass binder to the blended powder to permit lower temperatures or more cohesiveness in the compressing step during formation of blended compact aggregates.

In some embodiments, the pelletizing sub-system is used to prepare the coal stream where the coal is a substituted processed biomass.

In some embodiments a blending sub-system process is also used where the coal comprises a blend of coal and processed biomass. Less energy is consumed in the pulverizing of the coal at a coal-firing apparatus where the coal is composes of aggregates of components that have already been pulverized before aggregation. The blending sub-system process step comprises three steps. When handling coal dust, fines, or powder, an oxygen-deficient atmosphere may be employed to minimize the occurrence of explosions.

The first step is a sizing step to reduce the size of the particles of coal and processed biomass to one that permits easy subsequent mixing. Any coal chunks present are reduced to the size of coal dust or coal fines for easy transport into the blending process. In some embodiments, the processed biomass and coal are mixed and simultaneously sized and blended in a high speed vortex in the blending and pulverizing unit. In some embodiments a suitable size is on the order of particles being able to pass through an 8 mesh size with square holes of 0.097 inches (2.380 mm). Some embodiments have particles able to pass through a finer screen such as a 16 mesh screen with square holes of 0.0469 inches (1.190 mm) on a side. With some studies using magnetic fields, half of the impurities were be removed from coal with the removal of less than 5 wt % of the carbon in the coal for coal sized to pass through an 16 mesh screen.

The second step is a combining step to combine both the coal and the processed biomass into a blended powder of a predetermined ratio of coal to processed biomass. In some embodiments, a high energy biomass binder is added. The high energy biomass binder is formed in the beneficiation sub-system process, discussed above, with the removing and cleaning of micro particles of unprocessed organic-carbon-containing feedstock, lignin fragments, and hemicellulosic fragments from the vapor explosion section. The high energy biomass binder, a fine, sticky mass of biomass with high lignin content, is then added to the blended powder to permit at least one of lower temperatures or more cohesiveness in the compressing step during formation of blended compact aggregates.

The third step is compressing the blended powder into a multitude of blended compact aggregates that are safe for transport. In some embodiments the compression is done under heat to at least assist the formation of aggregates or reduce the content of water to less than 10% by weight. In some embodiments, the steps of compression and heating are done at the same time.

Gas Separation Sub-System and Consumption Sub-System Process

As stated above, many of the adverse gaseous byproducts found in typical coal combustion systems are removed in the system of the invention because of cleaner biomass diluents of or substituted for the bulk of coal. One of the major remaining adverse materials is carbon dioxide gas in the gaseous waste stream of the coal combusting apparatus.

The gas separation sub-system process for separating carbon dioxide from the exhaust stream has several steps. Inputting at least one exhaust chamber having a gaseous waste stream and comprising at least one carbon dioxide gas separator sub-system configured to separate at least 50 volume % of carbon dioxide from the gaseous waste stream;

a carbon dioxide gas consumption sub-system configured to receive the separated carbon dioxide gas and consume it in useful materials;

The first step is to cool the exhaust stream a low temperature and add dilute the exhaust stream with air to reduce the carbon dioxide concentration to less than 1000 ppm in a cooled gas stream. The second step is to apply the proprietary process of Global Thermostat to separating out the carbon dioxide from the cooled gas stream to form separated carbon dioxide.

The consumption sub-system process for consuming the carbon dioxide involves two steps. The first step is to input the separated carbon dioxide as feedstock into a carbon dioxide consumption sub-system with additional feedstock comprising catalysts and co-reactants such as water, natural gas and stack acids. The second step is to expose the feedstock under heat from the waste heat from the coal consumption apparatus to catalytic electrochemistry to create beneficial industrial chemicals such as glycols, alcohols, olefins, and organic acids. Alternatively the consumption sub-system process involves placing the separated carbon dioxide into capturing vessels such as cement or encapsulating plastics for beneficial uses.

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A coal combusting system for combusting coal in a coal combusting apparatus comprising:
    a first input chamber of a coal combusting apparatus configured to pulverize a coal feedstock comprising a processed biomass/cleaned coal blended compact aggregate that comprises at least 10 wt % of a coal having a sulfur content of at least 50 wt % less than that of the content of sulfur in the coal before it passed through a coal cleaning sub-system and at least 10 wt % of a processed biomass from a processed biomass system and to feed the pulverized cleaned coal feedstock into the coal combusting apparatus in a first concentration of feedstock;
    a second input chamber of the coal combusting apparatus configured to pulverize a processed biomass pellet feedstock from the processed biomass system and to feed the pulverized processed biomass pellet feedstock into the coal combusting apparatus in a second concentration of feedstock with the weight ratio of the first concentration to the second concentration between 1 to 9 and 9 to 1;
    at least one exhaust chamber having a gaseous waste stream and comprising at least one gas separation sub-system configured to separate at least 50 volume % of carbon dioxide from the gaseous waste stream;
    a consumption sub-system configured to receive the separated carbon dioxide gas and consume it in the making of useful materials,
wherein the processed biomass system is configured to make processed biomass from unprocessed organic-carbon-containing feedstock that includes free water, intercellular water, intracellular water, intracellular water-soluble salts, and at least some plant cells comprising cell walls that include lignin, hemicellulose, and microfibrils within fibrils, the processed biomass system comprising:
    a beneficiation sub-system configured to convert the unprocessed organic-carbon-containing feedstock into a processed organic-carbon-containing feedstock with characteristics that include having an energy density of at least 17 MMBTU/ton (20 GJ/MT), a water content of less than 20 wt %, and a water-soluble intracellular salt content that is decreased more than 60 wt % on a dry basis from that of the unprocessed organic-carbon-containing feedstock;
    a coal cleaning sub-system configured to convert un-cleaned coal into cleaned coal having a sulfur content at least 50 wt % less than that of the content of sulfur in the un-cleaned coal before it passed through the coal cleaning sub-system;
    a blending sub-system configured to convert the cleaned coal and some of the processed biomass into processed biomass/cleaned coal blended compact aggregate with a weight ratio of cleaned coal to processed biomass ranging from 1 to 9 to 9 to 1; and
    a pelletizing sub-system configured to convert some of the processed organic-carbon-containing feedstock into processed biomass pellets.

2. The coal combusting system of claim 1, wherein the blending sub-system comprises:
    a sizing chamber to properly sized particles of coal and processed biomass to a similar size;
    a combining chamber configured to blend the similarly sized particles into a blended powder of a predetermined ratio of coal to processed biomass; and
    a compacting chamber to compress the blended powder into blended compact aggregates, and wherein the pelletizing sub-system comprises:
    a compression chamber configured to separate the processed organic-carbon-containing feedstock into discrete units of mass having a longest length of at least 0.16 inch (0.41 cm) and a density of at least 37.5 pounds per cubic foot (0.60 grams per cubic centimeter) to form processed biomass pellets; and
    a collection chamber configured to gather aggregates of processed biomass pellets.

3. The coal combusting system of claim 1, wherein the first input chamber of the coal combusting apparatus and the second input chamber of the coal combusting apparatus are the same input chamber.

4. The coal combusting system of claim 1, wherein the processed biomass comprises processed biochar, the blended compact aggregate has an energy density of at least 21 MMBTU/ton (25 GJ/MT), the processed organic-carbon-containing feedstock is passed through a heating sub-system to form processed biochar that is blended with coal into a blended compact aggregate in a blending sub-system, and the water-soluble intracellular salt content decrease is based on comparing the processed organic-carbon-containing feedstock before it is passed through the heating sub-system to the unprocessed organic-carbon-containing feedstock.

5. The coal combusting system of claim 1, wherein the beneficiation sub-system comprises:
    a transmission device configured to convey into a reaction chamber unprocessed organic-carbon-containing feedstock comprising free water, intercellular water, intracellular water, intracellular water-soluble salts, and at least some plant cells comprising cell walls that include lignin, hemicellulose, and microfibrils within fibrils;
    at least one reaction chamber comprising at least one entrance passageway, at least one exit passageway for fluid, at least one exit passageway for processed organic-carbon-containing feedstock, and at least three sections, the sections comprising:
        a wet fibril disruption section configured to interact with at least some of the lignin and hemicellulose between the fibrils to make at least some regions of the cell wall more susceptible to penetration by water-soluble salts without dissolving more than 25 percent of the lignin and hemicellulose;
        a vapor explosion section in communication with the wet fibril disruption section and at least configured to volatilize plant fibril permeable fluid through rapid decompression to penetrate the more susceptible regions of the cell wall so as to create a porous organic-carbon-containing feedstock with plant cell wall passageways for intracellular water and intracellular water-soluble salts to pass from the plant cell; and
        a compaction section in communication with the vapor explosion section and configured to compress the porous organic-carbon-containing feedstock between pressure plates configured to minimize formation of water-impermeable felt so as to permit the escape of intracellular water and intracellular water-soluble salt from the reaction chamber fluid exit passageway and to create processed organic-carbon-containing feedstock that passes out through its reaction chamber exit passageway; and a collection device in communication with the reaction chamber and configured to gather the processed organic-carbon-containing feedstock having a water content of less than 20% by weight, a combined lignin and hemicellulose content that is decreased by at less than 25% on a dry basis from that of the unprocessed organic-carbon-containing feedstock, and a water-soluble intracellular salt content that is decreased by at least 60% on a dry basis from that of the unprocessed organic-carbon-containing feedstock.

6. The coal combusting system of claim 4, wherein the heating sub-system is an oxygen-deprived thermal sub-system that comprises a reaction chamber configured to heat processed organic-carbon-containing feedstock in an atmosphere that contains less than 4 percent oxygen to a temperature sufficient to convert at least some processed organic-carbon-containing feedstock into processed biogas and processed biochar.

7. The coal combusting system of claim 6, wherein the oxygen-deprived thermal sub-system is selected from a group consisting of a substantially horizontal sublimation system comprising:
  a hot box configured to be able to heat from an ambient temperature to an operating sublimation temperature, maintain an initial operating sublimation temperature and a final operating sublimation temperature that are stable within less than ±10° C., and cool from operating sublimation temperatures to an ambient temperature without leaking any oxygen into the hot box and having at least one heat source in communication with the interior of the hot box to supply heat as needed;
  at least one substantially horizontal reaction chamber largely located within the hot box, having a surface, configured to heat the processed organic-carbon-containing feedstock without external catalyst or additional water to an operating sublimation temperature in a time frame that is short enough to sublime at least part of the processed organic-carbon-containing feedstock without creating substantially any liquid, configured to heat from an ambient temperature to an operating sublimation temperature, operate at a sublimation temperature, and cool from an operating sublimation temperature to an ambient temperature without leaking any product gas fuel into the surrounding hot box, and comprising an input end outside the hot box and configured to receive compressed feedstock through an input line and an output end outside the hot box and configured to discharge product gas fuel gas through a discharge line and solid char fuel through an output line;
  a first powered transport mechanism that is located within the reaction chamber and is configured to convey sublimation products of the processed organic-carbon-containing feedstock through the reaction chamber as the processed organic-carbon-containing feedstock is transformed into processed biogas and processed biochar; and
  a gas-tight element on both the input line and output line and configured to prevent hot biogas from adversely escaping from the reaction chamber; or a substantially vertical sublimation system comprising:
  at least one substantially vertical reaction chamber configured to heat the processed organic-carbon-containing feedstock without external catalyst or additional water, carbon dioxide, or carbon monoxide, to an operating sublimation temperature in a time frame that is short enough to sublime at least part of the processed organic-carbon-containing feedstock without creating substantially any liquid;
  a first powered transport mechanism that is located partly within the reaction chamber, has an extended part that extends outside the reaction chamber, and is configured to convey sublimation products of the processed organic-carbon-containing feedstock through the reaction chamber as the processed organic-carbon-containing feedstock is transformed into biogas and processed biochar; and
  a self-adjusting seal that is configured to continuously contain the processed biogas within the reaction chamber at the region surrounding the extended part of the powered transport mechanism during changing temperatures of startup and shutdown operations, and during steady-state sublimation temperature during operation.

8. The coal combusting system of claim 4, wherein the heating sub-system comprises:
  at least one reaction chamber within a microwave reflecting enclosure, the reaction chamber comprising at least one microwave-transparent chamber wall and at least one reaction cavity within the reaction chamber that is configured to hold the organic-carbon-containing feedstock in an externally supplied oxygen free atmosphere;
  a microwave subsystem comprising at least one device configured to emit microwaves when energized, the microwave device positioned relative to the reaction chamber so that the microwaves are directed through the microwave-transparent chamber wall and into the reaction cavity; and
  a mechanism configured to provide relative motion between the microwave device and the reaction chamber.

9. The coal combusting system of claim 5, wherein the vapor explosion section of the beneficiation sub-system comprises a wash element that is configured to remove and clean microparticles of unprocessed organic-carbon-containing feedstock, lignin fragments, and hemicellulosic fragments from the vapor explosion section into a fine, sticky mass of biomass with high lignin content,
  wherein a blending chamber of the blending sub-system is further configured to receive fine, sticky mass of biomass to permit lower temperatures in a compaction chamber formation during formation of blended compact aggregates.

10. The coal combusting system of claim 5, wherein the processed organic-carbon-containing feedstock has a water soluble intracellular salt content that is decreased by more than 75 wt % on a dry basis from that of unprocessed organic-carbon-containing feedstock and the compaction section of the beneficiated sub-system is configured to provide at least one rinsing step.

* * * * *